United States Patent
Kim et al.

(10) Patent No.: US 10,073,521 B2
(45) Date of Patent: *Sep. 11, 2018

(54) AUDIO USER INTERACTION RECOGNITION AND APPLICATION INTERFACE

(71) Applicant: QUALCOMM Incorporated, San Diego, CA (US)

(72) Inventors: Lae-Hoon Kim, San Diego, CA (US); Jongwon Shin, Gwangju (KR); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,365

(22) Filed: Jul. 10, 2017

(65) Prior Publication Data
US 2017/0308164 A1    Oct. 26, 2017

Related U.S. Application Data

(63) Continuation of application No. 13/674,789, filed on Nov. 12, 2012, now Pat. No. 9,746,916.

(Continued)

(51) Int. Cl.
*G06F 3/01* (2006.01)
*H04N 7/15* (2006.01)
(Continued)

(52) U.S. Cl.
CPC ............ *G06F 3/013* (2013.01); *G04G 21/00* (2013.01); *G06F 3/011* (2013.01); *G10L 25/48* (2013.01);
(Continued)

(58) Field of Classification Search
CPC ...................................................... G06F 3/013
(Continued)

(56) References Cited

U.S. PATENT DOCUMENTS 5,572,728 A    11/1996    Tada et al.
5,724,485 A    3/1998    Rainton
(Continued)

FOREIGN PATENT DOCUMENTS

CN    1890622 A    1/2007
DE    10217822 C1    9/2003
(Continued)

OTHER PUBLICATIONS

Anguera, et al., "Acoustic Beamforming for Speaker Diarization of Meetings", Audio, Speech, and Language Processing, IEEE Transactions on 15.7, Sep. 2007, pp. 2011-2022.

(Continued)

*Primary Examiner* — Fred Tzeng
(74) *Attorney, Agent, or Firm* — Toler Law Group, P.C.

(57) ABSTRACT

Disclosed is an application interface that takes into account the user's gaze direction relative to who is speaking in an interactive multi-participant environment where audio-based contextual information and/or visual-based semantic information is being presented. Among these various implementations, two different types of microphone array devices (MADs) may be used. The first type of MAD is a steerable microphone array (a.k.a. a steerable array) which is worn by a user in a known orientation with regard to the user's eyes, and wherein multiple users may each wear a steerable array. The second type of MAD is a fixed-location microphone array (a.k.a. a fixed array) which is placed in the same acoustic space as the users (one or more of which are using steerable arrays).

30 Claims, 36 Drawing Sheets

Related U.S. Application Data

(60) Provisional application No. 61/666,207, filed on Jun. 29, 2012, provisional application No. 61/645,818, filed on May 11, 2012.

(51) Int. Cl.

| | |
|---|---|
| *G04G 21/00* | (2010.01) |
| *G10L 25/48* | (2013.01) |
| *H04M 3/56* | (2006.01) |
| *H04R 3/00* | (2006.01) |
| *H04R 1/40* | (2006.01) |
| *G06F 1/16* | (2006.01) |
| *H04S 7/00* | (2006.01) |
| *G10L 21/0216* | (2013.01) |
| *G10L 17/00* | (2013.01) |
| *G01S 3/808* | (2006.01) |
| *H04R 29/00* | (2006.01) |

(52) U.S. Cl.
CPC .............. *H04M 3/568* (2013.01); *H04N 7/15* (2013.01); *G01S 3/8083* (2013.01); *G06F 1/1613* (2013.01); *G10L 17/00* (2013.01); *G10L 2021/02166* (2013.01); *H04R 1/406* (2013.01); *H04R 3/005* (2013.01); *H04R 29/005* (2013.01); *H04S 7/304* (2013.01)

(58) Field of Classification Search
USPC ........................................................ 345/156
See application file for complete search history.

(56) References Cited

U.S. PATENT DOCUMENTS

| | | | |
|---|---|---|---|
| 5,810,395 A | 9/1998 | Morgan | |
| 5,999,167 A | 12/1999 | Marsh et al. | |
| 6,424,719 B1 | 7/2002 | Elko et al. | |
| 6,490,578 B1 | 12/2002 | Burkhard | |
| 6,525,993 B2 | 2/2003 | Wake et al. | |
| 7,119,828 B1 | 10/2006 | Kizhnerman et al. | |
| 7,262,788 B2 | 8/2007 | Ono et al. | |
| 7,298,930 B1 | 11/2007 | Erol et al. | |
| 7,307,921 B1 | 12/2007 | Karterman | |
| 7,460,150 B1 | 12/2008 | Coughlan et al. | |
| 7,590,941 B2 | 9/2009 | Wee et al. | |
| 7,604,396 B1 | 10/2009 | Karterman | |
| 8,243,902 B2 | 8/2012 | Caspi et al. | |
| 8,887,068 B2 | 11/2014 | Roberts et al. | |
| 9,443,521 B1 | 9/2016 | Olguin Olguin et al. | |
| 9,746,916 B2 * | 8/2017 | Kim ........................ | G06F 3/013 |
| 2002/0057347 A1 | 5/2002 | Urisaka et al. | |
| 2003/0020750 A1 | 1/2003 | Brown et al. | |
| 2003/0038754 A1 | 2/2003 | Goldstein et al. | |
| 2003/0055897 A1 | 3/2003 | Brown et al. | |
| 2003/0081504 A1 | 5/2003 | McCaskill | |
| 2003/0101060 A1 | 5/2003 | Bickley et al. | |
| 2004/0218745 A1 | 11/2004 | O'Toole | |
| 2004/0235520 A1 | 11/2004 | Cadiz et al. | |
| 2005/0021344 A1 | 1/2005 | Davis et al. | |
| 2005/0064848 A1 | 3/2005 | Kim et al. | |
| 2006/0093998 A1 | 5/2006 | Vertegaal | |
| 2006/0104458 A1 | 5/2006 | Kenoyer et al. | |
| 2006/0132607 A1 | 6/2006 | Kimber et al. | |
| 2006/0262920 A1 | 11/2006 | Conway et al. | |
| 2007/0071206 A1 | 3/2007 | Gainsboro et al. | |
| 2007/0083547 A1 | 4/2007 | Schnauffer | |
| 2007/0106724 A1 | 5/2007 | Gorti et al. | |
| 2007/0192103 A1 | 8/2007 | Sato et al. | |
| 2008/0205665 A1 | 8/2008 | Tokuda et al. | |
| 2008/0216125 A1 | 9/2008 | Li et al. | |
| 2008/0244419 A1 | 10/2008 | Kurpick et al. | |
| 2008/0259731 A1 | 10/2008 | Happonen | |
| 2008/0320082 A1 | 12/2008 | Kuhlke et al. | |
| 2009/0116652 A1 | 5/2009 | Kirkeby et al. | |
| 2009/0150149 A1 | 6/2009 | Culter et al. | |
| 2009/0157672 A1 | 6/2009 | Vemuri | |
| 2009/0195497 A1 | 8/2009 | Fitzgerald et al. | |
| 2009/0202091 A1 | 8/2009 | Pedersen et al. | |
| 2010/0004930 A1 | 1/2010 | Strope et al. | |
| 2010/0014690 A1 | 1/2010 | Wolff et al. | |
| 2010/0039497 A1 | 2/2010 | Cutler | |
| 2010/0040217 A1 | 2/2010 | Aberg et al. | |
| 2010/0053164 A1 | 3/2010 | Imai et al. | |
| 2010/0080364 A1 | 4/2010 | Davis | |
| 2010/0111387 A1 | 5/2010 | Christiansen, II et al. | |
| 2010/0123785 A1 | 5/2010 | Chen et al. | |
| 2010/0211387 A1 | 8/2010 | Chen | |
| 2010/0217585 A1 | 8/2010 | Karlsson et al. | |
| 2010/0315482 A1 | 12/2010 | Rosenfeld et al. | |
| 2010/0316232 A1 | 12/2010 | Acero et al. | |
| 2010/0318399 A1 | 12/2010 | Li et al. | |
| 2011/0004650 A1 | 1/2011 | Poussiere et al. | |
| 2011/0043617 A1 | 2/2011 | Vertegaal et al. | |
| 2011/0074822 A1 | 3/2011 | Chang | |
| 2011/0075820 A1 | 3/2011 | Mikan et al. | |
| 2011/0075828 A1 | 3/2011 | Okita et al. | |
| 2011/0102462 A1 | 5/2011 | Birnbaum et al. | |
| 2011/0242298 A1 | 10/2011 | Bathiche et al. | |
| 2012/0019557 A1 | 1/2012 | Aronsson et al. | |
| 2012/0026166 A1 | 2/2012 | Takeda et al. | |
| 2012/0050331 A1 | 3/2012 | Kanda | |
| 2012/0128166 A1 | 5/2012 | Kim et al. | |
| 2012/0128186 A1 | 5/2012 | Endo et al. | |
| 2012/0154891 A1 | 6/2012 | Yen; Yu-Chou et al. | |
| 2012/0224021 A1 | 9/2012 | Begeja et al. | |
| 2012/0262451 A1 | 10/2012 | Kotani et al. | |
| 2012/0274736 A1 | 11/2012 | Robinson et al. | |
| 2012/0281854 A1 | 11/2012 | Ishibashi et al. | |
| 2013/0076853 A1 | 3/2013 | Diao | |
| 2013/0080168 A1 | 3/2013 | Iida et al. | |
| 2013/0088420 A1 | 4/2013 | Kang | |
| 2013/0124623 A1 | 5/2013 | Minter | |
| 2013/0159325 A1 | 6/2013 | Polonsky et al. | |
| 2013/0201345 A1 | 8/2013 | Ling | |
| 2013/0258089 A1 | 10/2013 | Lyons et al. | |
| 2013/0271560 A1 | 10/2013 | Diao | |
| 2013/0272097 A1 | 10/2013 | Kim et al. | |
| 2013/0272538 A1 | 10/2013 | Kim et al. | |
| 2013/0272539 A1 | 10/2013 | Kim et al. | |
| 2013/0290434 A1 | 10/2013 | Bank et al. | |
| 2013/0300648 A1 | 11/2013 | Kim et al. | |
| 2013/0301837 A1 | 11/2013 | Kim et al. | |
| 2013/0304476 A1 | 11/2013 | Kim et al. | |
| 2014/0304200 A1 | 10/2014 | Wall et al. | |

FOREIGN PATENT DOCUMENTS

| | | |
|---|---|---|
| EP | 2172801 A2 | 4/2010 |
| FR | 2941307 A1 | 7/2010 |
| GB | 2342802 A | 4/2000 |
| JP | 2001252258 A | 9/2001 |
| JP | 2008054358 A | 3/2008 |
| JP | 2009301166 A | 12/2009 |
| JP | 2010266722 A | 11/2010 |
| TW | 201112045 A | 4/2011 |
| WO | 9636960 A1 | 11/1996 |
| WO | 03027830 A1 | 4/2003 |
| WO | 2006006935 A1 | 1/2006 |
| WO | 2010096272 A1 | 8/2010 |
| WO | 2012001928 A1 | 1/2012 |
| WO | 2012042768 A1 | 4/2012 |
| WO | 2012061148 A1 | 5/2012 |

OTHER PUBLICATIONS

Araki, et al., "Online Meeting Recognizer with Multichannel Speaker Diarization", Signals, systems and computers (ASILOMAR), 2010 conference record of the forty fourth asilomar conference on. IEEE, Nov. 2010, pp. 1697-1701.

Ball, et al., "A Beamforming Video Recorder for Integrated Observations of Dolphin Behavior and Vocalizations," Journal of the

(56) References Cited

OTHER PUBLICATIONS

Acoustical Society of America, Mar. 2005, vol. 117, No. 3, pp. 1005-1008.
Canton-Ferrer C et al: "Multimodal real-time focus of attention estimation in Smart Rooms ", Computer Vision and Pattern Recognition Workshops, 2008, CVPR Workshops 2008, IEEE Computer Society Conference on, IEEE, Piscataway NJ, USA, Jun. 23, 2008 (Jun. 23, 2008), pp. 1-8, XP031285736.
Colburn et al., "The Role of Eye Gaze in Avatar Mediated Conversational Interfaces" Sketches and Applications, Siggraph'00, Jul. 2000, pp. 1-10.
Cutler, et al., "Distributed Meetings: A Meeting Capture and Broadcasting System", Proceedings of the tenth ACM international conference on Multimedia. ACM, Dec. 2002, pp. 503-512.
Dielmann, et al. "Floor Holder Detection and End of Speaker Turn Prediction in Meetings", INTERSPEECH. Sep. 2010, pp. 1-4.
Gatica-Perez, et al., "Visual Attention, Speaking Activity, and Group Conversational Analysis in Multi-Sensor Environments," Handbook of Ambient Intelligence and Smart and Environments, 2010, pp. 433-461.
Hayley Hung et al: "Estimating Dominance in Multi-Party Meetings Using Speaker Diarization", IEEE Transactions on Audio, Speech and Language Processing, IEEE Service Center, New York, NV, USA, vol. 19, No. 4, May 1, 2011.
Hori, et al., "Real-time Meeting Recognition and Understanding using Distant Microphones and Omni-directional Camera." Spoken Language Technology Workshop (SLT), 2010 IEEE. IEEE, Dec. 2010, pp. 424-429.
Hori T et al: "Low-Latency Real-Time Meeting Recognition and Understanding Using Distant Microphones and Omni-Directional Camera", IEEE Transactions on Audio, Speech and Language Processing, IEEE Service Center, New York, NY, USA, vol. 20, No. 2, Feb. 1, 2012 (Feb. 1, 2012), pp. 499-513, XP011464135.
Hung, et al., "Estimating the Dominant Person in Multi-Party Conversations using Speaker Diarization Strategies." Acoustics, Speech and Signal Processing, 2008. ICASSP 2008. IEEE International Conference on. IEEE, Apr. 2008, pp. 2197-2200.
International Search Report and Written Opinion—PCT/US2013/039639—ISA/EPO—dated Aug. 20, 2013.
Junuzovic et al., "Requirements and Recommendations for an Enhanced Meeting Viewing Experience," Proceedings of the 16th ACM international conference on Multimedia. ACM, Oct. 2008, pp. 539-548.
Lee et al.,"Portable Meeting Recorder," Proceedings of the tenth ACM international conference on Multimedia, ACM, Dec. 2002, pp. 493-502.
McCowan, et al., "Speech acquisition in meetings with an audio-visual sensor array", Multimedia and Expo, 2005, ICME 2005, IEEE International Conference on. IEEE, Jul. 2005, pp. 1382-1385.
McCowan et al.,"Speech Acquisition in Meetings with an Audio-visual Sensor Array," 2005 IEEE International Conference on Multimedia and Expo. IEEE, Jan. 2005, pp. 1-5.
Partial International Search Report—PCT/US2013/039639—International Search Authority European Patent Office dated Jul. 1, 2013.
Pfau T., et al., "Multispeaker speech activity detection for the ICSI meeting recorder", Automatic Speech Recognition and Understanding, 2001. ASRU01. IEEE Workshop on Dec. 9-13, 2001, Piscataway, NJ, USA,IEEE, Dec. 9, 2001 (Dec. 9, 2001), pp. 107-110, XP010603688, ISBN: 978-0-7803-7343-3.
Shivappa et al.,"Role of Head Pose Estimation in Speech Acquisition from Distant Microphones," 2009 IEEE International Conference on Acoustics, Speech and Signal Processing. IEEE, May 2009, pp. 3357-3360.
Stiefelhagen et al., "Modeling Focus of Attention for Meeting Indexing Based on Multiple Cues," IEEE Transactions on Neural Networks 13.4, Jul. 2002, pp. 928-938.
Thomas, et al., "Linking the sounds of dolphins to their locations and behavior using video and multichannel acoustic recordings" J. Acoust. Soc. Am. vol. 112, Issue 4, pp. 1692-1701 (2002).

\* cited by examiner

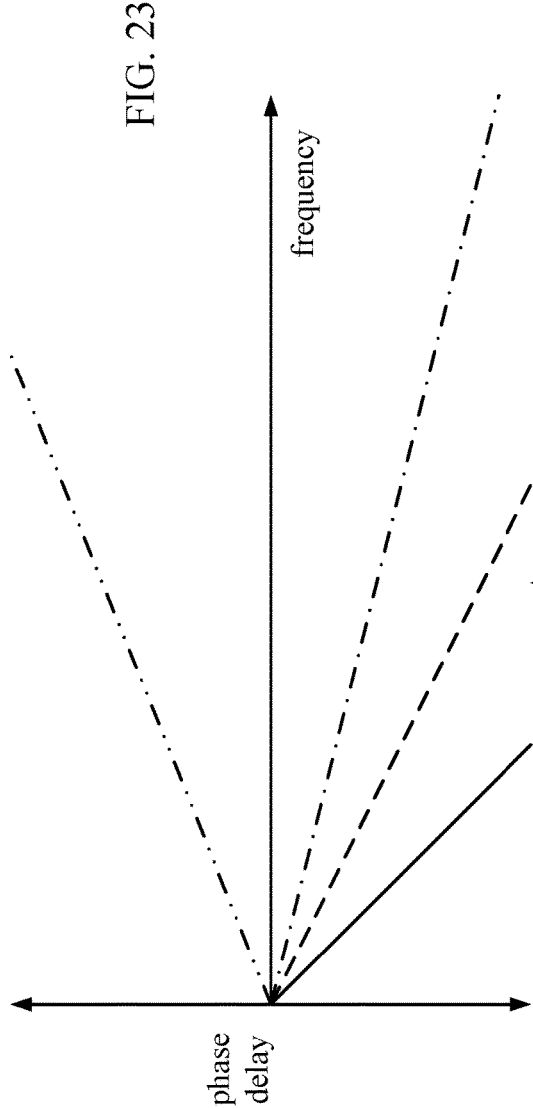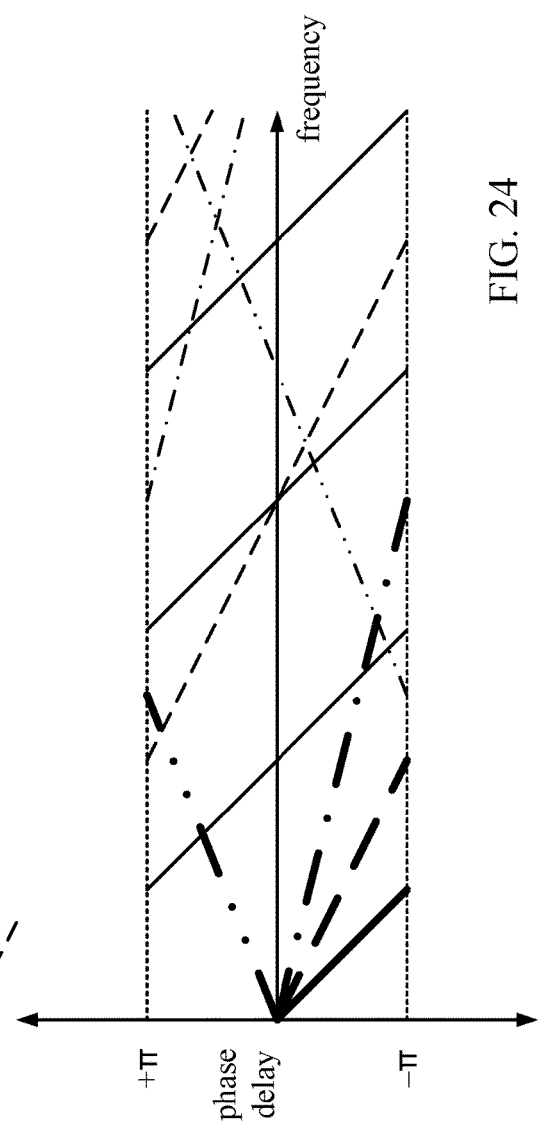

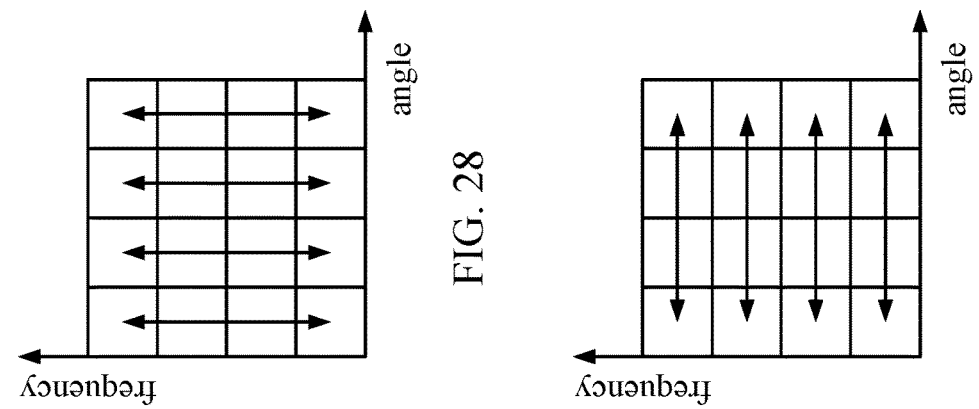
FIG. 28
FIG. 29
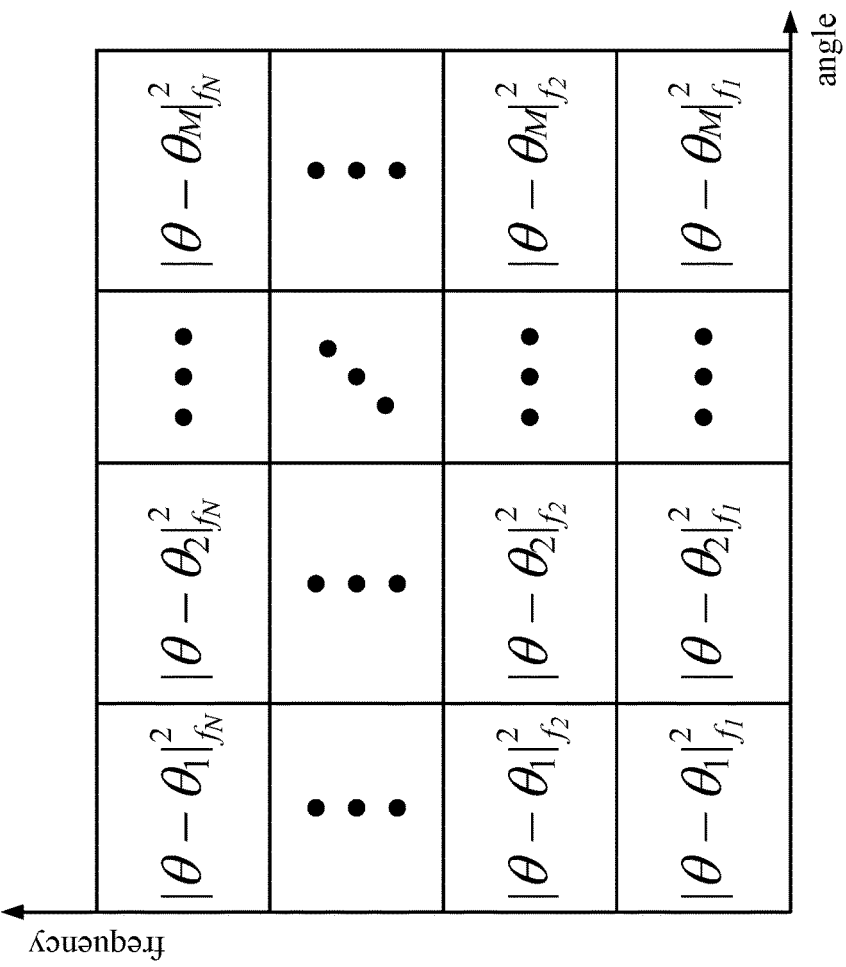
FIG. 27

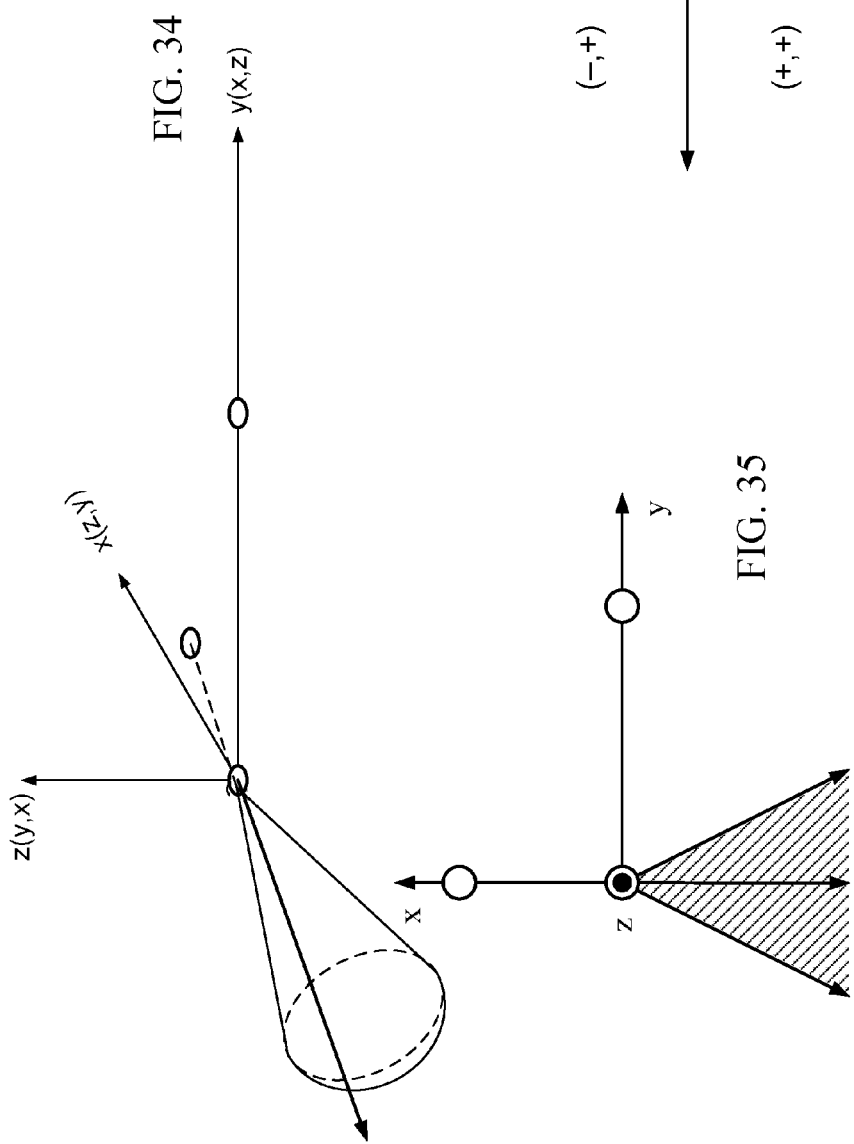

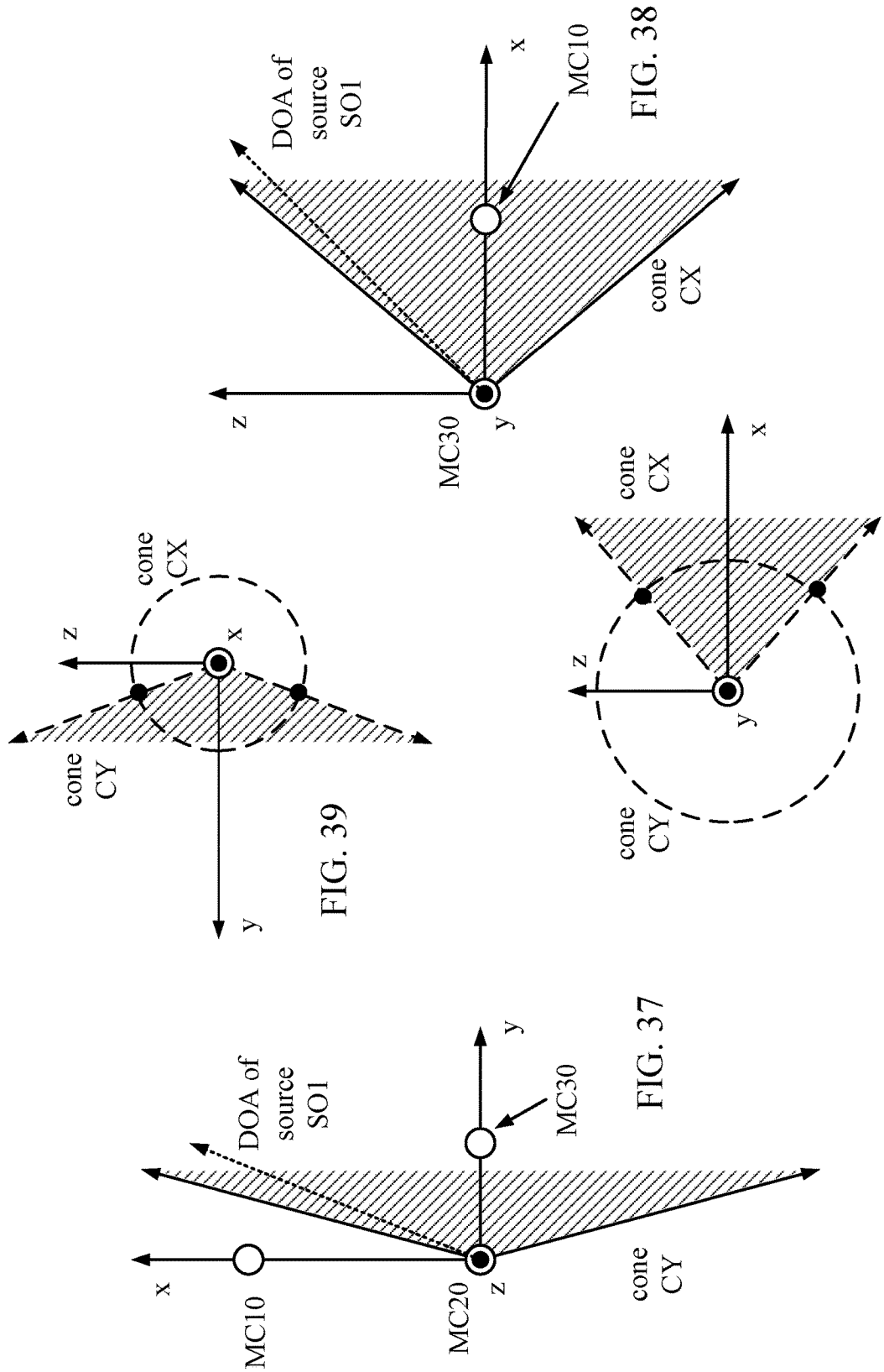

FIG. 43

$$\left\{ \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix}^H \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix} + \lambda \cdot I \right\}^{-1} \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix}^H \begin{bmatrix} x_{1,1} \\ x_{1,2} \\ x_{2,1} \\ x_{2,2} \end{bmatrix} = \begin{bmatrix} y_1 \\ y_2 \\ y_3 \end{bmatrix}$$

- Target source number
- steering vector
- pair number
- mic number (annotations point to $d^1_{1,2}$ in the steering vector column of the matrix)

FIG. 44

$$\underset{i}{\mathrm{argmax}} \left\{ \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix}^H \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix} + \lambda \cdot I \right\}^{-1} \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix}^H \begin{bmatrix} x_{1,1} \\ x_{1,2} \\ x_{2,1} \\ x_{2,2} \end{bmatrix} = \begin{bmatrix} y_1 \\ y_2 \\ y_3 \end{bmatrix}$$

(the rightmost steering matrix columns use $d^i_{1,1}, d^i_{1,2}, d^i_{2,1}, d^i_{2,2}$)

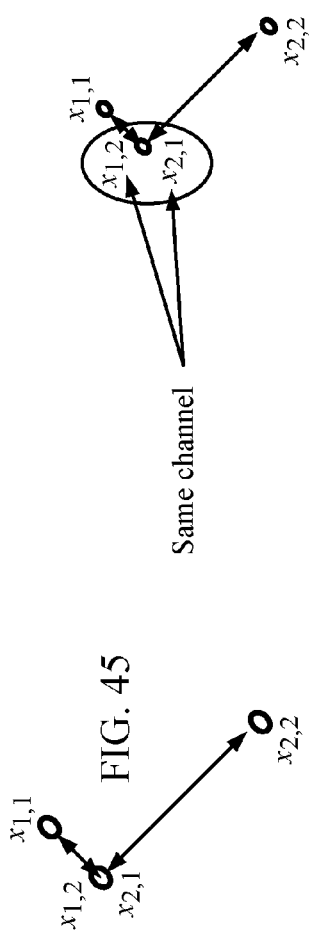

FIG. 45

$$\underset{i}{\operatorname{argmax}} \left| \begin{bmatrix} d^1_{1,1} & d^2_{1,1} & d^3_{1,1} \\ d^1_{1,2} & d^2_{1,2} & d^3_{1,2} \\ d^1_{2,2} & d^2_{2,2} & d^3_{2,2} \end{bmatrix}^H (\Gamma+\lambda \cdot I)^{-1} \begin{bmatrix} d^1_{1,1} & d^2_{1,1} & d^3_{1,1} \\ d^1_{1,2} & d^2_{1,2} & d^3_{1,2} \\ d^1_{2,2} & d^2_{2,2} & d^3_{2,2} \end{bmatrix} \right)^{-1} \begin{bmatrix} d^1_{1,1} & d^2_{1,1} & d^3_{1,1} \\ d^1_{1,2} & d^2_{1,2} & d^3_{1,2} \\ d^1_{2,2} & d^2_{2,2} & d^3_{2,2} \end{bmatrix}^H (\Gamma+\lambda \cdot I)^{-1} \begin{bmatrix} x_{1,1} \\ x_{1,2} \\ x_{2,2} \end{bmatrix} - \begin{bmatrix} d^i_{1,1} \\ d^i_{1,2} \\ d^i_{2,2} \end{bmatrix} \right|$$

FIG. 46

$$\begin{bmatrix} y_1 \\ y_2 \\ y_3 \end{bmatrix} = \left( \underbrace{\begin{bmatrix} d^1_{1,1} & d^1_{1,2} & \cdots & d^N_{1,1} & d^N_{1,2} \\ d^1_{2,1} & d^1_{2,2} & \cdots & d^N_{2,1} & d^N_{2,2} \\ \vdots & \vdots & \ddots & \vdots & \vdots \\ d^1_{M,1} & d^1_{M,2} & \cdots & d^N_{M,1} & d^N_{M,2} \end{bmatrix}}_{} ^H \underbrace{\begin{bmatrix} d^1_{1,1} & d^1_{1,2} & \cdots & d^N_{1,1} & d^N_{1,2} \\ d^1_{2,1} & d^1_{2,2} & \cdots & d^N_{2,1} & d^N_{2,2} \\ \vdots & \vdots & \ddots & \vdots & \vdots \\ d^1_{M,1} & d^1_{M,2} & \cdots & d^N_{M,1} & d^N_{M,2} \end{bmatrix}}_{} + \lambda \cdot I \right)^{-1} \begin{bmatrix} d^1_{1,1} & d^1_{1,2} & \cdots & d^N_{1,1} & d^N_{1,2} \\ d^1_{2,1} & d^1_{2,2} & \cdots & d^N_{2,1} & d^N_{2,2} \\ \vdots & \vdots & \ddots & \vdots & \vdots \\ d^1_{M,1} & d^1_{M,2} & \cdots & d^N_{M,1} & d^N_{M,2} \end{bmatrix}^H \begin{bmatrix} x_{1,1} \\ x_{1,2} \\ x_{2,1} \\ x_{2,2} \\ \vdots \\ x_{M,1} \\ x_{M,2} \end{bmatrix}$$

Target source number 1, 2, ..., N, where N (number of sources) ≤ M (number of pairs)

steering vector per pair
pair number
mic number

FIG. 47

$$\left(d_{1,1}^1, d_{1,2}^1\right) = \left(\exp\left(-\frac{j2\pi f\, 0.073\sin(\theta_1)}{c}\right), 1\right)$$

$$\left(d_{2,1}^1, d_{2,2}^1\right) = \left(\exp\left(-\frac{j2\pi f\, 0.036\sin(\theta_2)}{c}\right), 1\right)$$

FIG. 48

AUDIO USER INTERACTION RECOGNITION AND APPLICATION INTERFACE

CROSS-REFERENCE TO RELATED APPLICATIONS

The present application claims priority from and is a continuation application of U.S. Non-Provisional patent application Ser. No. 13/674,789, entitled "AUDIO USER INTERACTION RECOGNITION AND APPLICATION INTERFACE," filed Nov. 12, 2012, which claims priority from U.S. Provisional Patent Application No. 61/666,207, entitled "AUDIO USER INTERACTION RECOGNITION AND APPLICATION INTERFACE," filed Jun. 29, 2012, and U.S. Provisional Patent Application No. 61/645,818, entitled "AUDIO USER INTERACTION RECOGNITION AND CONTEXT REFINEMENT," filed May 11, 2012, the contents of which are incorporated by reference in their entireties.

BACKGROUND

An application interface is the means by which a user interacts with one or more devices comprising a system application (a.k.a. "application") in order to enable effective operation and control of the application by the user. Typically, an application interface comprises both hardware and software components to provide both a means of input (allowing a user to manipulate the application) and a means of output (allowing the application to indicate the effects of the users' manipulation). The outputs from the application interface provide feedback and/or deliver information from the application to the user which in turn aids the user in making operational decisions. The objective of any new application interface is to improve the operation of an application in a way which produces improved or enhanced results for the user, and generally the more meaningful improvements to application interfaces are those that reduce the user's input while achieving the same or better desired outputs while simultaneously minimizing undesired outputs.

Separately, a substantial amount of useful information can be derived from determining the direction a user is looking at different points in time. Indeed, a vast amount of gaze tracking research using any of several vision-based approaches (i.e., tracking user eyes by any of several existing means) is already being undertaken in several different contexts for several different potential uses. However, understanding a user's gazing direction only provides semantic information on one dimension of the user's interest and does not take into account contextual information that is mostly given by speech and other audible (and/or visual) means of communications. In other words, the combination of gaze tracking coupled with speech tracking provides richer and more meaningful information about the user than the simpler forms of information currently being utilized today.

SUMMARY

To minimize user inputs while delivering improved outputs, useful information can be derived by an application interface from knowing the direction in which a user is looking while speaking or listening—information can be used to enhance the user's interaction with a variety of different application interface contexts. To achieve these benefits, inputs from one or more steerable microphone arrays coupled with inputs from a fixed microphone array may be used to determine who a person is looking at or what a person is paying attention to (relative to who is speaking) when audio-based contextual information and/or visual-based semantic information is being presented. The combination of gaze tracking coupled with speech tracking provides opportunities for richer and more meaningful interactions with applications. Various implementations disclosed herein are directed to enhanced user interaction via an application interface that takes into account the user's gaze direction relative to who is speaking in an interactive multi-participant environment where audio-based contextual information and/or visual-based semantic information is being presented.

Certain implementations disclosed herein detect a gaze direction line-of-sight for a user based on at least an audio detection component (i.e., microphone-type or other sound-detection devices) from a fixed array and at one steerable array and determine if a display device is in the line-of-sight of the user. If the display device is in the line-of-sight of the user, then a first image is displayed on the display device and if the display device is not in the line-of-sight of the user, then a second image is displayed on the display device.

Certain other implementations disclosed herein detect a collective gaze direction target for a plurality of participants based on a plurality of audio detection components from a fixed array and at least one steerable array, determine if the target is a display device, and if the target is a display device, then activate the display device to complete a display presentation during which the presentation is paused for periods during which the display device is not the target and resumed when the display device is again the target. The display device is deactivated once the display presentation is completed.

Some implementations may enable a steerable array to detect when the device is in a range, receive a signal back from the steerable array, display a first image on the display when the device is in a range, and display a second image on the display when the device is not in the range. Some other implementations may detect when placed in line-of-sight with a wearable array, receive a first image from a mobile device and reorient and redisplay the display image such that the second image is aligned with the first image on the mobile device. Yet other implementations may detect, via a steerable array, when the display device is in a range corresponding to a line-of-sight of a user, receive a signal back from the steerable array, display a first image on the display when the steerable array is in a range, and display a second image on the display when the steerable array is not in a range.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings:

FIG. 23 shows plots of unwrapped phase delay vs. frequency for four different DOAs, and FIG. 24 shows plots of wrapped phase delay vs. frequency for the same DOAs;

FIG. 27 shows an example of calculating DOA differences for a frame;

FIG. 28 shows an example of calculating a DOA estimate;

FIG. 29 shows an example of identifying a DOA estimate for each frequency;

FIGS. 34 and 35 show an ambiguity in the DOA estimate;

FIG. 36 shows a relation between signs of observed DOAs and quadrants of an x-y plane;

FIGS. 37-40 show an example in which the source is located above the plane of the microphones;

FIGS. 43 and 44 show examples of pair-wise normalized beamformer/null beamformers (BFNFs) for a two-pair microphone array (e.g., as shown in FIG. 45);

FIG. 45 shows an example of a two-pair microphone array;

FIG. 46 shows an example of a pair-wise normalized minimum variance distortion less response (MVDR) BFNF;

FIG. 47 shows an example of a pair-wise BFNF for frequencies in which the matrix $A^H A$ is not ill-conditioned;

FIG. 48 shows examples of steering vectors;

DETAILED DESCRIPTION

Section 1: Overview

Figure 1:
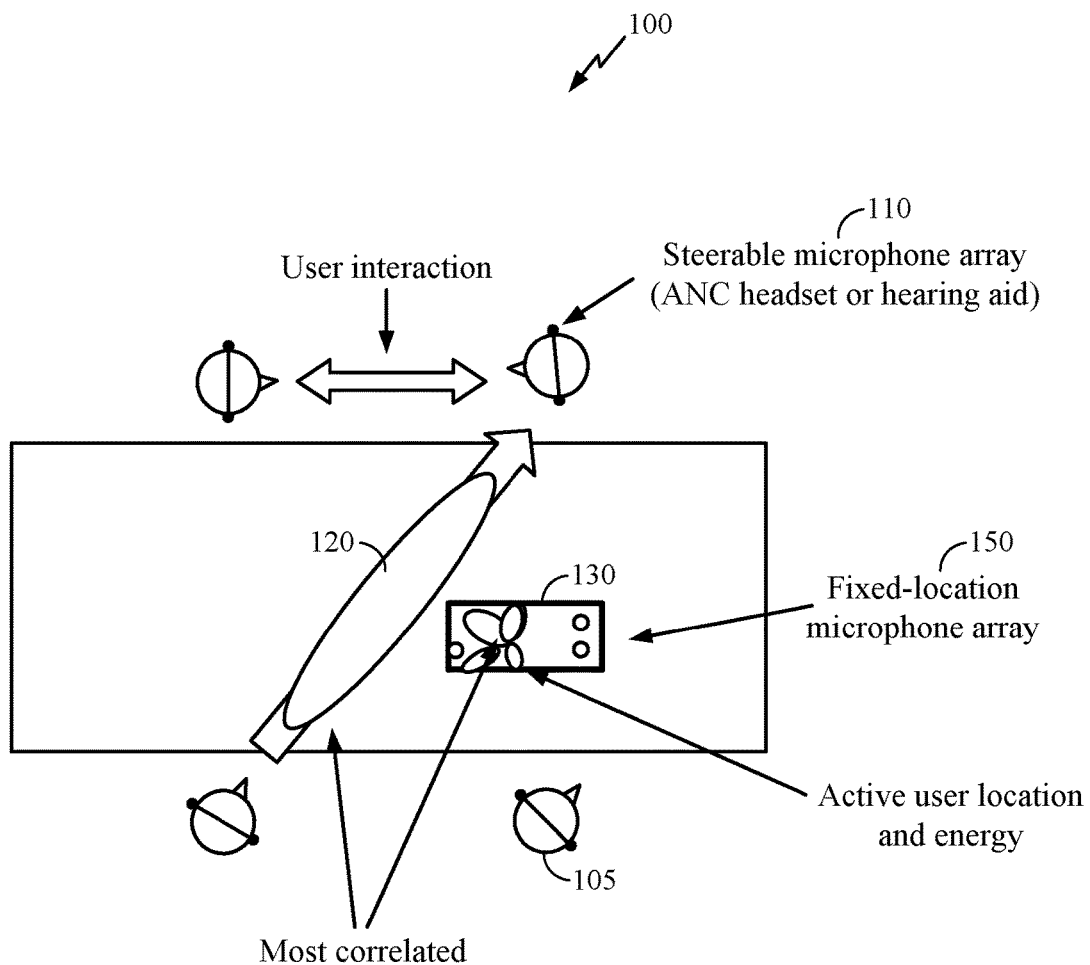
FIG. 1 is a diagram of a group of users each wearing a steerable microphone array, along with a fixed microphone array, that may be used to determine contextual information.

Various implementations disclosed herein are directed to enhanced user interaction via an application interface that takes into account the user's gaze direction relative to who is speaking in an interactive multi-participant environment where audio-based contextual information and/or visual-based semantic information is being presented. Among these various implementations, two different types of microphone array devices (MADs) may be used. The first type of MAD is a steerable microphone array (a.k.a. a steerable array) which is worn by a user in a known orientation with regard to the user's eyes, and wherein multiple users may each wear a steerable array. The second type of MAD is a fixed-location microphone array (a.k.a. a fixed array) which is placed in the same acoustic space as the users (one or more of which are using steerable arrays). Collectively these components and the devices that interface therewith may be referred to as the "content/context system" or simply "the system" for convenience.

For several implementations, the steerable microphone array may be part of an active noise control (ANC) headset or hearing aid, and there may be multiple steerable arrays each associated with a different user or speaker (also referred to herein as a participant) in a meeting or group, for example. The fixed microphone array, in such a context, would then be used to separate different people speaking and listening during the group meeting using audio beams corresponding to the direction in which the different people are located relative to the fixed array. The correlation or similarity between the audio beams of the separated speakers of the fixed array and the outputs of the steerable arrays are evaluated.

For certain implementations, the active speaker's location may be determined using the fixed microphone array and/or the steerable microphone arrays. Significantly, regarding the latter, when a user (wearing a steerable microphone array) turns his/her head, the user's look direction of the beampattern also changes. By correlating or otherwise determining the similarity of beamformed output (or any type of spatially filtered output) from the steerable microphone array with the fixed microphone array outputs corresponding to each active speaker, the identification may be determined of the person that a user is looking at (e.g., paying attention to, listening to, etc.). The system can also determine if the users are collectively looking at, for example, a common display device or other objects in the space.

For several such implementations, then, the information corresponding to form the collective gaze direction and audio direction of participants within the environment—that is, the general direction or intersection of the individual gazing directions of multiple users, or the general direction or intersection from multiple users of an audio source—may be used to indicate the current active speaker at any given time, and the audio presentation of this active speaker may be enhanced for those gazing at the speaker. An identified active speaker may also be the focus of audio and/or visual capture devices that are tracking (or recording) the progress of the interactions where, as the active speaker changes from person to person, so too does the focus of the audio and/or visual capture devices (i.e., microphone-type or other sound-detection devices).

In some implementations, the information pertaining to the gaze direction and audio direction of participants within the environment particular to a specific user/participant may be used to enhance application user interface controls for devices specific to that particular user. For example, the user may possess a mobile display device that interfaces with the audio/visual environment and, based on the gaze direction of its user relative to the other users in the room, may automatically perform different functions accordingly. For example, for a mobile device that is aligned in front of and between the user's gaze and the subject of the user's gaze (for example, another participant), the device may automatically display information regarding the subject of that user's gaze (e.g., identifying information, textual replay of that other participant's last active speaking, etc.). As used herein, "mobile device" includes but is not limited to mobile phones and smart phones, email and/or Internet devices, portable GPS receivers, personal media players, handheld game players, personal digital assistants (PDAs), e-book readers, tablet devices, netbooks, notebooks, laptops, and other portable computers. With regard to other applications, such as the aforementioned projection screen, the mobile display—when intersected with the user's gaze and the projection screen—may display supplemental information regarding the contents of the screen preprogrammed into the presentation for just such a purpose. Similarly, the user's repeated gaze at an object, then at the personal device, then at the object, and then at the personal device, for example, my similarly trigger the device to automatically display information regarding the object that is subject to the alternating gazing activity of the user.

In other implementations, the information pertaining to the gaze direction and audio direction of participants within the environment particular to a specific user/participant may be used to enhance the user's own audio interaction in the environment by interactively providing helpful prompts and cues. For example, for a user that is an active speaker, that user's personal display device—recognizing that the user is the current active speaker—may track the eye contact of the user with the other participants to gauge who is most actively listening, whose attention is drawn to someone or something else in the room, and who is having a side conversation. In turn, the device could then provide cues to direct the speaker to focus on specific other participants to better engage them or otherwise draw them into the discussion.

In yet other implementations, the information pertaining to gaze direction and audio direction of participants within the environment particular to a specific user/participant may be used to enhance interoperability of multiple devices specific to that user. For example, the user may have a watch-type display device that operates as a watch but also as an interactive display described above when brought between the line of sight of the user and another participant and other source of information (audio or visual) in the environment. For example, when held at low level, the watch display may merely provide typical data such as time, date, etc., but when raised to a level that more directly intercedes between the line of sight of the user and a target (person, projection display, etc.), provides different information specific to the environment and the audio/visual interaction of the participants (and specifically the user and the target participant or object).

Alternative implementations may also be directed to a watch-type display device that operates with or without a fixed array and a moveable array. For example, when held at low level, the watch display may enter a power-save mode, but when raised to a higher level to be viewed provides a lighted display when a low-lighting environment is detected. Moreover, ultrasound emissions and detections may still be used by such implementations.

For certain additional implementations based on several of the foregoing implementations previously alluded to herein, a personal display device may utilize ultrasound to detect its position relative to its user in order to know how to best automatically interact with the user. The short-range quality of ultrasound enables personal devices to work with individual users without interfering with other users employing similar technology. Similarly, emitters of a different type may be used for other objects such as projection screens and the like to enable them to better detect gaze direction and other inputs that in turn help with the selection of the appropriate output settings. For example, for a watch-type display, if the watch has an ultra-sound emitter, then the steerable array (and its microphones or "mics") worn by a user can detect the "direction of arrival" (DOA) of the device. If there is no occlusion from the user to the device and if DOA is "in a range"—that is, within a certain angular range (often denoted by the Greek letter theta) such as, for example, +/−30 degrees and/or within a certain proximal distance such as, for example, 2 feet, 10, feet, or 100 feet—the ultrasound emission can be detected and the display can be modified accordingly. Moreover, because of its fast energy loss over distance, the proximity of ultrasound to the detecting device can play an important role in preventing overlap and other conditions.

In the disclosures that follow, Section 2 provides explanations regarding terms and terminology used herein for better understanding the disclosures made of the various implementations described. Section 3 provides an extensive description of exemplary aspects of the underlying technology that may be utilized by the various implementations disclosed herein. Section 4 then describes in greater detail the various exemplary implementations of an application interface alluded to above. Section 5 then describes additional details and alternatives pertaining to the various implementations described herein.

Section 2: Explanations Regarding Terms and Terminology

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B" or "A is the same as B"). Similarly, the term "in response to" is used to indicate any of its ordinary meanings, including "in response to at least."

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample (or "bin") of a frequency domain representation of the signal (e.g., as produced by a fast Fourier transform) or a subband of the signal (e.g., a Bark scale or mel scale subband).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, and notwithstanding the use of word "system" in specific reference to variously implementations and utilizations of the content/context system described herein, the term "system" is generally used herein to indicate any of its ordinary meanings, including "a group of elements that interact to serve a common purpose."

Any incorporation by reference of a portion of a document shall also be understood to incorporate definitions of terms or variables that are referenced within the portion, where such definitions appear elsewhere in the document, as well as any figures referenced in the incorporated portion. Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

Section 3: Exemplary Description of Underlying Technology

A combination visual- and hearing-based approach is described herein to enable a user to steer towards a person (or a sound source) in order to more clearly understand the audio-based information being presented at that moment (e.g., the context of conversation and/or the identity of the sound source) using sound sensors and a variety of position-based calculations and resulting interaction enhancements.

For example, the correlation or similarity between the audio beams of the separated speakers of the fixed array and the outputs of steerable arrays may be used to track social interaction between speakers. Correlation is just one example of a similarity measure, and any similarity measurement or determination technique may be used.

More particularly, a social interaction or social networking analysis of a group of users (also referred to herein as speakers or participants) may be performed and displayed using a connection graph generated responsive to the correlation or other similarity measure between the audio beams of the separated speakers of the fixed array and the output of each steerable array respectively associated with each user of the group. Thus, for example, automatic social network analysis may be performed in a group meeting of participants, using a connection graph among the meeting participants, to derive useful information regarding who was actively engaged in the presentation or more generally the effectiveness of the presentation in holding the attention of the users.

FIG. 1 is a diagram 100 of a group of users each wearing a steerable microphone array 110, along with a fixed-location microphone array 150 in the same space (e.g., room) as the users, which may be used to determine contextual information. As shown in FIG. 1, each user 105 of a group of users in a room (or other defined space) wears a steerable microphone array (e.g., as a headset that may include the ability to perform adaptive noise control (ANC)), and a fixed-location microphone array 150 is located in the room (e.g., on a table, in a phone, etc.). The fixed-location microphone array 150 may be part of an electronic device such as a video game platform, tablet, notebook, or mobile device, for example, or may be a standalone device or implementation. Alternatively or additionally, the fixed-location microphone array 150 may comprise a distributed microphone array (i.e., distributed microphones).

A user 105 wearing the headset may generate a fixed beam-pattern 120 from his steerable (e.g., wearable) microphone array which is pointed in the user's physical visual (or "look") direction. If the user turns his head, then the user's look direction of the beam-pattern is also changed. The active speaker's location may be determined using the fixed microphone array. By correlating, or otherwise determining the similarity of, beamformed output (or any type of spatially filtered output) from the steerable microphone array with the fixed microphone array outputs corresponding to each active speaker, the identification may be determined of the person that a user is looking at (e.g., paying attention to, listening to, etc.). Each headset may have a processor that is in communication (e.g., via a wireless communications link) with a main processor (e.g., in a centralized local or remote computing device) to analyze correlations or similarities of beams between the headsets and/or the fixed arrays.

In other words, fixed beam patterns at any moment in time may be formed based on a user's physical look direction which can be correlated with the fixed microphone array outputs, thereby providing a visual indication, via a connection graph 130 (e.g., displayed on a display of any type of computing device, such as a handset, a laptop, a tablet, a computer, a netbook, or a mobile computing device), of the social interaction of the targeted users. Thus, by correlating a beamformed output from the steerable microphone array with the fixed microphone array outputs, corresponding to each active speaking user, tracking of a social interaction or network analysis may be performed and displayed. Moreover, by checking the similarity between beamformed output from the look-direction-steerable microphone array and the location-fixed microphone array outputs corresponding to each active speaker, the person that a user is looking at or paying attention to can be identified and zoomed into.

Figure 2:
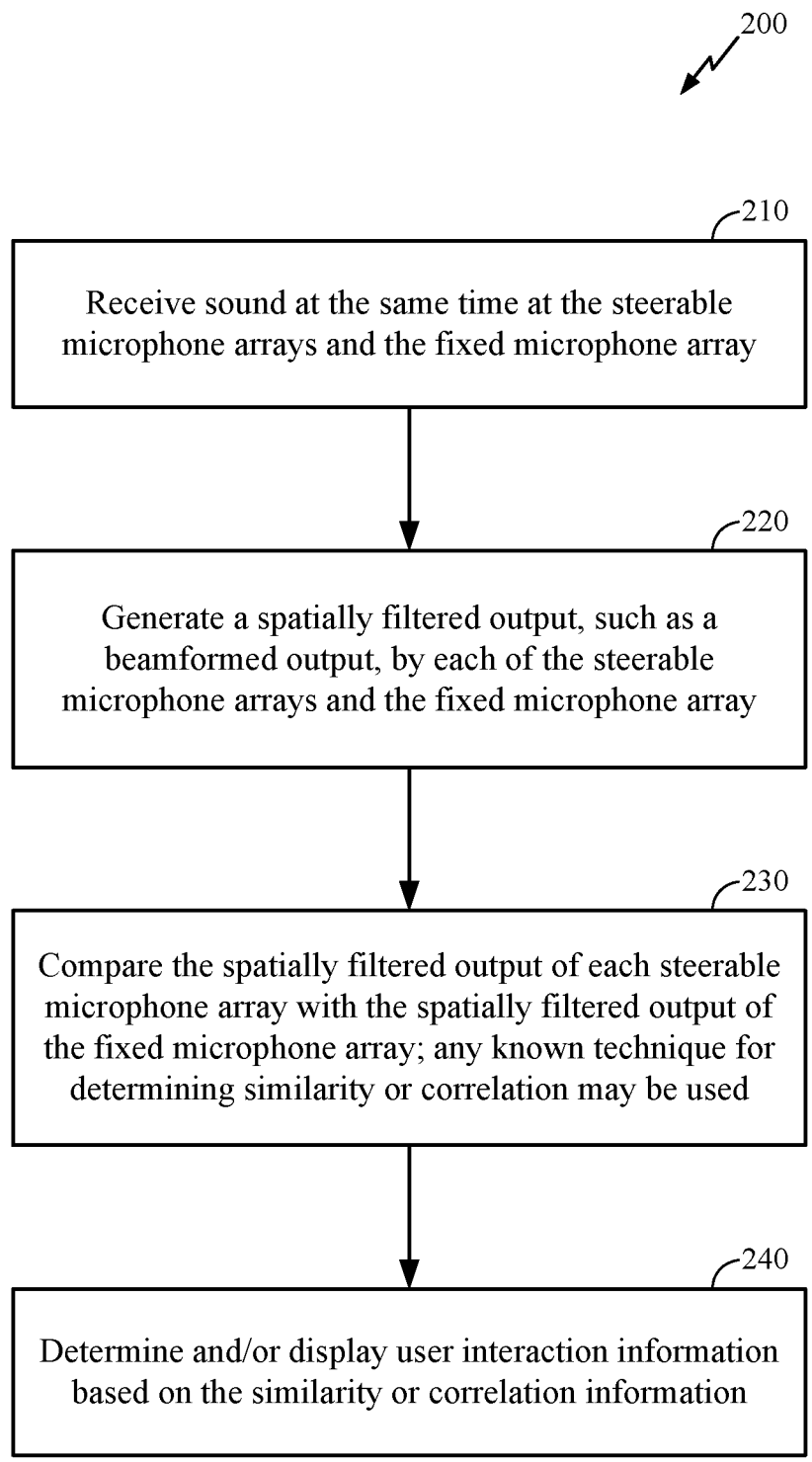
FIG. 2 is an operational flow of an implementation of a method of determining user interaction using steerable microphone arrays and a fixed microphone array.

FIG. 2 is an operational flow of an implementation of a method 200 of determining user interaction using steerable microphone arrays and a fixed microphone array. At 210, the steerable microphone arrays and the fixed microphone array each receive sound at roughly the same time (although small variations can be detected and used to calculate relative positions of the user). At 220, a spatially filtered output, such as a beamformed output, is generated by each of the steerable microphone arrays and the fixed microphone array. At 230, the spatially filtered output of each steerable microphone array is compared with the spatially filtered output of the fixed microphone array. Any known technique for determining similarity or correlation may be used. At 240, the similarity or correlation information obtained from 230 may be used to determine and/or display user interaction information, as described further herein.

Figure 3:
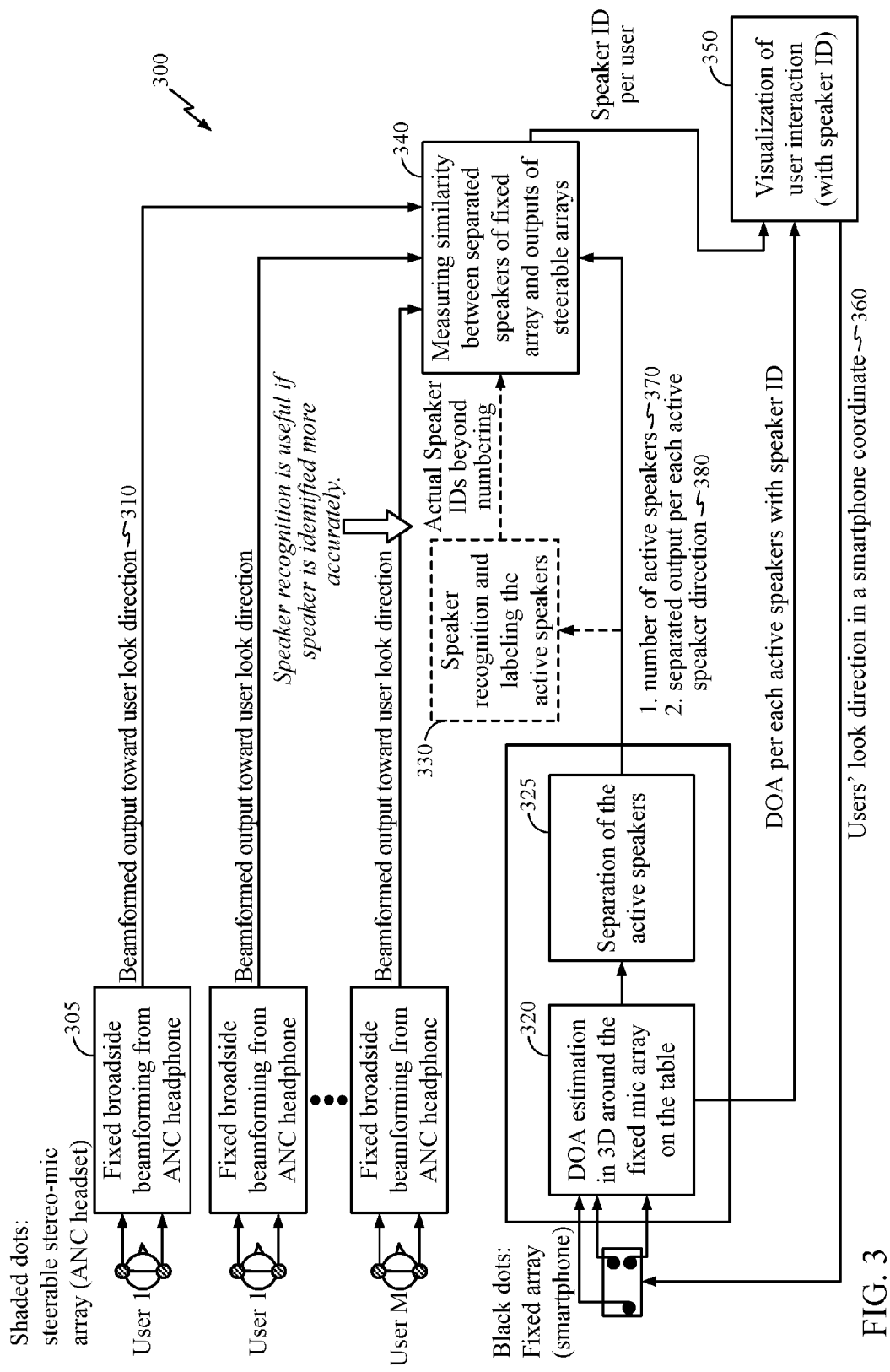
FIG. 3 is an operational flow of another implementation of a method of determining user interaction using steerable microphone arrays and a fixed microphone array.

FIG. 3 is an operational flow of another implementation of a method 300 of determining user interaction using steerable microphone arrays and a fixed-location microphone array. Each of a plurality of users has a steerable stereo microphone array, such as an ANC headset, that has a known orientation corresponding to the visual gazing direction of each such user. Each of the steerable arrays (in the ANC headsets) provides fixed broadside beamforming at 305, in which a beamformed output (or any type of spatially filtered output) is generated in the user look direction at 310 (i.e., in the direction the user of the steerable array is looking).

A fixed microphone array (such as in a mobile device) with an associated processor performs a direction of arrival (DOA) estimation at 320 in three dimensions (3D) around the fixed microphone array and separates the active speakers at 325. The number of active speakers is determined at 370, and a separate output for each active speaker (identified by an identification number for example) is generated at 380. In an implementation, speaker recognition and labeling of the active speakers may be performed at 330.

The similarity is measured between the separated speakers of the fixed array and the outputs of the steerable arrays at 340. Using the measured similarity and the DOA estimation and the speaker IDs, a visualization of the user interaction (with speaker identity (ID) or participant ID) may be generated and displayed at 350. Each user's look direction may be provided to the fixed array as a mobile device coordinate for example, at 360.

A connection graph (also referred to as an interaction graph) may be generated which displays (a) who is talking and/or listening to whom and/or looking at whom, (b) who is dominating and/or leading the discussion of the group, and/or (c) who is bored, not participating, and/or quiet, for example. Real-time meeting analysis may be performed to assist the efficiency of the meeting and future meetings. Information such as time of meeting, place (e.g., meeting location), speaker identity or participant identity, meeting topic or subject matter, and number of participants, for example, may be displayed and used in the analysis.

Figure 4:
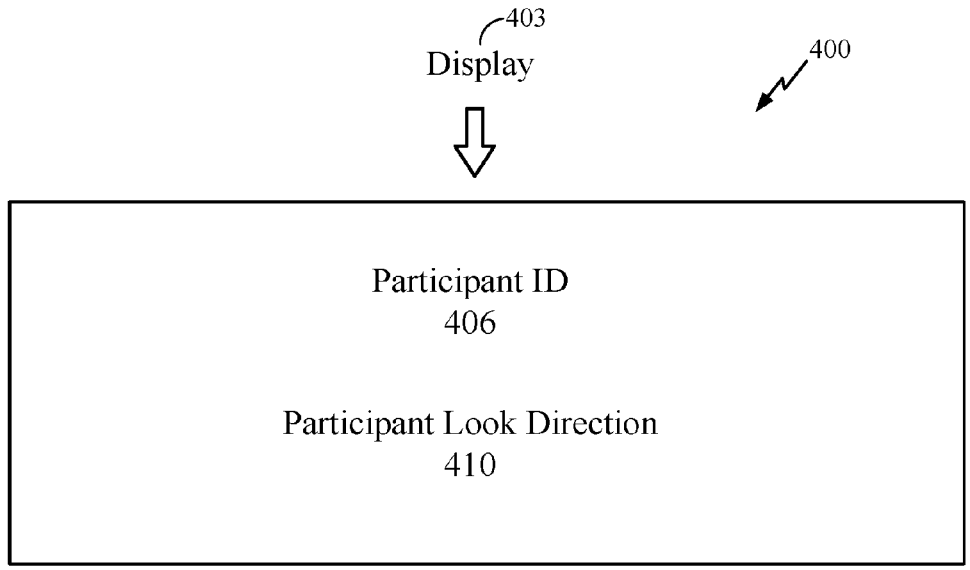
FIG. 4 is a diagram of an example display that may provide an indication of a user identity and which direction the user is looking.

FIG. 4 is a diagram 400 of an example display 403 that may provide an indication of a user identity and which direction the user is looking. The user identity (participant ID 406) is displayed along with the direction that the user is looking (participant look direction 410). During a meeting, for example, this display of the participant look direction 410 may be generated and provided to an interested party, such as a meeting administrator or leader or supervisor, so that the interested party may see who the participant is looking at various times during the meeting. Although only one participant ID 406 and participant look direction 410 is shown in the diagram 400, this is not intended to be limited. The interested party may receive such information for more than one participant, and such information may be displayed concurrently on one or more displays depending on the implementation. The data that is generated for display on the display 403 may be stored in a memory and retrieved and displayed at a later time, as well as being displayed in real-time.

Figure 5:
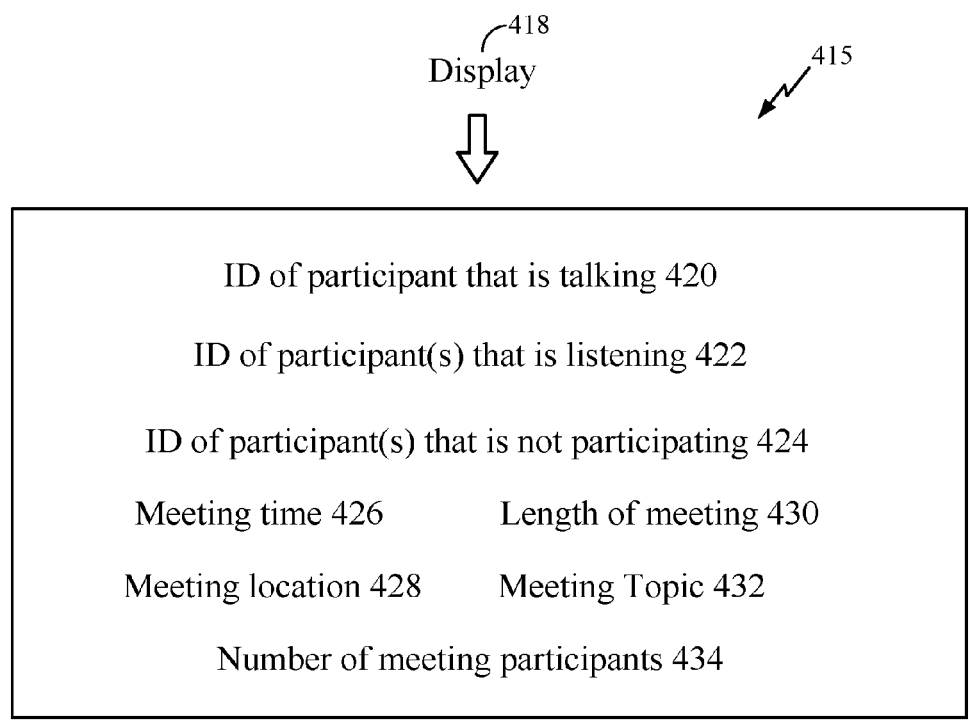
FIG. 5 is a diagram of a user interface that may be generated and displayed and that indicates various user interactions and meeting data.

FIG. 5 is a diagram 415 of a user interface that may be generated and displayed on a display 418 and that indicates various user interactions and meeting data. Various types of information may be generated and displayed (e.g., in real-time during a meeting), such as the identifier (ID) of the participant who is talking 420, the ID of the participant(s) that is listening 422, and/or the ID of the participant(s) that is not participating 424 (e.g., not listening at the moment, not listening for more than a predetermined about of time or for at least a percentage of the meeting, looking somewhere other than the participant who is talking or looking in an another predetermined location or direction, etc). During a meeting, for example, this display 418 may be generated and provided to an interested party, such as a meeting administrator or leader or supervisor.

Additional data may be displayed on the display 418, such as the meeting time 426, the meeting location 428, the length of the meeting 430 (i.e., the duration), the meeting topic 432, and the number of meeting participants 434. Some or all of this data may be displayed. Additionally or alternatively, other data may be displayed, depending on the implementation, such as the IDs of all the participants and other statistics that may be generated as described further herein. The information and data that is generated for display on the display 418 may be stored in a memory and retrieved and displayed at a later time, as well as being displayed in real-time.

It is noted that a participant will be participating even if she is just listening at the meeting (and not speaking) because that participant's microphone (steerable microphone array) will still be picking up the sounds in the direction she is viewing while she is listening. Thus, even if a participant does not speak, there will still be sounds to analyze that are associated with her listening.

Figures 6, 7:
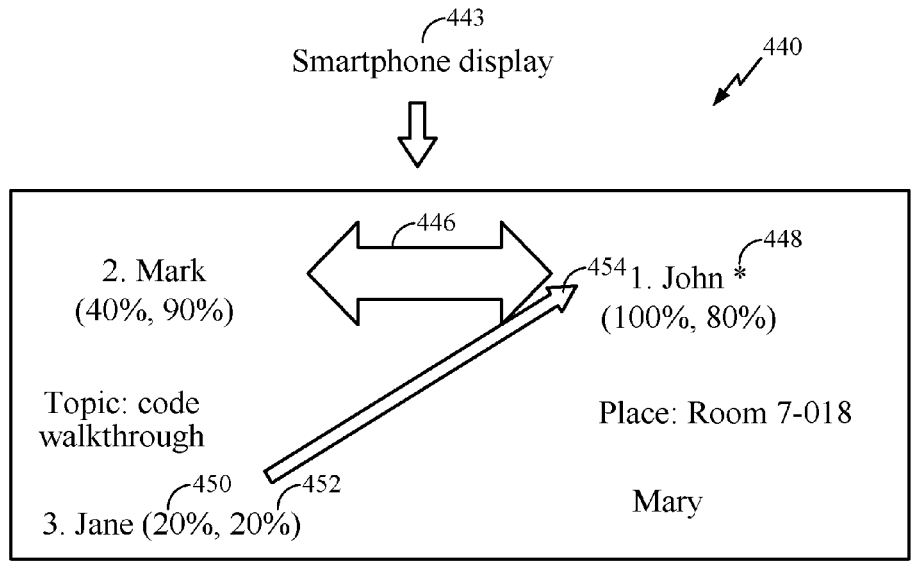
FIG. 6 is a diagram of an example display of a user interface that may be generated and displayed (e.g., on a mobile device display) and that indicates various user interactions (e.g., during a meeting)
FIG. 7 is a diagram of an example display that indicates various user interactions with respect to various topics.

A user interface may be generated and displayed (e.g., on a mobile device display or other computing device display such as a display associated with a handset, a laptop, a tablet, a computer, a netbook, or a mobile computing device) that indicates the various user interactions during the meeting. FIG. 6 is a diagram of an example display of a user interface 440 that may be generated and displayed (e.g., on a mobile device display 443) and that indicates various user interactions (e.g., during a meeting). In this example, the direction of each arrow 454 indicates who is looking at whom (only one arrow 454 is shown in this example, though a plurality of such arrows may be shown depending on the implementation and user interactions at a particular time). The thickness of each arrow indicates relatively how strong the interaction is (e.g., based on connected time, etc.). No arrow from or to a person indicates that the user is not involved in the group meeting. A percentage number may be displayed for a user which indicates a participation rate for the group meeting. An indicator 448 may be displayed to identify the leader of the meeting, and percentages 450, 452 may be determined and displayed to show how much of the discussion is directed to a person, and how much of the discussion is directed from the person, respectively. In an implementation, a color or highlighting may be used to indicate the leader of a group of participants.

In the example of FIG. 6, John and Mark are interacting a lot, as indicated by the relatively big thick arrow 446. Mary is being quiet. Real-time meeting analysis (such as that described above with respect to FIGS. 4 and 5, and elsewhere herein) may be performed to assist the efficiency of the meeting. For example, because it looks like Mary is out of the conversation, John may encourage Mary to participate (e.g., by asking a question of Mary).

Social interaction plots may be accumulated over a time period (e.g., over a month, a year, etc.) to assess group dynamics or topic dynamics, for example. FIG. 7 is a diagram 460 of an example display 462 that indicates various user interactions with respect to various topics 464. This information may be captured during one or more meetings, stored in a memory (or multiple memories), and displayed in one or more formats at a later time, e.g., during a historical analysis of data. Here, each participant ID 466 is listed along with their participation rates 468 for the various topics 464.

Thus, for example, Jane has a 20% participation rate in meetings about "Design", a 40% participation rate in meetings about "Code Walkthrough", and a 10% participation rate in meetings about "Documentation". This data may be used to determine which participants are most suited for, or interested in, a particular topic, for example, or which participants may need more encouragement with respect to a particular topic. Participation rates may be determined and based on one or more data items described herein, such as amount of time speaking at the meeting, amount of time paying attention at the meeting, amount of time listening at the meeting, etc. Although percentages are shown in FIG. 7, any relative measuring, numbering, or indicating system or technique may be used to identify relative strengths and/or weaknesses in participating levels or rates.

An "L" in the diagram 460 is used as an example indicator to indicate which user participated most in a certain topic, thereby indicating a potential leader for that topic for example. Any indicator may be used, such as a color, highlighting, or a particular symbol. In this example, John is the most participating in Design, Jane is the most participating in Code Walkthrough, and Mary is the most participating in Documentation. Accordingly, they may be identified as potential leaders in the respective topics.

Additionally, a personal time line with an interaction history may be generated for one or more meeting participants. Thus, not only a single snapshot or period of time during a meeting may be captured, analyzed, and information pertaining to it displayed (either in real-time or later offline), but also history over time may be stored (e.g., in a memory of a computing device such as a mobile device or any type of computing device, such as a handset, a laptop, a tablet, a computer, a netbook, or a mobile computing device), analyzed, and displayed (e.g., in a calendar or other display of a computing device such as a mobile device any type of computing device, such as a handset, a laptop, a tablet, a computer, a netbook, or a mobile computing device).

Figure 8:
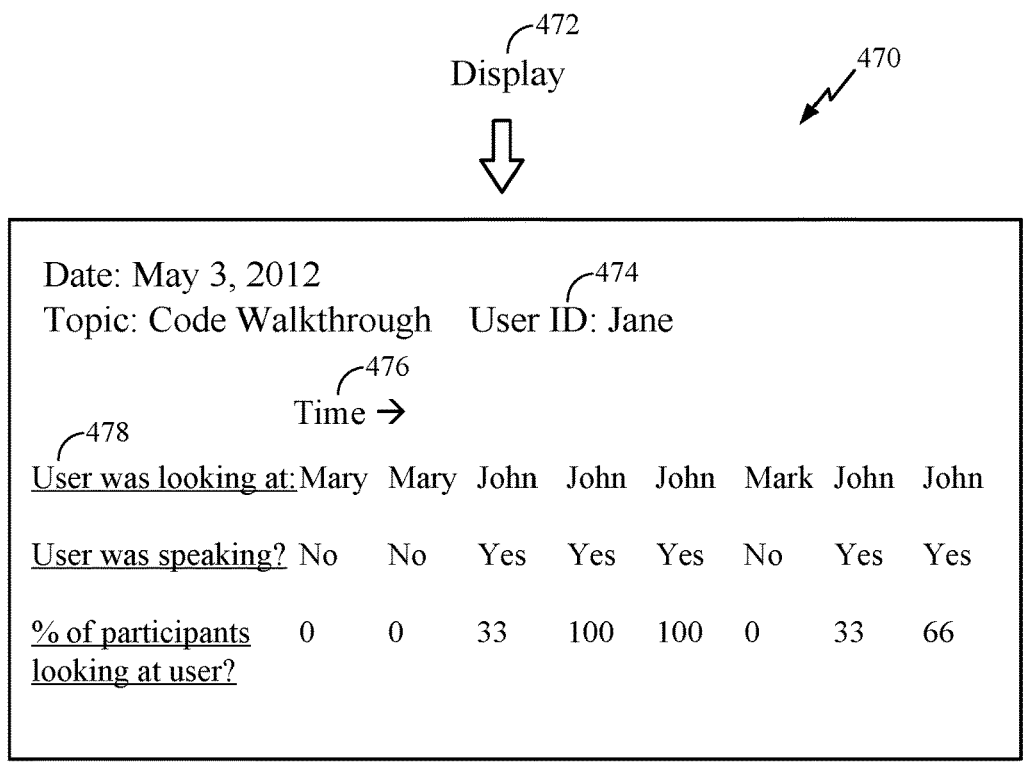
FIG. 8 is a diagram of an example display that indicates various user interactions over time.

FIG. 8 is a diagram 470 of an example display 472 that indicates various user interactions over time, that may be used for historical analysis, e.g., after one or more meetings. Here, a user identifier 474 is provided, along with information such as the meeting date and the meeting topic. The information 478 on this display 472 is provided over time 476. It shows information 478, for each period or instant of time, such as who the user was looking at that period or instant of time, whether the user was speaking then, and the percentage of meeting participants that were looking at the user at the period or instant of time. This information 478 can be determined at predetermined times during a meeting (e.g., every minute, every 5 minutes, etc.), or determined as an average or other weighted determination over particular periods of time, for example. This information is provided as an example only and is not meant to be limiting; additional or alternative information can be generated and displayed as information 478.

The information displayed in FIG. 8 can be used for meeting analysis and user analysis. Thus, in FIG. 8, it may be determined that the user Jane typically looks at Mary or Mark when Jane is not speaking, but Jane looks at John when Jane is speaking. FIG. 8 also indicates that when Jane is not speaking, the percentage of participants looking at Jane is zero, but this percentage increases as Jane is speaking.

Interaction statistics may also be generated, stored, analyzed, and displayed. For example, the evolution of interaction between people can be tracked and displayed. Recursive weighting over time may be used (e.g., 0.9*historical data+0.1*current data), such that as data gets older, it becomes less relevant, with the most current data being weighted the highest (or vice versa). In this manner, a user may be able to see which people he or others are networking with more than others. Additional statistics may be factored into the analysis to provide more accurate interaction information. For example, interaction information obtained from email exchanges or other communication may be used (combined with) the meeting, history, and/or participant interaction data to provide additional (e.g., more accurate) interaction information.

Figure 9:
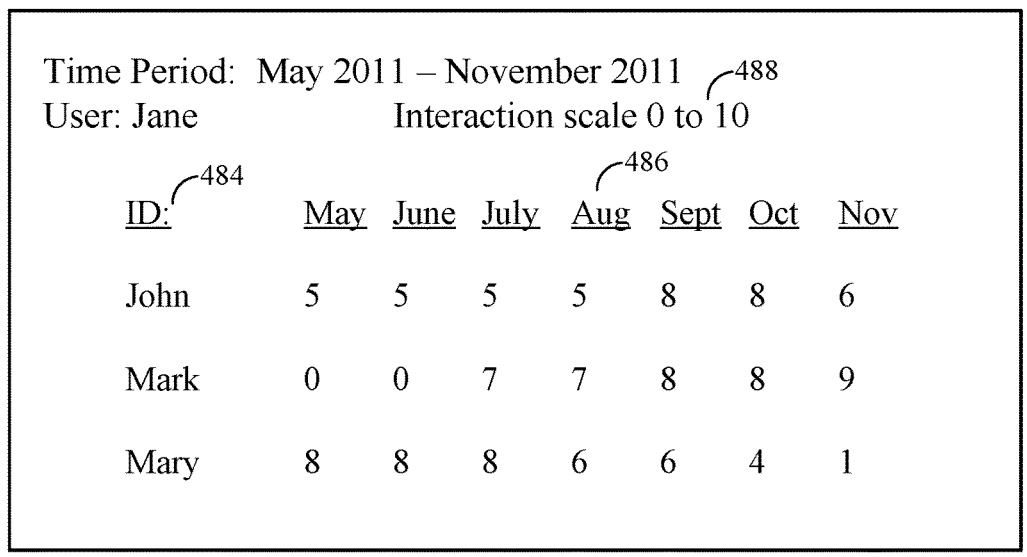
FIG. 9 is a diagram of another example display that indicates various user interactions over time.

FIG. 9 is a diagram 480 of another example display 482 that indicates various user interactions over time. Here, a user Jane is identified along with an interaction scale 488 and a time period. The diagram 480 shows other user IDs 484 and a listing of months 486 in the past. The interaction scale in this example ranges from 0 to 10, with 0 representing no interaction and 10 representing a very strong interaction between the identified user and Jane in each of the months 486. This information may be generated and provided as historical data and used, e.g., by a meeting participant or a leader or supervisor to view and analyze the various user interactions over time, e.g., to see who is most strongly interacting with whom when.

As another example, online learning monitoring may be performed to determine whether a student in a remote site is actively participating or not. Likewise, an application for video games with participant interaction is also contemplated in which there may be immediate recognition of where the users are looking among the possible sound event locations.

Figure 10:
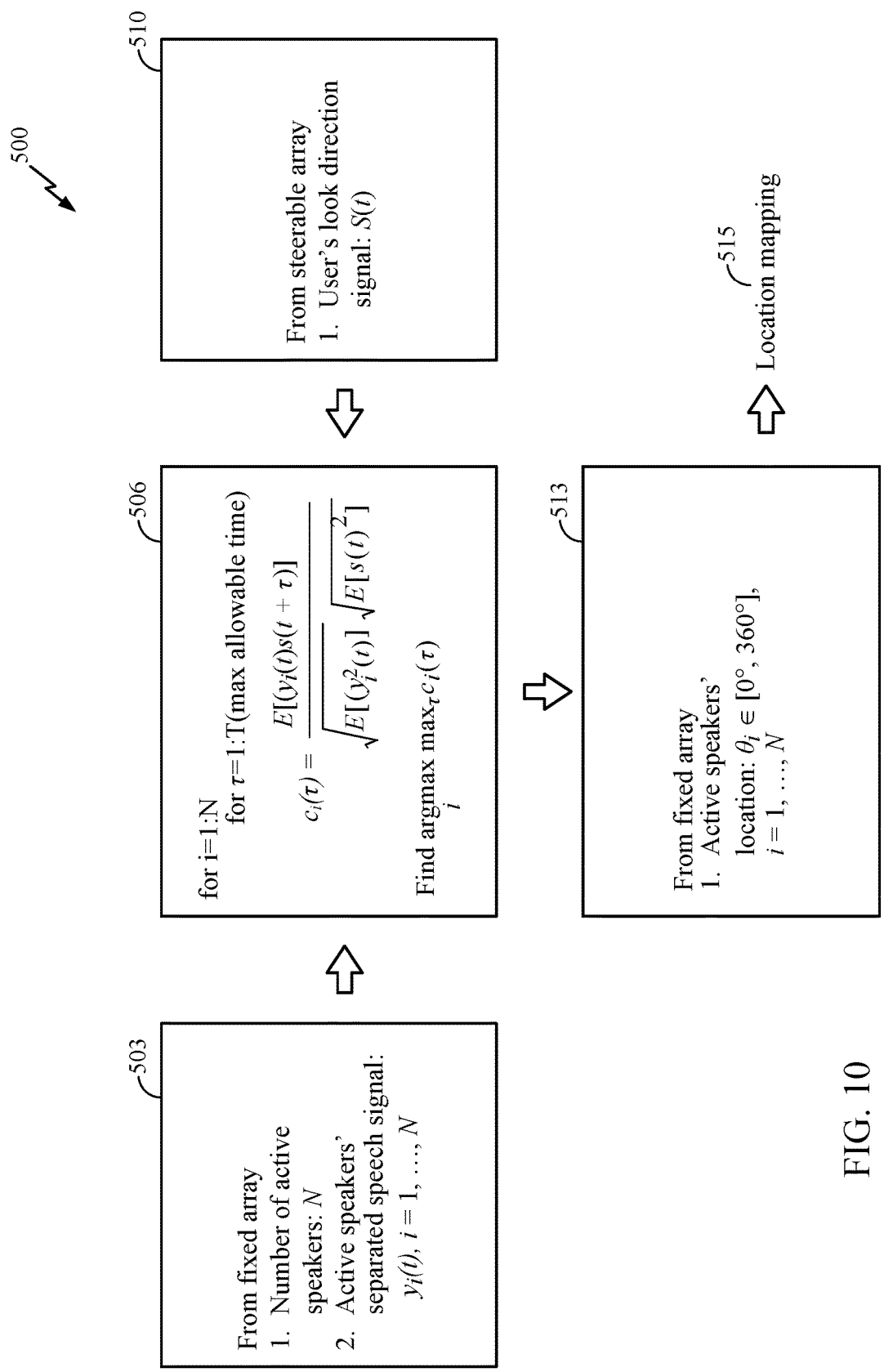
FIG. 10 is an operational flow of an implementation of a method of a measuring similarity using cross-correlation.

FIG. 10 is an operational flow of an implementation of a method 500, and uses cross-correlation as an exemplary measure although any similarity measurement technique may be used. At 503, the fixed microphone array provides a number of active speakers N and the active speakers' separated speech signals. One signal (the sound) is received by the fixed microphone array. The output of the fixed microphone array comprises beams, one beam corresponding to each participant. Thus, a separate output is associated with each participant. At 510, the steerable microphone array provides the user's look direction. For each user, the individual user's output is correlated with each of the beamforms (or other spatially filtered output) that are outputted from the fixed microphone array.

Location mapping may be generated using this information, at 515. Information pertaining to when a user turns to someone and looks at them may be leveraged. A well known classic correlation equation, such as that shown at 506, may be used as shown, where E is equal to the expectation value and c is the correlation value. Whenever there is a maximum peak, that is the angle of strong correlation. In an implementation, the maximum allowable time shift may be predetermined using a physical constraint or system complexity. For example, the time delay between steerable microphones and fixed microphones can be measured and used, when only the user, who wears the steerable array, is active. Note that the conventional frame length 20 ms corresponds to almost 7 meters. The angle θ is the relative angle at which the active speaker is located relative to the listening user. The angle θ may be determined between the fixed array and the steerable array, at 513.

Figure 11:
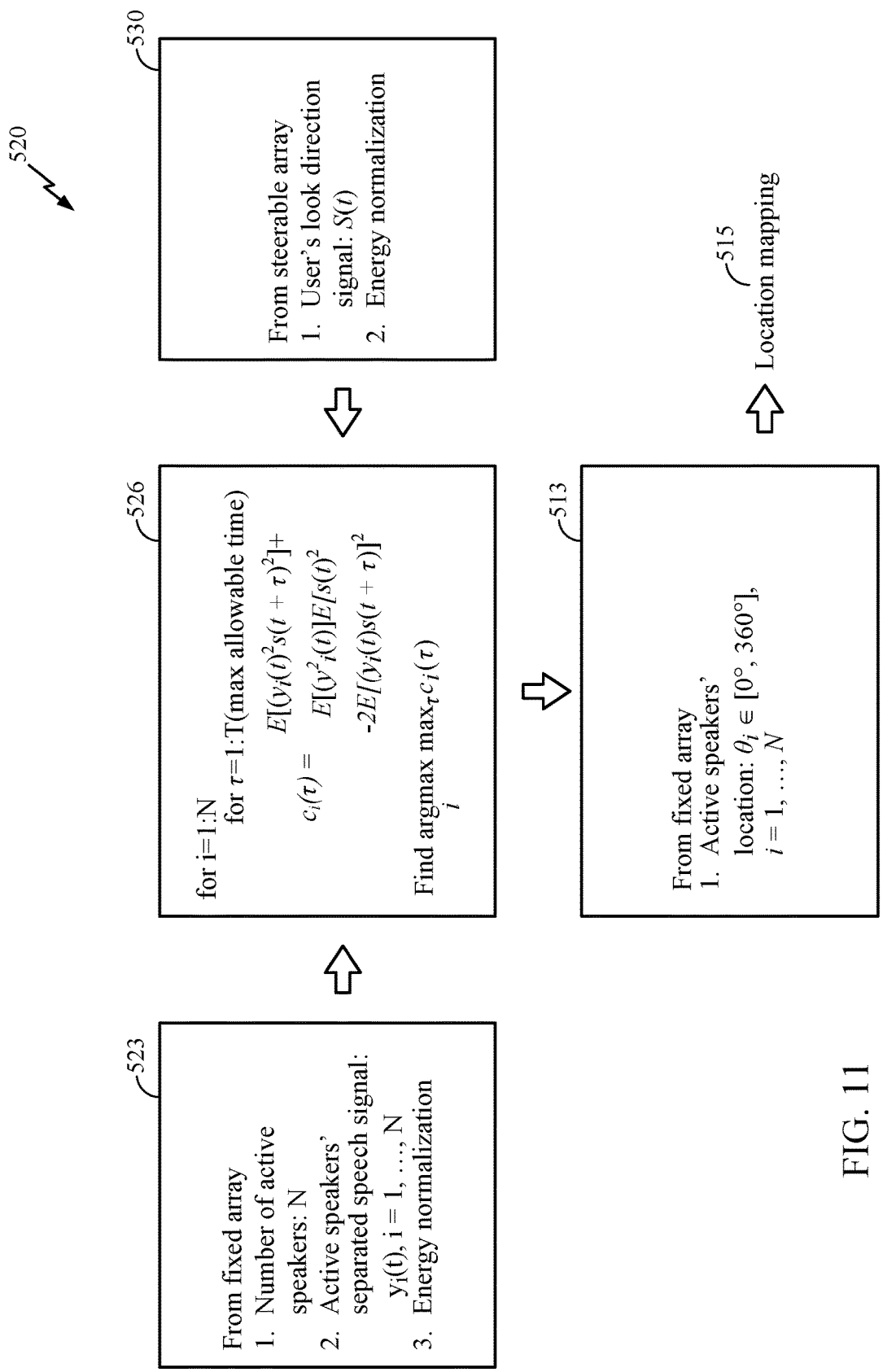
FIG. 11 is an operational flow of an implementation of a method of measuring similarity using cross-cumulant.

FIG. 11 is an operational flow of an implementation of a method 520 of measuring similarity, and uses cross-cumulant as an exemplary measure although any similarity measurement technique may be used. The fixed microphone array provides a number of active speakers N and the active speakers' separated speech signals, at 523. One signal (the sound) is received by the fixed microphone array. The output of the fixed microphone array comprises beams, one beam corresponding to each participant. Thus, a separate output is associated with each participant. The steerable microphone array provides the user's look direction, at 530. For each user, the individual user's output is correlated with each of the beamforms (or other spatially filtered output) that is outputted from the fixed microphone array.

Location mapping may be generated using this information, at 525. Information pertaining to when a user turns to someone and looks at them may be leveraged. A well known classic cumulant equation, shown at 526, may be used as shown, where E is equal to the expectation value and c is the correlation value. Whenever there is a maximum peak, that is the angle of strong correlation. The angle θ is the relative angle at which the active speaker is located relative to the listening user. The angle θ may be determined between the fixed array and the steerable array, at 513.

It is noted that any similarity or correlation technique may be used. Regarding a possible similarity measure, virtually any distance metric(s) may be used such as, but not limited to the well known techniques of: (1) least square fit with allowable time adjustment: time-domain or frequency-domain; (2) feature based approach: using linear prediction coding (LPC) or mel-frequency cepstral coefficients (MFCC); and (3) higher order based approach: cross-cumulant, empirical Kullback-Leibler Divergence, or Itakura-Saito distance.

Figure 12:
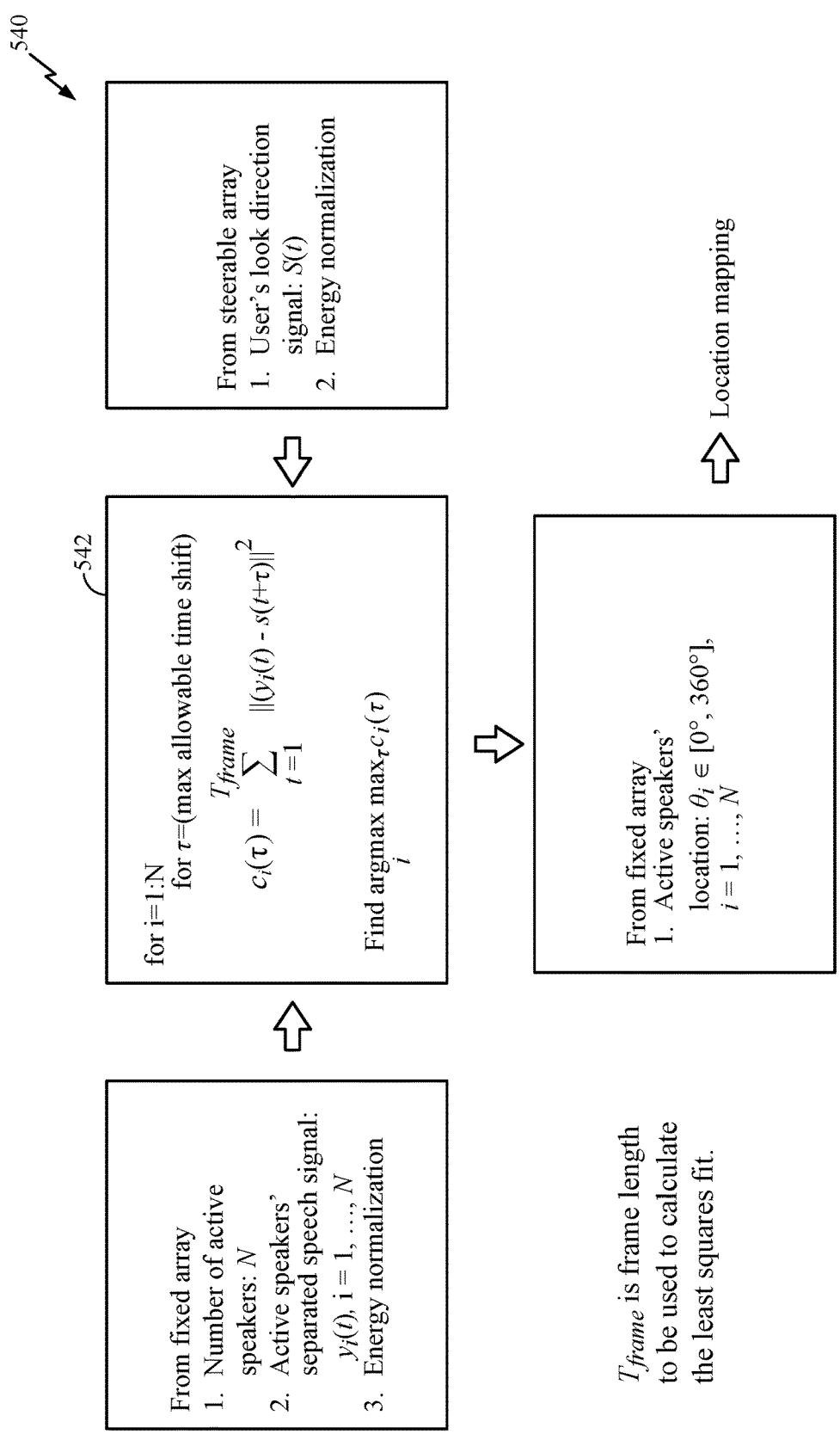
FIG. 12 is an operational flow of an implementation of a method of measuring similarity using time-domain least squares fit.
Figure 13:
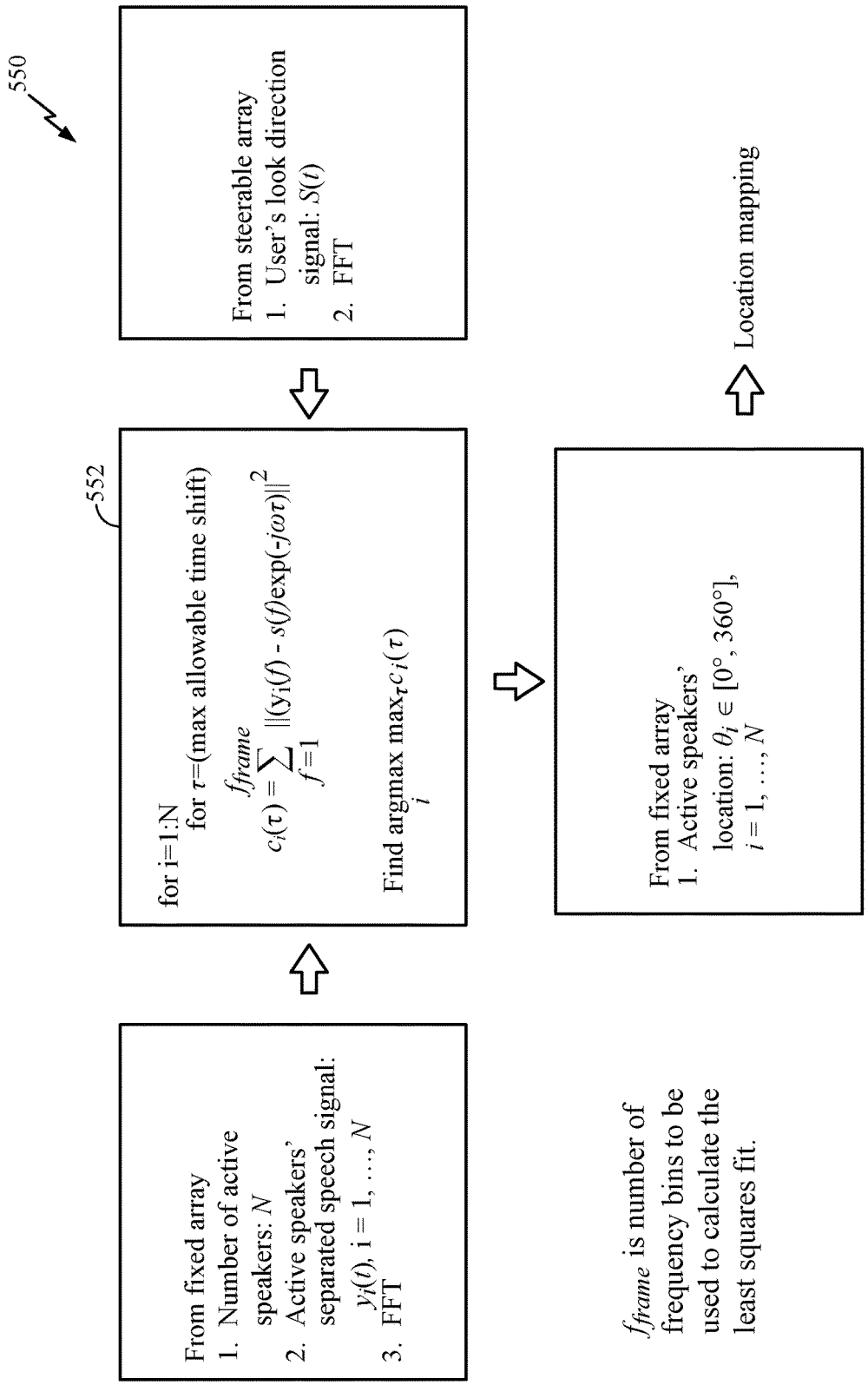
FIG. 13 is an operational flow of an implementation of a method of measuring similarity using frequency-domain least squares fit.

FIG. 12 is an operational flow of an implementation of a method 540 of measuring similarity using time-domain least squares fit, and FIG. 13 is an operational flow of an implementation of a method 550 of measuring similarity using frequency-domain least squares fit. The method 540, using a time-domain least squares fit, is similar to the method 520 of FIG. 11 described above, except that instead of using a cumulant equation of 526, a time domain equation shown at 542 may be used as shown. Similarly, the method 550 is similar to the method 520 of FIG. 11 but instead of using energy normalization, uses a fast Fourier transform (FFT) in conjunction with the frequency domain equation shown at 552.

Figure 14:
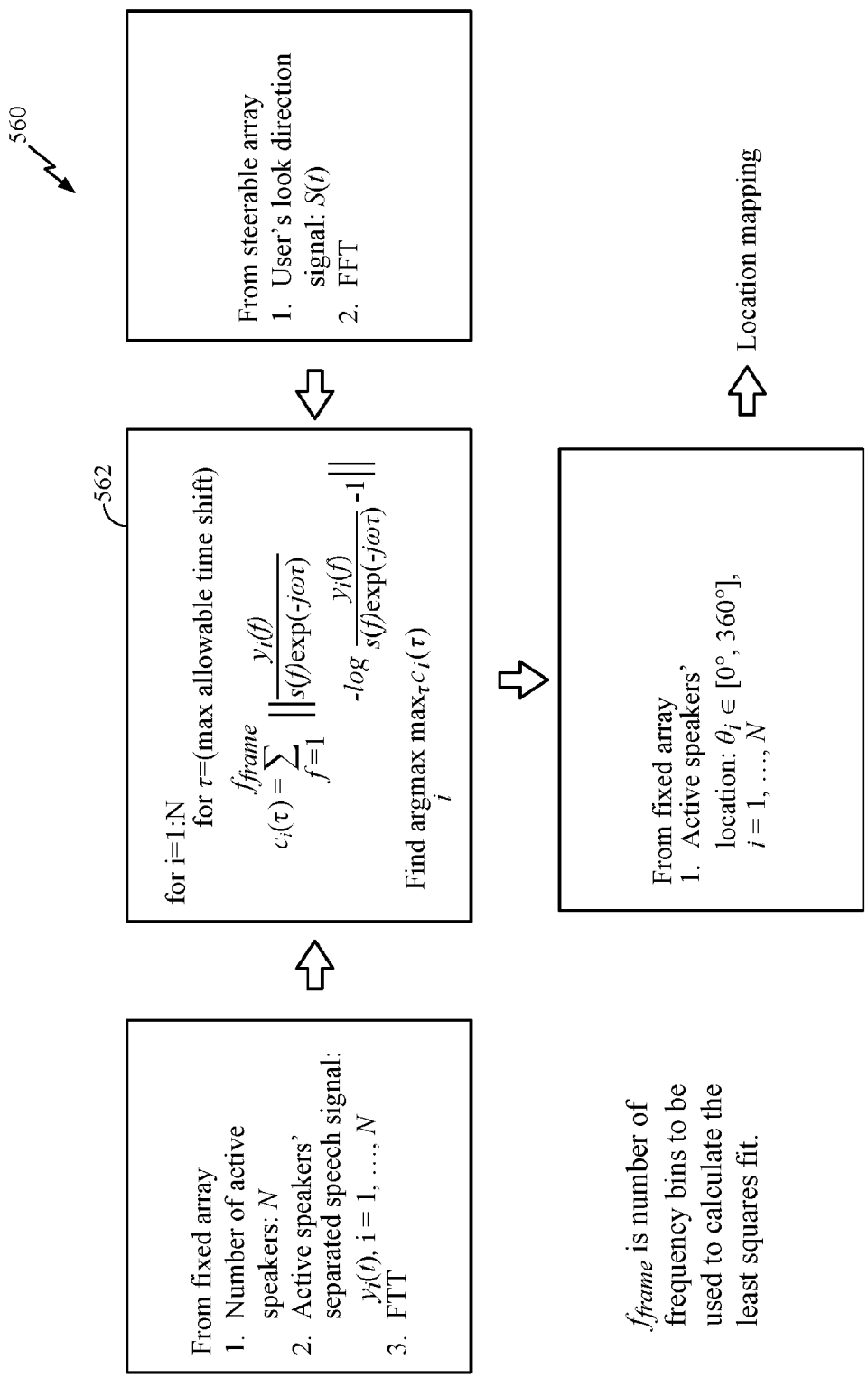
FIG. 14 is an operational flow of an implementation of a method of measuring similarity using Itakura-Saito distance.
Figure 15:
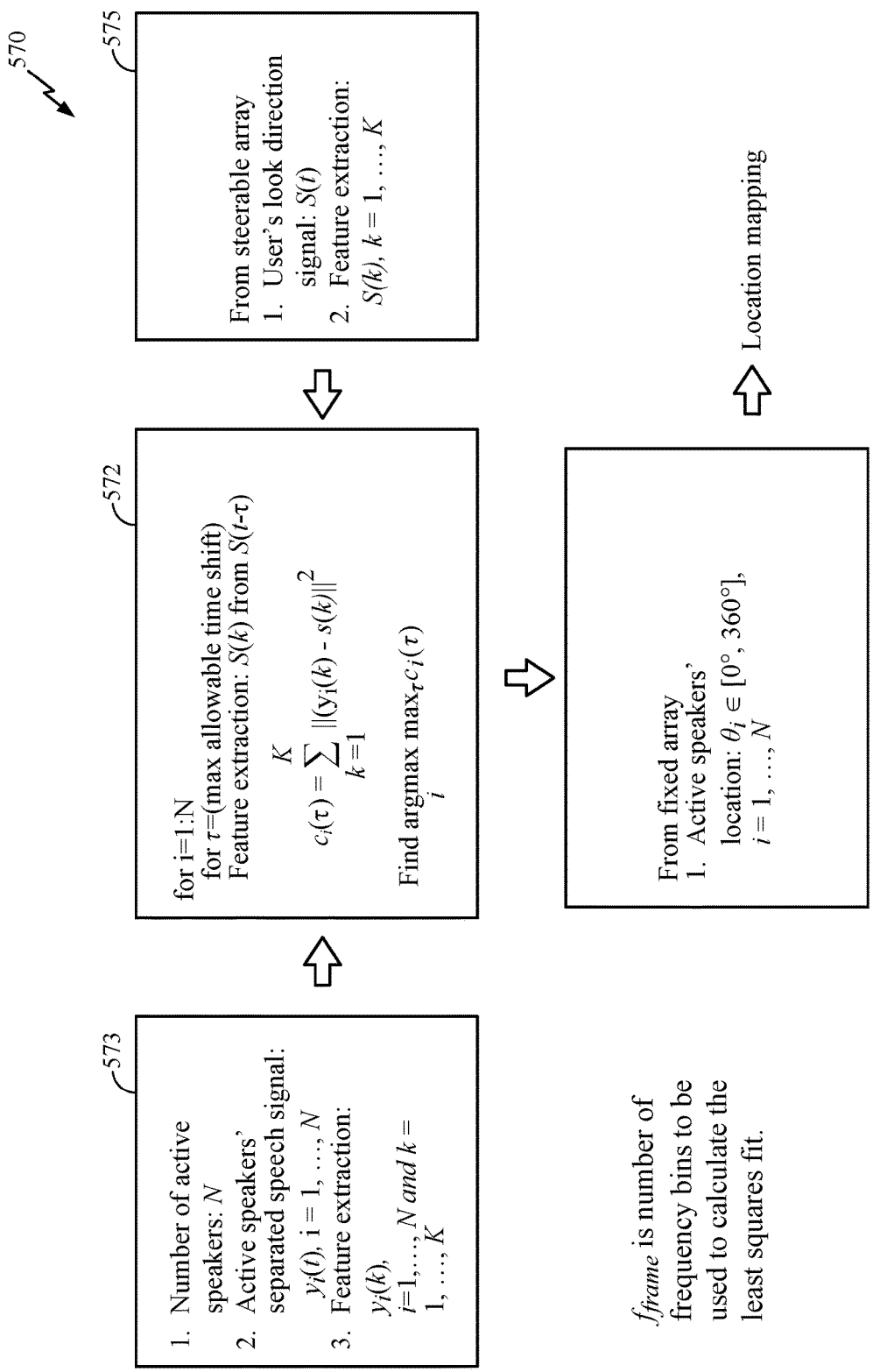
FIG. 15 is an operational flow of an implementation of a method of measuring similarity using a feature based approach.

FIG. 14 is an operational flow of an implementation of a method 560 of measuring similarity using Itakura-Saito distance. This technique is similar to the FFT technique of FIG. 13, but uses the equation shown at 562. FIG. 15 is an operational flow of an implementation of a method 570 of measuring similarity using a feature based approach. Feature extraction is performed, as shown at 573 and 575, and used in conjunction with the other operations 503, 510, 513, and 515 of FIG. 10, and the equation shown at 572.

In an implementation, the correlation or similarity between the audio beams of the separated speakers of the fixed microphone array and the outputs of the steerable microphone arrays may be used to zoom into a targeted speaker. This type of collaborative zooming may provide a user interface for zooming into a desired speaker.

In other words, collaborative zooming may be performed wherein a user interface is provided for multiple users with multiple devices for zooming into a target speaker by just looking at the target speaker. Beamforming may be produced at the targeted person via either the headsets or handsets such that all available resources of multiple devices can be combined for collaborative zooming, thereby enhancing the look direction of the targeted person.

For example, a user may look at a target person, and beamforming may be produced at the targeted person by either using the headset or a handset (whichever is closer to the target person). This may be achieved by using a device that includes a hidden camera with two microphones. When multiple users of multiple devices look at the target person, the camera(s) can visually focus on the person. In addition, the device(s) can audibly focus (i.e., zoom in on) the person by using (e.g., all) available microphones to enhance the look direction of the target person.

Additionally, the target person can be audibly zoomed in on by nulling out other speakers and enhancing the target person's voice. The enhancement can also be done using a headset or handset, whichever is closer to the target person.

Figure 16:
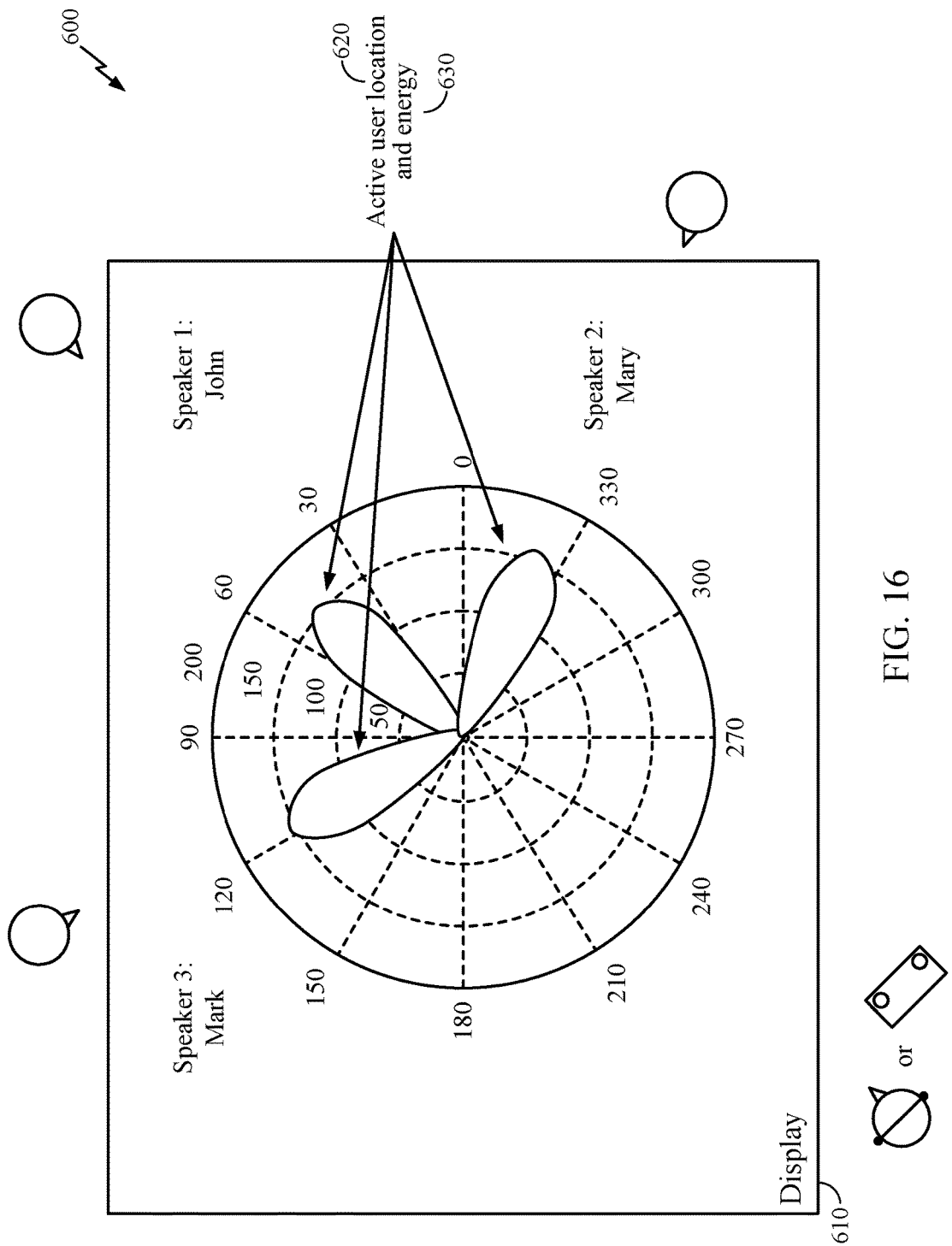
FIG. 16 shows an example user interface display.
Figure 17:
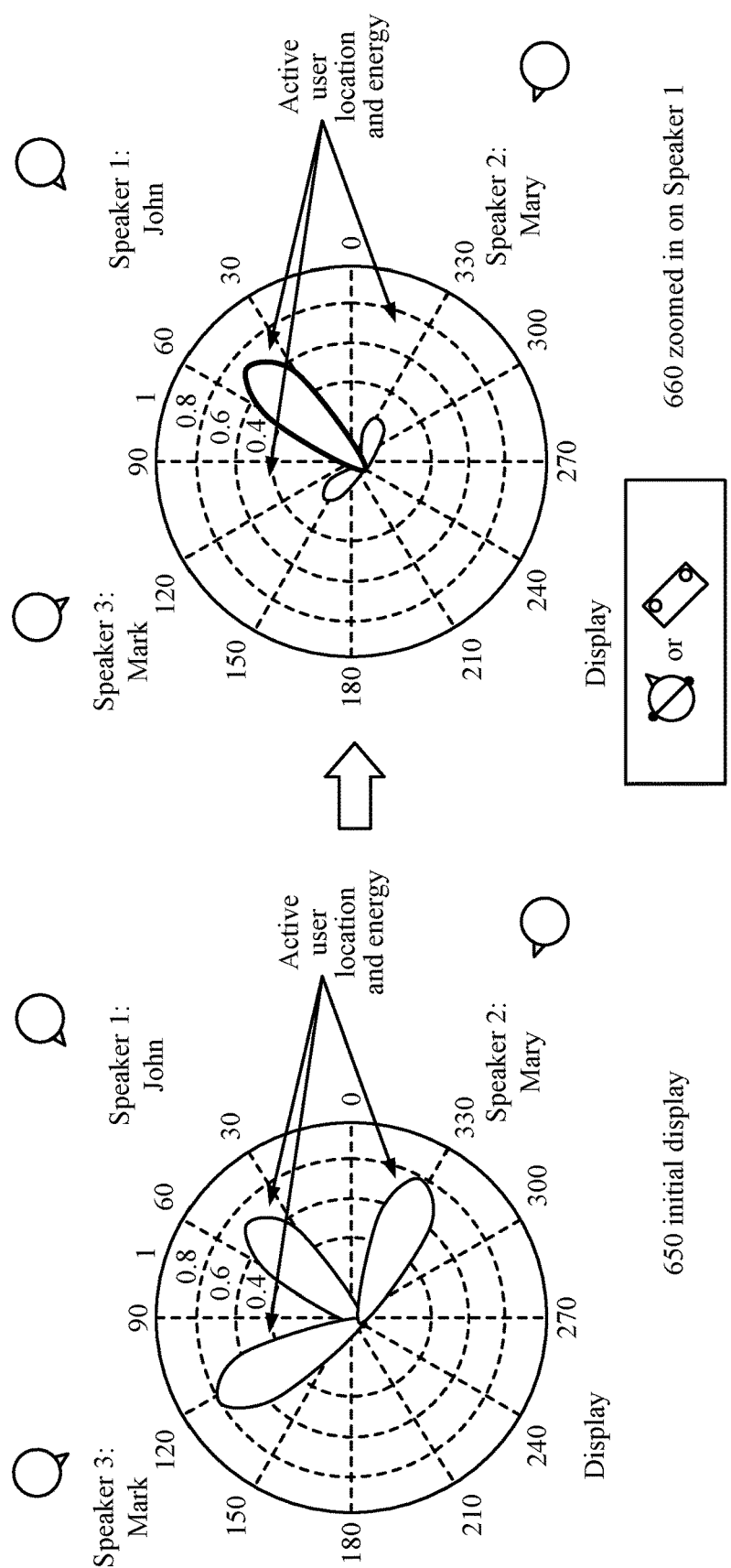
FIG. 17 shows an exemplary user interface display to show collaborative zooming on the display.

An exemplary user interface display 600 is shown in FIG. 16. The display (e.g., displayed on a mobile device display 610 or other display device) shows the active user location 620 and an associated energy 630. FIG. 17 shows an exemplary user interface display to show collaborative zooming on the display, in which Speaker 1 is zoomed in on as shown in the display 660 from the initial display 650.

Figure 18:
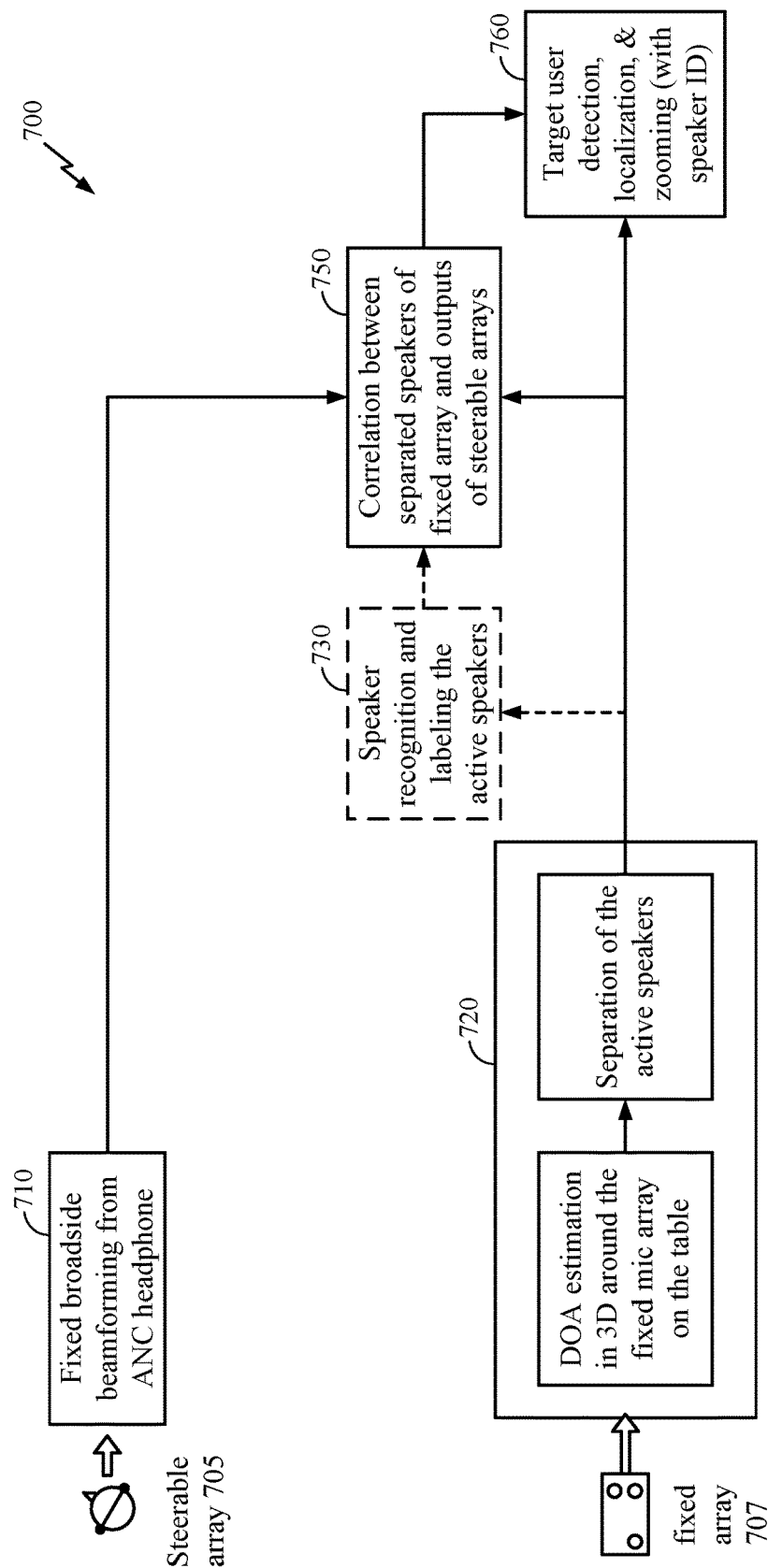
FIG. 18 is an operational flow of an implementation of a method for zooming into a target participant.

FIG. 18 is an operational flow of an implementation of a method 700 for zooming into a target person. As in FIG. 3, a steerable array 705 (in an ANC headset) provides fixed broadside beamforming at 710, in which a beamformed output is generated in the user look direction (i.e., in the direction the user of the steerable array is looking). A fixed microphone array 707 (such as in a mobile device) with an associated processor performs a DOA estimation in three dimensions around the fixed microphone array and separates the active speakers, at 720. The number of active speakers is determined, and a separate output for each active speaker (identified by an identification number for example) is generated.

In an implementation, speaker recognition and labeling of the active speakers may be performed at 730. At 750, a correlation or similarity is determined between the separated speakers of the fixed array and the outputs of the steerable arrays. Using the correlation or similarity measurement and the speakers' IDs, a target user can be detected, localized, and zoomed into, at 760.

The user can be replaced with a device, such as a hidden camera with two microphones, and just by looking at the targeted person, the targeted person can be focused on with zooming by audition as well as by vision.

A camcorder application with multiple devices is contemplated. The look direction is known, and all available microphones of other devices may be used to enhance the look direction source.

In an implementation, the correlation or similarity between the audio beams of the separated speakers of the fixed array and the outputs of steerable arrays may be used to adaptively form a better beam for a targeted speaker. In this manner, the fixed microphones beamformer may be adaptively refined, such that new look directions can be adaptively generated by a fixed beamformer.

For example, the headset microphone array's beamformer output can be used as a reference to refine the look direction of fixed microphone array's beamformer. The correlation or similarity between the headset beamformer output and the current fixed microphone array beamformer output may be compared with the correlation or similarity between the headset beamformer output and the fixed microphone array beamformer outputs with slightly moved look directions.

Figure 19:
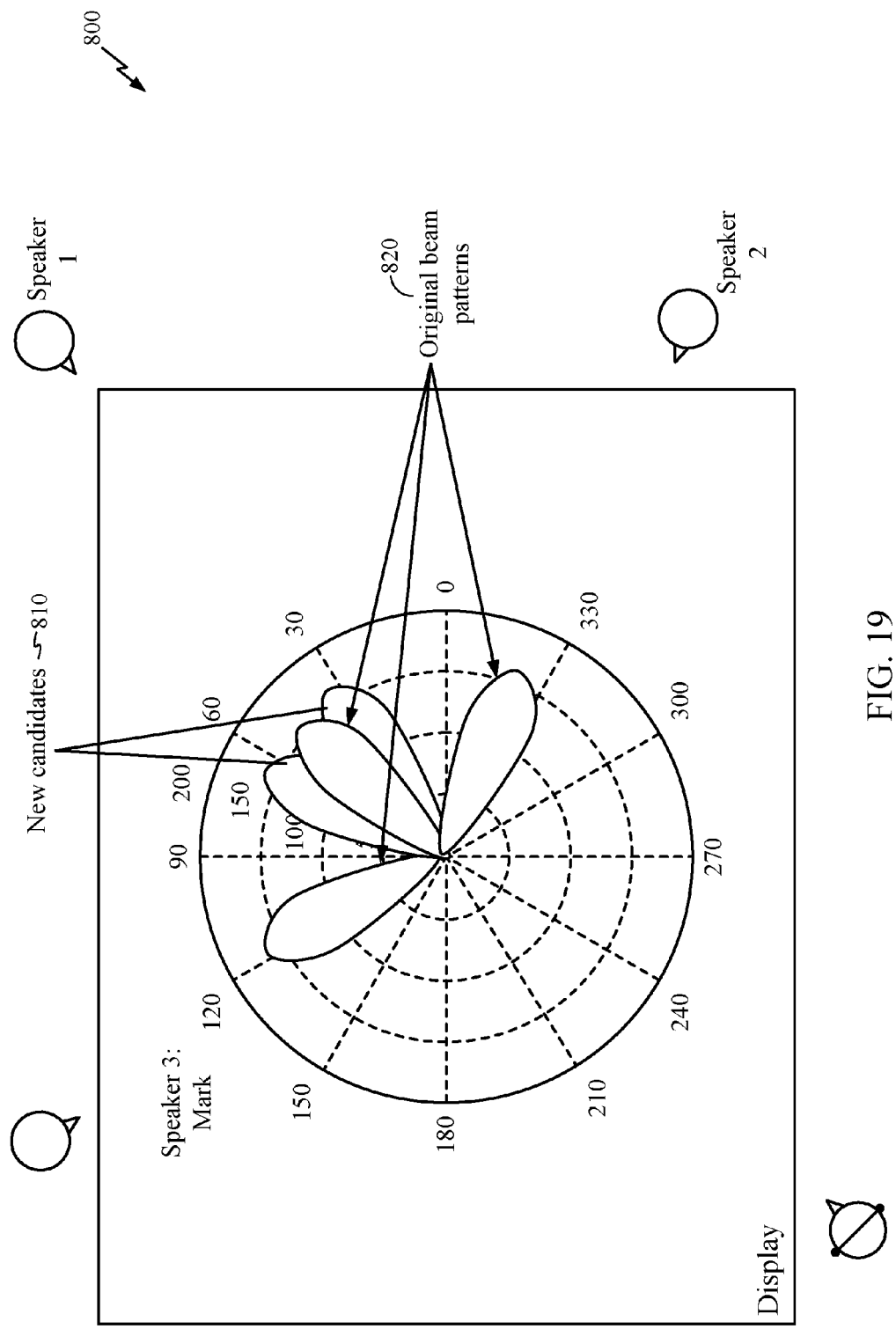
FIG. 19 shows an example user interface display with additional candidate look directions.

FIG. 19 shows an example user interface display 800 with additional candidate look directions 810. By leveraging the correlation or similarity between the headset beamformer output with the original fixed microphone beamformer outputs 820, as shown in FIG. 19, new candidate look directions by a fixed beamformer can be generated. Using this technique, the headset microphone beamformer output can be used as a reference to refine the look direction of the fixed microphone beamformer. For example, speaker 1 in FIG. 19 may be speaking, and as he speaks new candidate look directions can be adaptively formed.

Figure 20:
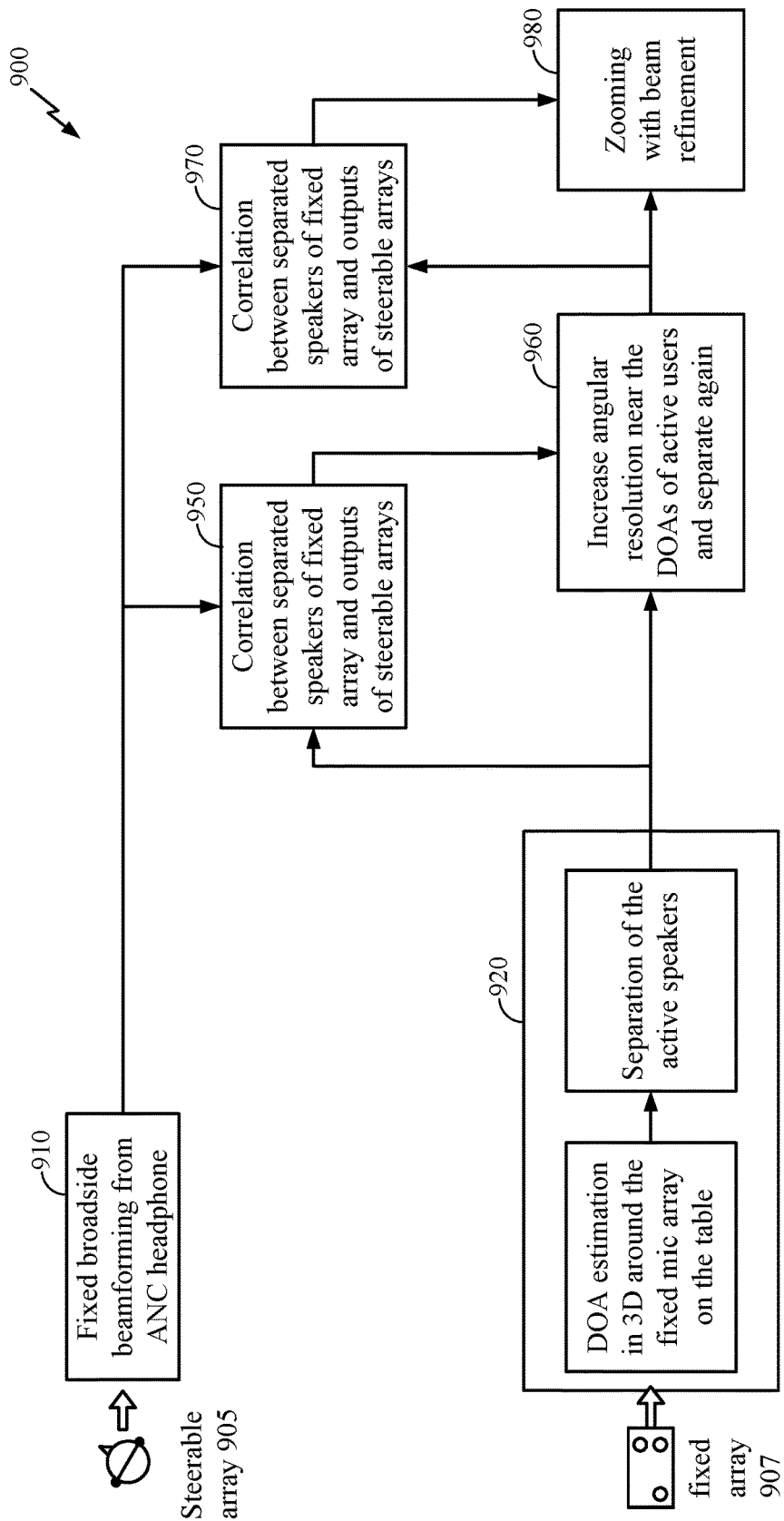
FIG. 20 is an operational flow of an implementation of a method for adaptively refining beams for a targeted speaker.

FIG. 20 is an operational flow of an implementation of a method 900 for adaptively refining beams for a targeted speaker. As in FIG. 3, a steerable array 905 (for example, in an ANC headset) provides fixed broadside beamforming at 910, in which a beamformed output is generated in the user look direction (i.e., in the direction the user of the steerable array is looking). A fixed microphone array 907 (such as in a mobile device) with an associated processor performs a DOA estimation in three dimensions around the fixed microphone array and separates the active speakers, at 920. The number of active speakers is determined, and a separate output for each active speaker (identified by an identification number for example) is generated. As with FIG. 18, a correlation or similarity is determined between the separated speakers of the fixed array and the outputs of the steerable arrays, at 950.

Continuing with FIG. 20, the determined correlation or similarity is used to increase the angular resolution near the DOAs of the active users, and a separation of the active speakers is again performed, at 960. Using the increased angular resolution and the outputs of the steerable arrays, another correlation or similarity measure is determined between the separated speakers of the fixed array and the outputs of the steerable arrays, at 970. This correlation or similarity measure may then be used to zoom into a target speaker, at 980.

It is a challenge to provide a method for estimating a three-dimensional direction of arrival (DOA) for each frame of an audio signal for concurrent multiple sound events that is sufficiently robust under background noise and reverberation. Robustness can be obtained by maximizing the number of reliable frequency bins. It may be desirable for such a method to be suitable for arbitrarily shaped microphone array geometry, such that specific constraints on microphone geometry may be avoided. A pair-wise 1-D approach as described herein can be appropriately incorporated into any geometry.

A solution may be implemented for such a generic speakerphone application or far-field application. Such an approach may be implemented to operate without a microphone placement constraint. Such an approach may also be implemented to track sources using available frequency bins up to Nyquist frequency and down to a lower frequency (e.g., by supporting use of a microphone pair having a larger inter-microphone distance). Rather than being limited to a single pair for tracking, such an approach may be implemented to select a best pair among all available pairs. Such an approach may be used to support source tracking even in a far-field scenario, up to a distance of three to five meters or more, and to provide a much higher DOA resolution. Other potential features include obtaining an exact 2-D representation of an active source. For best results, it may be desirable that each source is a sparse broadband audio source, and that each frequency bin is mostly dominated by no more than one source.

Figure 21:
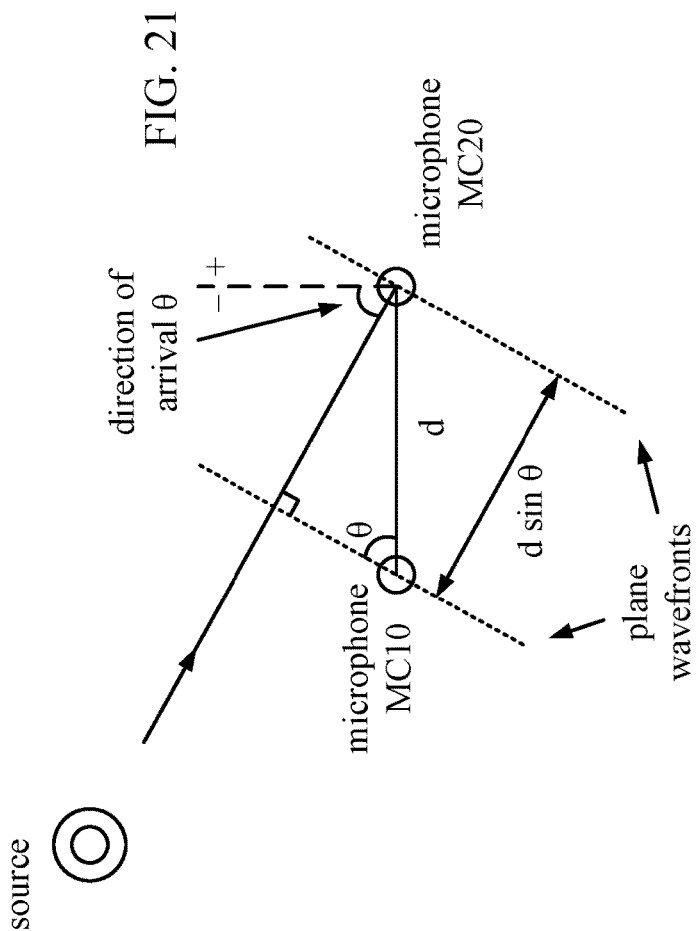
FIG. 21 shows a far-field model of plane wave propagation relative to a microphone pair.

For a signal received by a pair of microphones directly from a point source in a particular DOA, the phase delay differs for each frequency component and also depends on the spacing between the microphones. The observed value of the phase delay at a particular frequency bin may be calculated as the inverse tangent of the ratio of the imaginary term of the complex FFT coefficient to the real term of the complex FFT coefficient. As shown in FIG. 21, the phase delay value $\Delta\varphi_f$ at a particular frequency f may be related to source DOA under a far-field (i.e., plane-wave) assumption as $$\Delta\varphi_f = 2\pi f \frac{d \sin\theta}{c},$$

where d denotes the distance between the microphones (in m), θ denotes the angle of arrival (in radians) relative to a direction that is orthogonal to the array axis, f denotes frequency (in Hz), and c denotes the speed of sound (in m/s). For the ideal case of a single point source with no reverberation, the ratio of phase delay to frequency Δφ/f will have the same value $$2\pi \frac{d \sin\theta}{c}$$

over all frequencies.

Such an approach is limited in practice by the spatial aliasing frequency for the microphone pair, which may be defined as the frequency at which the wavelength of the signal is twice the distance d between the microphones. Spatial aliasing causes phase wrapping, which puts an upper limit on the range of frequencies that may be used to provide reliable phase delay measurements for a particular microphone pair. FIG. 23 shows plots of unwrapped phase delay vs. frequency for four different DOAs, and FIG. 24 shows plots of wrapped phase delay vs. frequency for the same DOAs, where the initial portion of each plot (i.e., until the first wrapping occurs) are shown in bold. Attempts to extend the useful frequency range of phase delay measurement by unwrapping the measured phase are typically unreliable.

Figure 25:
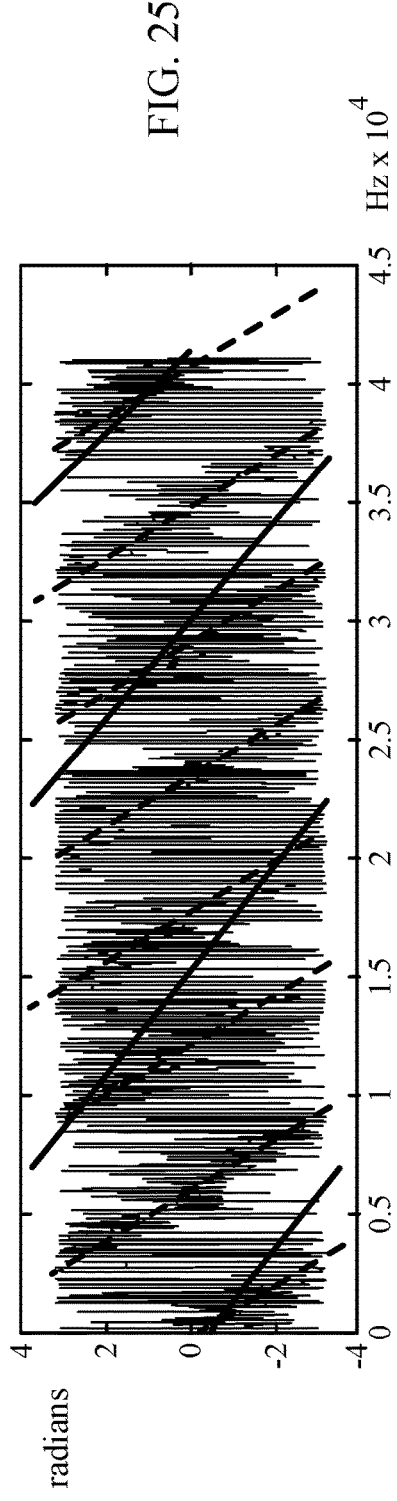
FIG. 25 shows an example of measured phase delay values and calculated values for two DOA candidates.

Instead of phase unwrapping, a proposed approach compares the phase delay as measured (e.g., wrapped) with pre-calculated values of wrapped phase delay for each of an inventory of DOA candidates. FIG. 25 shows such an example that includes angle-vs.-frequency plots of the (noisy) measured phase delay values (gray) and the phase delay values for two DOA candidates of the inventory (solid and dashed lines), where phase is wrapped to the range of pi to minus pi. The DOA candidate that is best matched to the signal as observed may then be determined by calculating, for each DOA candidate $\theta_i$, a corresponding error $e_i$ between the phase delay values $\Delta\varphi_{i,f}$ for the i-th DOA candidate and the observed phase delay values $\Delta\varphi_{ob,f}$ over a range of frequency components f, and identifying the DOA candidate value that corresponds to the minimum error. In one example, the error $e_i$ is expressed as $$\|\Delta\varphi_{ob,f} - \Delta\varphi_{i,f}\|_f^2,$$

i.e. as the sum $$e_i = \sum_{f \in F} (\Delta\varphi_{ob,f} - \Delta\varphi_{i,f})^2$$

of the squared differences between the observed and candidate phase delay values over a desired range or other set F of frequency components. The phase delay values $\Delta\varphi_{i,f}$ for each DOA candidate $\theta_i$ may be calculated before run-time (e.g., during design or manufacture), according to known values of c and d and the desired range of frequency components f, and retrieved from storage during use of the device. Such a pre-calculated inventory may be configured to support a desired angular range and resolution (e.g., a uniform resolution, such as one, two, five, or ten degrees; or a desired nonuniform resolution) and a desired frequency range and resolution (which may also be uniform or nonuniform).

It may be desirable to calculate the error $e_i$ across as many frequency bins as possible to increase robustness against noise. For example, it may be desirable for the error calculation to include terms from frequency bins that are beyond the spatial aliasing frequency. In a practical application, the maximum frequency bin may be limited by other factors, which may include available memory, computational complexity, strong reflection by a rigid body at high frequencies, etc.

A speech signal is typically sparse in the time-frequency domain. If the sources are disjoint in the frequency domain, then two sources can be tracked at the same time. If the sources are disjoint in the time domain, then two sources can be tracked at the same frequency. It may be desirable for the array to include a number of microphones that is at least equal to the number of different source directions to be distinguished at any one time. The microphones may be omnidirectional (e.g., as may be typical for a cellular telephone or a dedicated conferencing device) or directional (e.g., as may be typical for a device such as a set-top box).

Such multichannel processing is generally applicable, for example, to source tracking for speakerphone applications. Such a technique may be used to calculate a DOA estimate for a frame of the received multichannel signal. Such an approach may calculate, at each frequency bin, the error for each candidate angle with respect to the observed angle, which is indicated by the phase delay. The target angle at that frequency bin is the candidate having the minimum error. In one example, the error is then summed across the frequency bins to obtain a measure of likelihood for the candidate. In another example, one or more of the most frequently occurring target DOA candidates across all frequency bins is identified as the DOA estimate (or estimates) for a given frame.

Such a method may be applied to obtain instantaneous tracking results (e.g., with a delay of less than one frame). The delay is dependent on the FFT size and the degree of overlap. For example, for a 512-point FFT with a 50% overlap and a sampling frequency of 16 kHz, the resulting 256-sample delay corresponds to sixteen milliseconds. Such a method may be used to support differentiation of source directions typically up to a source-array distance of two to three meters, or even up to five meters.

The error may also be considered as a variance (i.e., the degree to which the individual errors deviate from an expected value). Conversion of the time-domain received signal into the frequency domain (e.g., by applying an FFT)

has the effect of averaging the spectrum in each bin. This averaging is even more obvious if a subband representation is used (e.g., mel scale or Bark scale). Additionally, it may be desirable to perform time-domain smoothing on the DOA estimates (e.g., by applying as recursive smoother, such as a first-order infinite-impulse-response filter).

It may be desirable to reduce the computational complexity of the error calculation operation (e.g., by using a search strategy, such as a binary tree, and/or applying known information, such as DOA candidate selections from one or more previous frames).

Even though the directional information may be measured in terms of phase delay, it is typically desired to obtain a result that indicates source DOA. Consequently, it may be desirable to calculate the error in terms of DOA rather than in terms of phase delay.

An expression of error $e_i$ in terms of DOA may be derived by assuming that an expression for the observed wrapped phase delay as a function of DOA, such as $$\Psi_{f\_wr}(\theta) = \mathrm{mod}\left(-2\pi f \frac{d \sin\theta}{c} + \pi, 2\pi\right) - \pi,$$

is equivalent to a corresponding expression for unwrapped phase delay as a function of DOA, such as $$\Psi_{f\_un}(\theta) = -2\pi f \frac{d\sin\theta}{c},$$

except near discontinuities that are due to phase wrapping. The error $e_i$ may then be expressed as $$e_i = \|\Psi_{f\_wr}(\theta_{ob}) - \Psi_{f\_wr}(\theta_i)\|_f^2 \equiv \|\Psi_{f\_un}(\theta_{ob}) - \Psi_{f\_un}(\theta_i)\|_f^2,$$

where the difference between the observed and candidate phase delay at frequency f is expressed in terms of DOA as $$\Psi_{f\_un}(\theta_{ob}) - \Psi_{f\_un}(\theta_i) = \frac{-2\pi fd}{c}(\sin\theta_{ob\_f} - \sin\theta_i).$$

Perform a Taylor series expansion to obtain the following first-order approximation:

$$\frac{-2\pi fd}{c}(\sin\theta_{ob\_f} - \sin\theta_i) \approx (\theta_{ob\_f} - \theta_i)\frac{-2\pi fd}{c}\cos\theta_i,$$

which is used to obtain an expression of the difference between the DOA $\theta_{ob\_f}$ as observed at frequency f and DOA candidate $\theta_i$:

$$(\theta_{ob\_f} - \theta_i) \cong \frac{\Psi_{f\_un}(\theta_{ob}) - \Psi_{f\_un}(\theta_i)}{\frac{2\pi fd}{c}\cos\theta_i}.$$

This expression may be used, with the assumed equivalence of observed wrapped phase delay to unwrapped phase delay, to express error $e_i$ in terms of DOA:

$$e_i = \|\theta_{ob} - \theta_i\|_f^2 \cong \frac{\|\Psi_{f\_wr}(\theta_{ob}) - \Psi_{f\_wr}(\theta_i)\|_f^2}{\left\|\frac{2\pi fd}{c}\cos\theta_i\right\|_f^2},$$

where the values of $[\Psi_{f\_wr}(\theta_{ob}), \Psi_{f\_wr}(\theta_i)]$ are defined as $[\Delta\varphi_{ob\_f}, \Delta\varphi_{i\_f}]$.

To avoid division with zero at the endfire directions ($\theta=+/90°$), it may be desirable to perform such an expansion using a second-order approximation instead, as in the following:

$$\theta_{ob} - \theta_i \cong \begin{cases} |-C/B|, & \theta_i = 0 \text{ (broadside)} \\ \left|\frac{-B+\sqrt{B^2-4AC}}{2A}\right|, & \text{otherwise} \end{cases},$$

where $A = (\pi fd\sin\theta_i)/c$, $B = (-2\pi fd\cos\theta_i)/c$, and $C = -(\Psi_{f\_un}(\theta_{ob}) - \Psi_{f\_un}(\theta_i)).$ As in the first-order example above, this expression may be used, with the assumed equivalence of observed wrapped phase delay to unwrapped phase delay, to express error $e_i$ in terms of DOA as a function of the observed and candidate wrapped phase delay values.

As shown in FIG. 27, a difference between observed and candidate DOA for a given frame of the received signal may be calculated in such manner at each of a plurality of frequencies f of the received microphone signals (e.g., $\forall f \in F$) and for each of a plurality of DOA candidates $\theta_i$. As demonstrated in FIG. 28, a DOA estimate for a given frame may be determined by summing the squared differences for each candidate across all frequency bins in the frame to obtain the error $e_i$ and selecting the DOA candidate having the minimum error. Alternatively, as demonstrated in FIG. 29, such differences may be used to identify the best-matched (i.e. minimum squared difference) DOA candidate at each frequency. A DOA estimate for the frame may then be determined as the most frequent DOA across all frequency bins.

Figure 31:
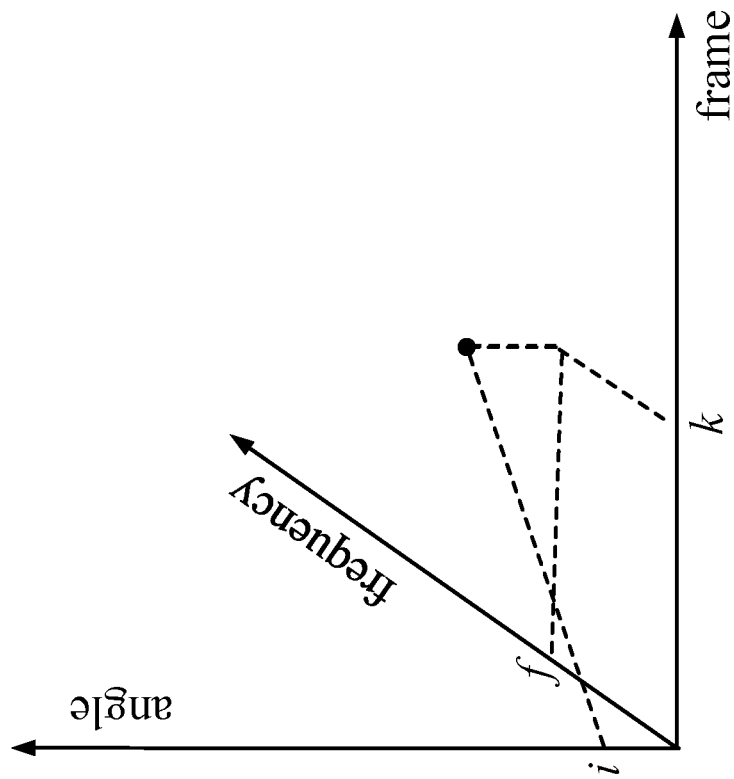
FIG. 31 shows an example of likelihood calculation.

As shown in FIG. 31, an error term may be calculated for each candidate angle i and each of a set F of frequencies for each frame k. It may be desirable to indicate a likelihood of source activity in terms of a calculated DOA difference or error. One example of such a likelihood L may be expressed, for a particular frame, frequency, and angle, as $$L(i, f, k) = \frac{1}{|\theta_{ob} - \theta_i|_{f,k}^2}. \tag{1}$$

For expression (1), an extremely good match at a particular frequency may cause a corresponding likelihood to dominate all others. To reduce this susceptibility, it may be desirable to include a regularization term $\lambda$, as in the following expression:

$$L(i, f, k) = \frac{1}{|\theta_{ob} - \theta_i|_{f,k}^2 + \lambda}. \tag{2}$$

Speech tends to be sparse in both time and frequency, such that a sum over a set of frequencies F may include results from bins that are dominated by noise. It may be desirable to include a bias term β, as in the following expression:

$$L(i, f, k) = \frac{1}{|\theta_{ob} - \theta_i|^2_{f,k} + \lambda} - \beta. \qquad (3)$$

The bias term, which may vary over frequency and/or time, may be based on an assumed distribution of the noise (e.g., Gaussian). Additionally or alternatively, the bias term may be based on an initial estimate of the noise (e.g., from a noise-only initial frame). Additionally or alternatively, the bias term may be updated dynamically based on information from noise-only frames, as indicated, for example, by a voice activity detection module.

The frequency-specific likelihood results may be projected onto a (frame, angle) plane to obtain a DOA estimation per frame $$\theta_{est\_k} = \max_i \sum_{f \in F} L(i, f, k)$$

that is robust to noise and reverberation because only target dominant frequency bins contribute to the estimate. In this summation, terms in which the error is large have values that approach zero and thus become less significant to the estimate. If a directional source is dominant in some frequency bins, the error value at those frequency bins will be nearer to zero for that angle. Also, if another directional source is dominant in other frequency bins, the error value at the other frequency bins will be nearer to zero for the other angle.

The likelihood results may also be projected onto a (frame, frequency) plane to indicate likelihood information per frequency bin, based on directional membership (e.g., for voice activity detection). This likelihood may be used to indicate likelihood of speech activity. Additionally or alternatively, such information may be used, for example, to support time- and/or frequency-selective masking of the received signal by classifying frames and/or frequency components according to their direction of arrival.

An anglogram representation is similar to a spectrogram representation. An anglogram may be obtained by plotting, at each frame, a likelihood of the current DOA candidate at each frequency A microphone pair having a large spacing is typically not suitable for high frequencies, because spatial aliasing begins at a low frequency for such a pair. A DOA estimation approach as described herein, however, allows the use of phase delay measurements beyond the frequency at which phase wrapping begins, and even up to the Nyquist frequency (i.e., half of the sampling rate). By relaxing the spatial aliasing constraint, such an approach enables the use of microphone pairs having larger inter-microphone spacings. As an array with a large inter-microphone distance typically provides better directivity at low frequencies than an array with a small inter-microphone distance, use of a larger array typically extends the range of useful phase delay measurements into lower frequencies as well.

Figure 22:
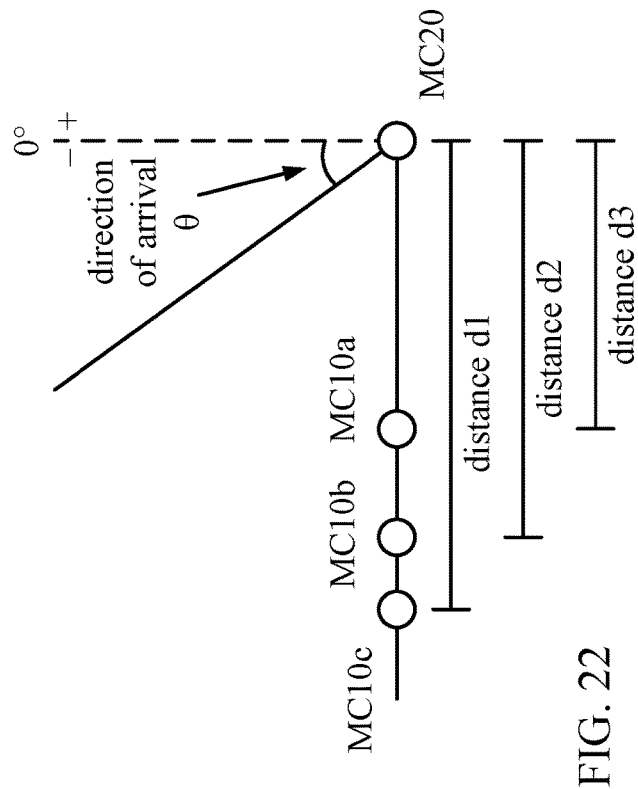
FIG. 22 shows multiple microphone pairs in a linear array.
Figure 26:
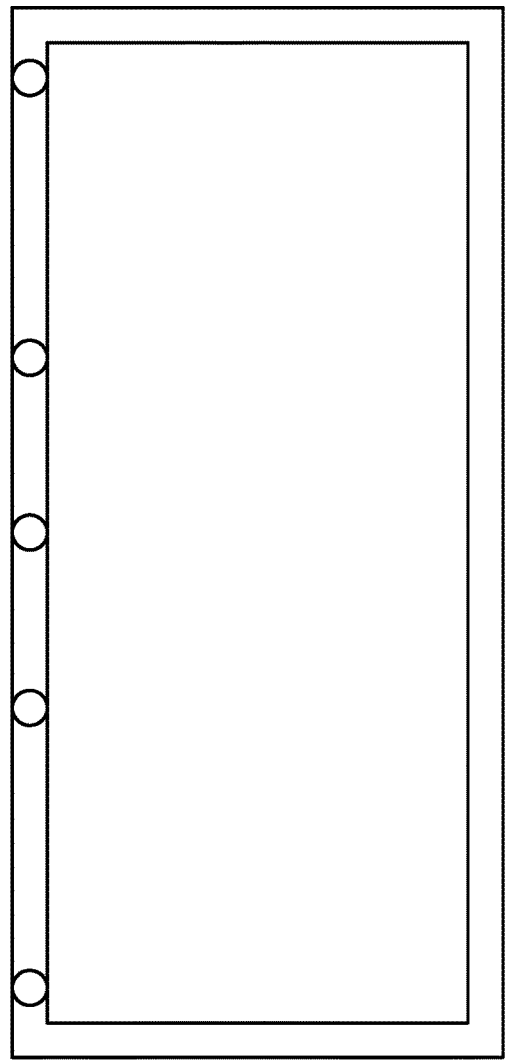
FIG. 26 shows a linear array of microphones arranged along the top margin of a television screen.

The DOA estimation principles described herein may be extended to multiple microphone pairs in a linear array (e.g., as shown in FIG. 22). One example of such an application for a far-field scenario is a linear array of microphones arranged along the margin of a television or other large-format video display screen (e.g., as shown in FIG. 26). It may be desirable to configure such an array to have a nonuniform (e.g., logarithmic) spacing between microphones, as in the examples of FIGS. 22 and 26.

For a far-field source, the multiple microphone pairs of a linear array will have essentially the same DOA. Accordingly, one option is to estimate the DOA as an average of the DOA estimates from two or more pairs in the array. However, an averaging scheme may be affected by mismatch of even a single one of the pairs, which may reduce DOA estimation accuracy. Alternatively, it may be desirable to select, from among two or more pairs of microphones of the array, the best microphone pair for each frequency (e.g., the pair that gives the minimum error $e_i$ at that frequency), such that different microphone pairs may be selected for different frequency bands. At the spatial aliasing frequency of a microphone pair, the error will be large. Consequently, such an approach will tend to automatically avoid a microphone pair when the frequency is close to its wrapping frequency, thus avoiding the related uncertainty in the DOA estimate. For higher-frequency bins, a pair having a shorter distance between the microphones will typically provide a better estimate and may be automatically favored, while for lower-frequency bins, a pair having a larger distance between the microphones will typically provide a better estimate and may be automatically favored. In the four-microphone example shown in FIG. 22, six different pairs of microphones are possible $$\left(\text{i.e.,} \binom{4}{2} = 6\right).$$

Figure 30:
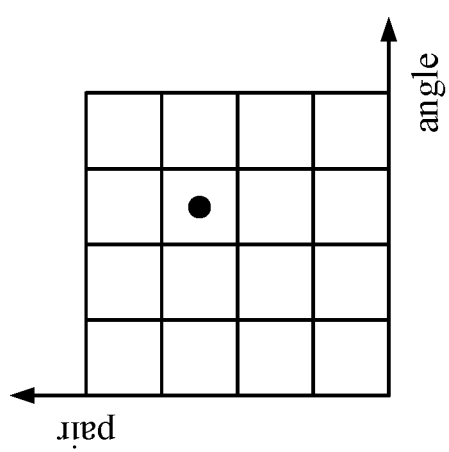
FIG. 30 shows an example of using calculated likelihoods to identify a best microphone pair and best DOA candidate for a given frequency.

In one example, the best pair for each axis is selected by calculating, for each frequency f, P×I values, where P is the number of pairs, I is the size of the inventory, and each value $e_{pi}$ is the squared absolute difference between the observed angle $\theta_{pf}$ (for pair p and frequency f) and the candidate angle $\theta_{if}$. For each frequency f, the pair p that corresponds to the lowest error value $e_{pi}$ is selected. This error value also indicates the best DOA candidate $\theta_i$ at frequency f (as shown in FIG. 30).

The signals received by a microphone pair may be processed as described herein to provide an estimated DOA, over a range of up to 180 degrees, with respect to the axis of the microphone pair. The desired angular span and resolution may be arbitrary within that range (e.g. uniform (linear) or nonuniform (nonlinear), limited to selected sectors of interest, etc.). Additionally or alternatively, the desired frequency span and resolution may be arbitrary (e.g. linear, logarithmic, mel-scale, Bark-scale, etc.).

In the model shown in FIG. 22, each DOA estimate between 0 and +/−90 degrees from a microphone pair indicates an angle relative to a plane that is orthogonal to the axis of the pair. Such an estimate describes a cone around the axis of the pair, and the actual direction of the source along the surface of this cone is indeterminate. For example, a DOA estimate from a single microphone pair does not indicate whether the source is in front of or behind the microphone pair. Therefore, while more than two microphones may be used in a linear array to improve DOA estimation performance across a range of frequencies, the range of DOA estimation supported by a linear array is typically limited to 180 degrees.

The DOA estimation principles described herein may also be extended to a two-dimensional (2-D) array of microphones. For example, a 2-D array may be used to extend the range of source DOA estimation up to a full 360° (e.g., providing a similar range as in applications such as radar and biomedical scanning). Such an array may be used in a speakerphone application, for example, to support good performance even for arbitrary placement of the telephone relative to one or more sources.

Figure 32:
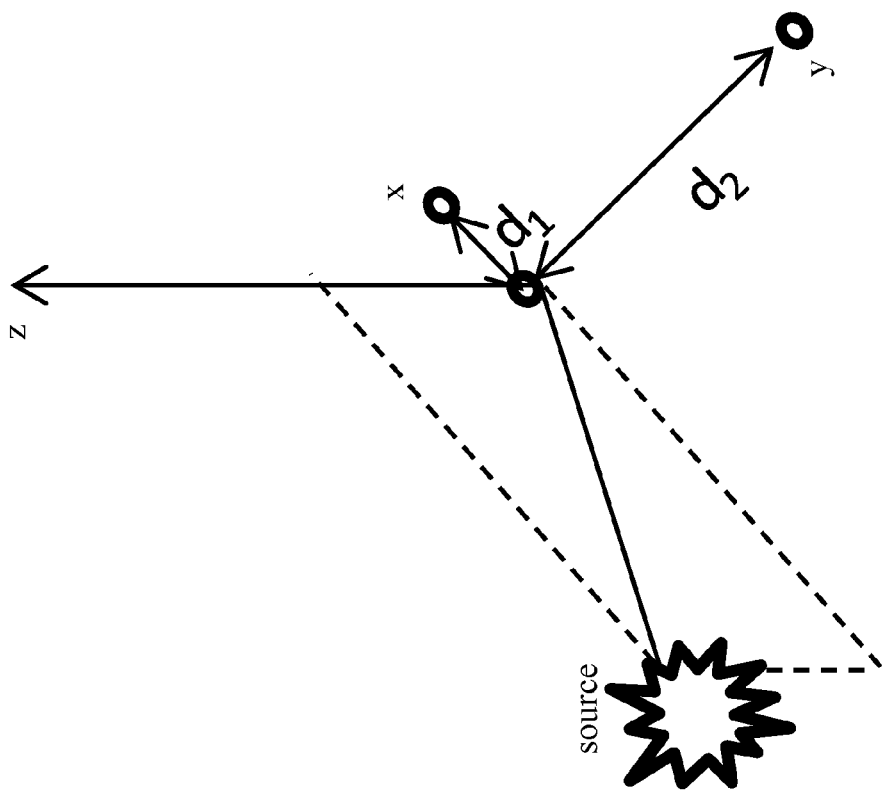
FIG. 32 shows an example of a speakerphone application.

The multiple microphone pairs of a 2-D array typically will not share the same DOA, even for a far-field point source. For example, source height relative to the plane of the array (e.g., in the z-axis) may play an important role in 2-D tracking. FIG. 32 shows an example of a speakerphone application in which the x-y plane as defined by the microphone axes is parallel to a surface (e.g., a tabletop) on which the telephone is placed. In this example, the source is a person speaking from a location that is along the x axis but is offset in the direction of the z axis (e.g., the speaker's mouth is above the tabletop). With respect to the x-y plane as defined by the microphone array, the direction of the source is along the x axis, as shown in FIG. 32. The microphone pair along the y axis estimates a DOA of the source as zero degrees from the x-z plane. Due to the height of the speaker above the x-y plane, however, the microphone pair along the x axis estimates a DOA of the source as 30° from the x axis (i.e., 60 degrees from the y-z plane), rather than along the x axis. FIGS. 34 and 35 shows two views of the cone of confusion associated with this DOA estimate, which causes an ambiguity in the estimated speaker direction with respect to the microphone axis.

Figure 33:
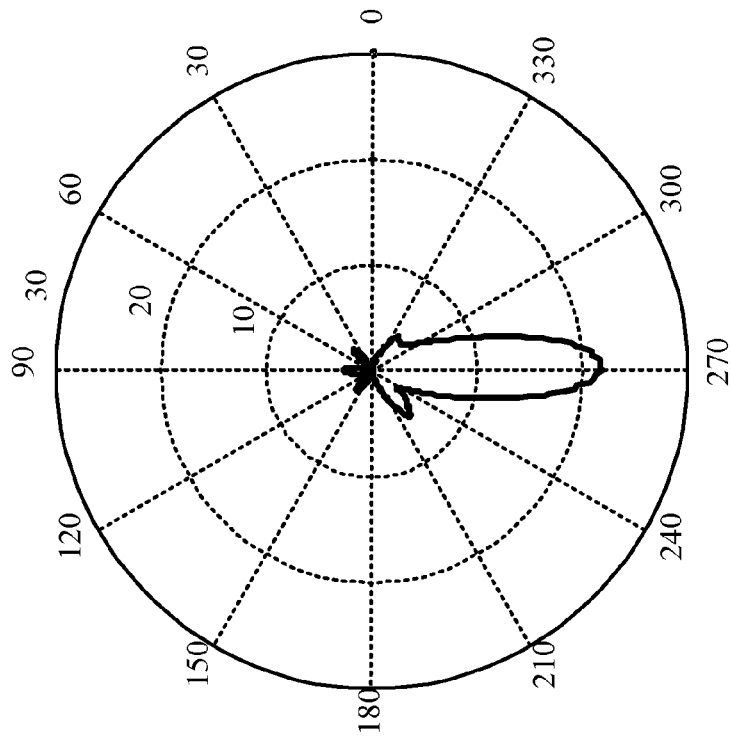
FIG. 33 shows a mapping of pair-wise DOA estimates to a 360° range in the plane of the microphone array.

An expression such as $$\left[\tan^{-1}\left(\frac{\sin\theta_1}{\sin\theta_2}\right), \tan^{-1}\left(\frac{\sin\theta_2}{\sin\theta_1}\right)\right], \quad (4)$$

where $\theta_1$ and $\theta_2$ are the estimated DOA for pair 1 and 2, respectively, may be used to project all pairs of DOAs to a 360° range in the plane in which the three microphones are located. Such projection may be used to enable tracking directions of active speakers over a 360° range around the microphone array, regardless of height difference. Applying the expression above to project the DOA estimates (0°, 60°) of FIG. 32 into the x-y plane produces $$\left[\tan^{-1}\left(\frac{\sin 0°}{\sin 60°}\right), \tan^{-1}\left(\frac{\sin 60°}{\sin 0°}\right)\right] = (0°, 90°),$$

which may be mapped to a combined directional estimate (e.g., an azimuth) of 270° as shown in FIG. 33.

In a typical use case, the source will be located in a direction that is not projected onto a microphone axis. FIGS. 37-40 show such an example in which the source is located above the plane of the microphones. In this example, the DOA of the source signal passes through the point (x,y,z)= (5,2,5). FIG. 37 shows the x-y plane as viewed from the +z direction, FIGS. 38 and 40 show the x-z plane as viewed from the direction of microphone MC30, and FIG. 39 shows the y-z plane as viewed from the direction of microphone MC10. The shaded area in FIG. 37 indicates the cone of confusion CY associated with the DOA $\theta_1$ as observed by the y-axis microphone pair MC20-MC30, and the shaded area in FIG. 38 indicates the cone of confusion CX associated with the DOA $\theta_2$ as observed by the x-axis microphone pair MC10-MC20. In FIG. 39, the shaded area indicates cone CY, and the dashed circle indicates the intersection of cone CX with a plane that passes through the source and is orthogonal to the x axis. The two dots on this circle that indicate its intersection with cone CY are the candidate locations of the source. Likewise, in FIG. 40 the shaded area indicates cone CX, the dashed circle indicates the intersection of cone CY with a plane that passes through the source and is orthogonal to the y axis, and the two dots on this circle that indicate its intersection with cone CX are the candidate locations of the source. It may be seen that in this 2-D case, an ambiguity remains with respect to whether the source is above or below the x-y plane.

For the example shown in FIGS. 37-40, the DOA observed by the x-axis microphone pair MC10-MC20 is $$\theta_2 = \tan^{-1}\left(-5 / \sqrt{25+4}\right) \approx -42.9°,$$

and the DOA observed by the y-axis microphone pair MC20-MC30 is $$\theta_1 = \tan^{-1}\left(-2 / \sqrt{25+25}\right) \approx -15.8°.$$

Using expression (4) to project these directions into the x-y plane produces the magnitudes (21.8°, 68.2°) of the desired angles relative to the x and y axes, respectively, which corresponds to the given source location (x,y,z)=(5,2,5). The signs of the observed angles indicate the x-y quadrant in which the source is located, as shown in FIG. 36.

In fact, almost 3D information is given by a 2D microphone array, except for the up-down confusion. For example, the directions of arrival observed by microphone pairs MC10-MC20 and MC20-MC30 may also be used to estimate the magnitude of the angle of elevation of the source relative to the x-y plane. If d denotes the vector from microphone MC20 to the source, then the lengths of the projections of vector d onto the x-axis, the y-axis, and the x-y plane may be expressed as d $\sin(\theta_2)$, d $\sin(\theta_1)$, and $$d\sqrt{\sin^2(\theta_1) + \sin^2(\theta_2)},$$

respectively. The magnitude of the angle of elevation may then be estimated as $$\hat{\theta}_h = \cos^{-1}\sqrt{\sin^2(\theta_1) + \sin^2(\theta_2)}.$$

Figure 41:
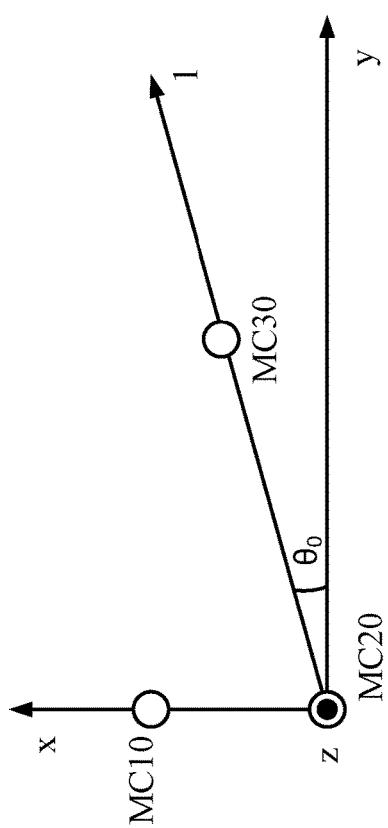
FIG. 41 shows an example of microphone pairs along non-orthogonal axes.

Although the microphone pairs in the particular examples of FIGS. 32-33 and 37-40 have orthogonal axes, it is noted that for microphone pairs having non-orthogonal axes, expression (4) may be used to project the DOA estimates to those non-orthogonal axes, and from that point it is straightforward to obtain a representation of the combined directional estimate with respect to orthogonal axes. FIG. 41 shows an example of microphone array MC10-MC20-MC30 in which the axis 1 of pair MC20-MC30 lies in the x-y plane and is skewed relative to the y axis by a skew angle $\theta_0$.

Figure 42:
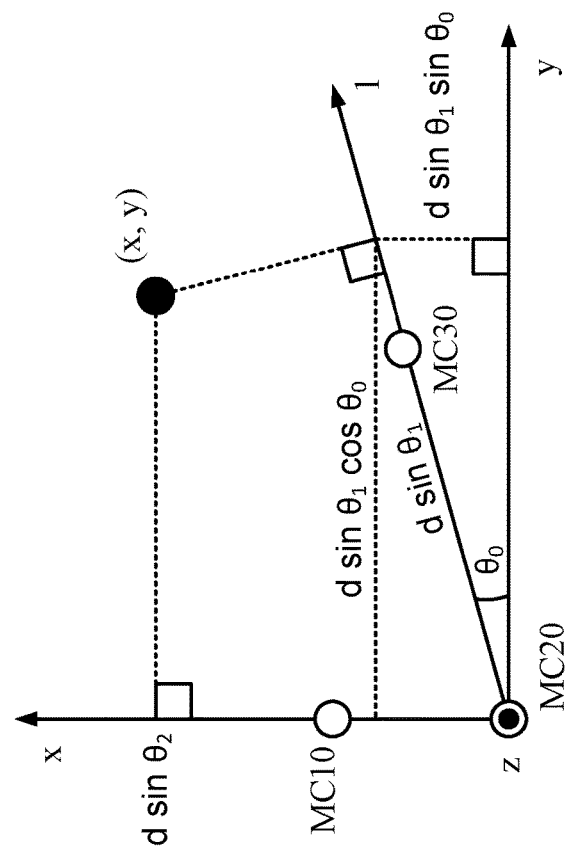
FIG. 42 shows an example of use of the array of FIG. 41 to obtain a DOA estimate with respect to the orthogonal x and y axes.

FIG. 42 shows an example of obtaining a combined directional estimate in the x-y plane with respect to orthogonal axes x and y with observations $(\theta_1, \theta_2)$ from an array as shown in FIG. 41. If d denotes the vector from microphone MC20 to the source, then the lengths of the projections of vector d onto the x-axis and axis 1 may be expressed as d $\sin(\theta_2)$ and d $\sin(\theta_1)$, respectively. The vector (x,y) denotes the projection of vector d onto the x-y plane. The estimated value of x is known, and it remains to estimate the value of y.

The estimation of y may be performed using the projection $p_1 = (d \sin\theta_1 \sin\theta_0, d \sin\theta_1 \cos\theta_0)$ of vector (x,y) onto axis 1. Observing that the difference between vector (x,y) and vector $p_1$ is orthogonal to $p_1$, calculate y as $$y = d \frac{\sin\theta_1 - \sin\theta_2 \sin\theta_0}{\cos\theta_0}.$$

The desired angles of arrival in the x-y plane, relative to the orthogonal x and y axes, may then be expressed respectively as $$\left(\tan^{-1}\left(\frac{y}{x}\right), \tan^{-1}\left(\frac{x}{y}\right)\right) = \left(\tan^{-1}\left(\frac{\sin\theta_1 - \sin\theta_2 \sin\theta_0}{\sin\theta_2 \cos\theta_0}\right), \tan^{-1}\left(\frac{\sin\theta_2 \cos\theta_0}{\sin\theta_1 - \sin\theta_2 \sin\theta_0}\right)\right).$$

Extension of DOA estimation to a 2-D array is typically well-suited to and sufficient for a speakerphone application. However, further extension to an N-dimensional array is also possible and may be performed in a straightforward manner. For tracking applications in which one target is dominant, it may be desirable to select N pairs for representing N dimensions. Once a 2-D result is obtained with a particular microphone pair, another available pair can be utilized to increase degrees of freedom. For example, FIGS. 37-42 illustrate use of observed DOA estimates from different microphone pairs in the x-y plane to obtain an estimate of the source direction as projected into the x-y plane. In the same manner, observed DOA estimates from an x-axis microphone pair and a z-axis microphone pair (or other pairs in the x-z plane) may be used to obtain an estimate of the source direction as projected into the x-z plane, and likewise for the y-z plane or any other plane that intersects three or more of the microphones.

Estimates of DOA error from different dimensions may be used to obtain a combined likelihood estimate, for example, using an expression such as $$\frac{1}{\max(|\theta - \theta_{0,1}|^2_{f,1}, |\theta - \theta_{0,2}|^2_{f,2}) + \lambda} \text{ or }$$

$$\frac{1}{\operatorname{mean}(|\theta - \theta_{0,1}|^2_{f,1}, |\theta - \theta_{0,2}|^2_{f,2}) + \lambda},$$

where $\theta_{0,i}$ denotes the DOA candidate selected for pair i. Use of the maximum among the different errors may be desirable to promote selection of an estimate that is close to the cones of confusion of both observations, in preference to an estimate that is close to only one of the cones of confusion and may thus indicate a false peak. Such a combined result may be used to obtain a (frame, angle) plane, as described herein, and/or a (frame, frequency) plot, as described herein.

The DOA estimation principles described herein may be used to support selection among multiple speakers. For example, location of multiple sources may be combined with a manual selection of a particular speaker (e.g., push a particular button to select a particular corresponding user) or automatic selection of a particular speaker (e.g., by speaker recognition). In one such application, a telephone is configured to recognize the voice of its owner and to automatically select a direction corresponding to that voice in preference to the directions of other sources.

A source DOA may be easily defined in 1-D, e.g. from −90° to +90°. For more than two microphones at arbitrary relative locations, it is proposed to use a straightforward extension of 1-D as described above, e.g. $(\theta_1, \theta_2)$ in two-pair case in 2-D, $(\theta_1, \theta_2, \theta_3)$ in three-pair case in 3-D, etc.

A key problem is how to apply spatial filtering to such a combination of paired 1-D DOA estimates. In this case, a beamformer/null beamformer (BFNF) as shown in FIG. 43 may be applied by augmenting the steering vector for each pair. In this figure, $A^H$ denotes the conjugate transpose of A, x denotes the microphone channels, and y denotes the spatially filtered channels. Using a pseudo-inverse operation $A^+ = (A^H A)^{-1} A^H$ as shown in FIG. 43 allows the use of a non-square matrix. For a three-microphone case (i.e., two microphone pairs) as illustrated in FIG. 45, for example, the number of rows 2*2=4 instead of 3, such that the additional row makes the matrix non-square.

As the approach shown in FIG. 43 is based on robust 1-D DOA estimation, complete knowledge of the microphone geometry is not required, and DOA estimation using all microphones at the same time is also not required. Such an approach is well-suited for use with anglogram-based DOA estimation as described herein, although any other 1-D DOA estimation method can also be used. FIG. 44 shows an example of the BFNF as shown in FIG. 43 which also includes a normalization factor to prevent an ill-conditioned inversion at the spatial aliasing frequency.

FIG. 46 shows an example of a pair-wise (PW) normalized MVDR (minimum variance distortionless response) BFNF, in which the manner in which the steering vector (array manifold vector) is obtained differs from the conventional approach. In this case, a common channel is eliminated due to sharing of a microphone between the two pairs. The noise coherence matrix Γ may be obtained either by measurement or by theoretical calculation using a sin c function. It is noted that the examples of FIGS. 43, 44, and 46 may be generalized to an arbitrary number of sources N such that N<=M, where M is the number of microphones.

FIG. 47 shows another example that may be used if the matrix $A^H A$ is not ill-conditioned, which may be determined using a condition number or determinant of the matrix. If the matrix is ill-conditioned, it may be desirable to bypass one microphone signal for that frequency bin for use as the source channel, while continuing to apply the method to spatially filter other frequency bins in which the matrix $A^H A$ is not ill-conditioned. This option saves computation for calculating a denominator for normalization. The methods in FIGS. 43-47 demonstrate BFNF techniques that may be applied independently at each frequency bin. The steering vectors are constructed using the DOA estimates for each frequency and microphone pair as described herein. For example, each element of the steering vector for pair p and source n for DOA $\theta_i$, frequency f, and microphone number m (1 or 2) may be calculated as $$d_{p,m}^n = \exp\left(\frac{-j\omega f_s(m-1)l_p}{c}\cos\theta_i\right),$$

where $l_p$ indicates the distance between the microphones of pair p, ω indicates the frequency bin number, and $f_s$ indicates the sampling frequency. FIG. 48 shows examples of steering vectors for an array as shown in FIG. 45.

A PWBFNF scheme may be used for suppressing direct path of interferers up to the available degrees of freedom (instantaneous suppression without smooth trajectory assumption, additional noise-suppression gain using directional masking, additional noise-suppression gain using bandwidth extension). Single-channel post-processing of quadrant framework may be used for stationary noise and noise-reference handling.

It may be desirable to obtain instantaneous suppression but also to provide minimization of artifacts such as musical noise. It may be desirable to maximally use the available degrees of freedom for BFNF. One DOA may be fixed across all frequencies, or a slightly mismatched alignment across frequencies may be permitted. Only the current frame may be used, or a feed-forward network may be implemented. The BFNF may be set for all frequencies in the range up to the Nyquist rate (e.g., except ill-conditioned frequencies). A natural masking approach may be used (e.g., to obtain a smooth natural seamless transition of aggressiveness).

Figure 49:
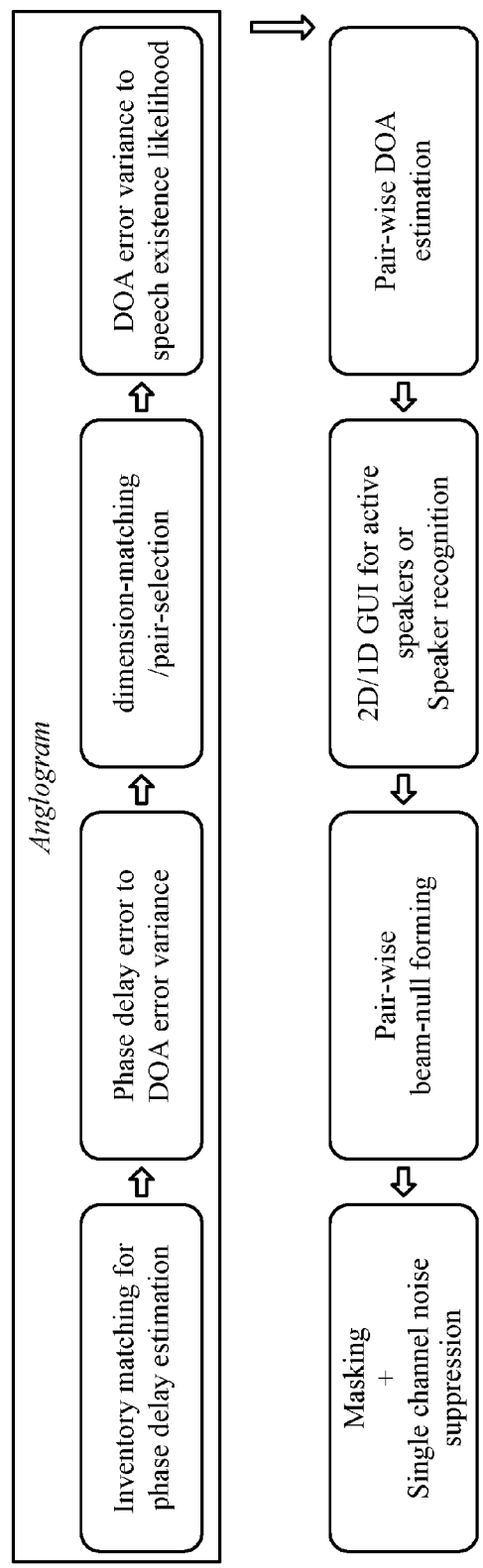
FIG. 49 shows a flowchart of an integrated method of source direction estimation as described herein.

FIG. 49 shows a flowchart for one example of an integrated method as described herein. This method includes an inventory matching task for phase delay estimation, a variance calculation task to obtain DOA error variance values, a dimension-matching and/or pair-selection task, and a task to map DOA error variance for the selected DOA candidate to a source activity likelihood estimate. The pair-wise DOA estimation results may also be used to track one or more active speakers, to perform a pair-wise spatial filtering operation, and or to perform time- and/or frequency-selective masking. The activity likelihood estimation and/or spatial filtering operation may also be used to obtain a noise estimate to support a single-channel noise suppression operation.

Section 4: Exemplary Implementations of an Application Interface

As previously discussed, various implementations disclosed herein are directed to enhanced user interaction via an application interface that takes into account the user's gaze direction relative to who is speaking in an interactive multi-participant environment where audio-based contextual information and/or visual-based semantic information is being presented using, for example, the technical implementations discussed in the previous section. More specifically, for several of the various implementations disclosed herein below, two different types of microphone array devices (MADs) may be used. The first type of MAD is a steerable microphone array (a.k.a. a steerable array) which is worn by a user in a known orientation with regard to the user's eyes, and wherein multiple users may each wear a steerable array. The second type of MAD is a fixed-location microphone array (a.k.a. a fixed array) which is placed in the same acoustic space as the users (one or more of which are using steerable arrays). For certain implementations, the steerable microphone array may be part of an active noise control (ANC) headset or hearing aid, and there may be multiple steerable arrays each associated with a different user or speaker (also referred to herein as a participant) in a meeting or group, for example.

Referring again to FIG. 1, each user 105 of a group of users in a room wears a steerable microphone array 110 (e.g., a headset), and there is a fixed microphone array 150 also located in the room. A user 105 wearing the headset may generate a fixed beam-pattern 120 from his steerable (e.g., wearable) microphone array which is oriented in the user's physical visual (or "look") direction such that, if the user turns his head, then the user's look direction of the beam-pattern is also changed. The active speaker's location may be determined using the fixed microphone array by correlating or otherwise determining the similarity of beamformed output (or any type of spatially filtered output) from the steerable microphone array with the fixed microphone array outputs corresponding to each active speaker, and the person that a user is looking at (e.g., paying attention to, listening to, etc.) can thereby be determined.

In addition to the foregoing, however, the system can also determine if the users are collectively looking at, for example, a common display device or other objects in the space such as a personal handheld device (such as a mobile device) or a personal wearable device (such as a watch) as described herein. Herein this may be referred to generally as the "collective gaze direction" and broadly corresponds to the general direction or intersection of gazing directions of multiple users, or the general direction or intersection of an audio source as perceived by multiple users (or, more specifically, the individual steerable arrays). The information corresponding to from the collective gaze direction and audio direction of participants within the environment may be used to indicate an active speaker, and the audio presentation of this active speaker may be enhanced for those gazing at the speaker. Similarly, an identified active speaker may also be the focus of audio and/or visual capture devices that are tracking (or recording) the progress of the interactions where, as the active speaker changes from person to person, so too does the focus of the audio and/or visual capture devices.

Figure 50:
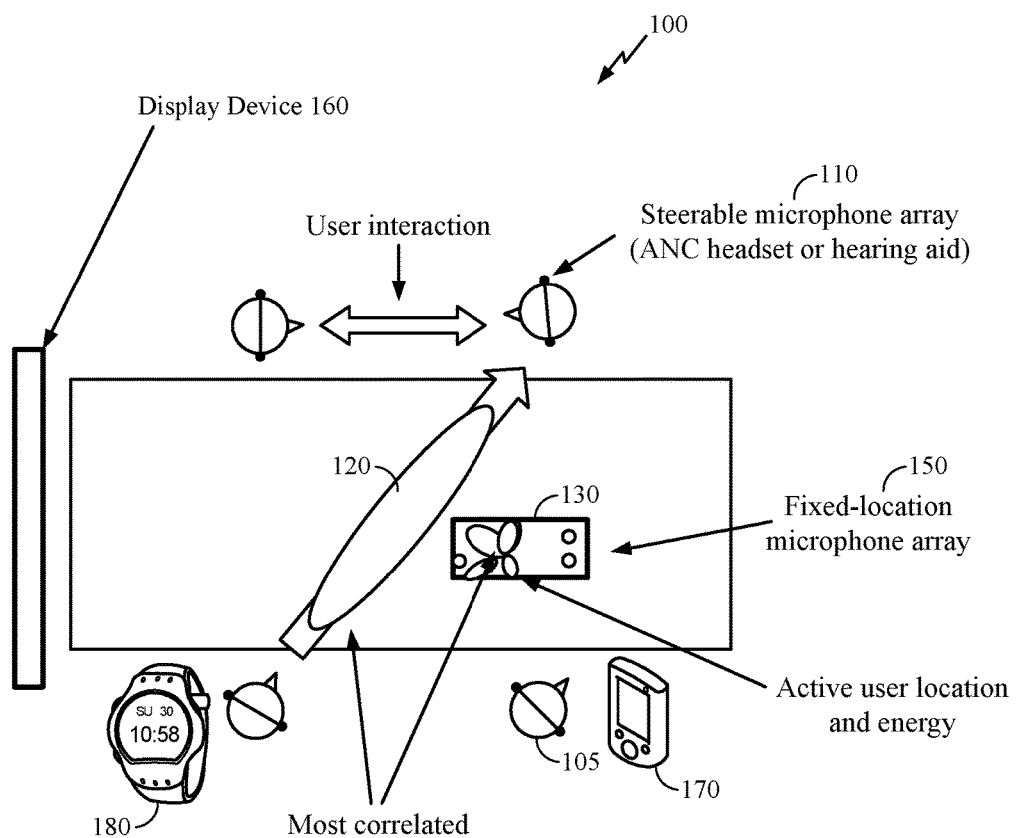
FIG. 50 is an enhanced version of FIG. 1 further including a variety of devices available to the users collectively or individually that are also used to convey information as an application interface of the system.

FIG. 50 is an enhanced version of FIG. 1 further including a variety of devices available to the users collectively or individually that are also used to convey information as an application interface of the system. As shown in this figure, also present in the room are a group display device 160, a personal handheld device 170, and a personal wearable device 180 which, in this illustration, is a wristwatch-type device. Although only group display device 160 is shown, any number, size, type, or style of project display devices may be utilized. Likewise, although only one user 105 is shown with a personal handheld device 160, other users 105 may also have personal handheld devices and even multiple personal handheld devices if desired, and the same is also true for personal wearable devices 170. In addition, personal computing devices and the like including but not limited to any of the various such devices described elsewhere herein can also be integrated with the system. Likewise, group display systems of any kind can also be readily implemented and are fully anticipated without limitation by this disclosure.

For example, with regard to a group display device, and for various implementations disclosed herein, the information pertaining to the gaze direction and audio direction of participants within the environment may be used to enhance environmental controls that serve to facilitate the presentation of audio and/or visual information. For certain such implementations, when the participants in the room are gazing at the display device in the room, the lighting may automatically be dimmed to enhance viewing of the screen while the volume of a pre-recorded presentation may be increased accordingly. For certain other implementations for interactive audio/visual presentations that include an active speaker, the dimming and increased volume may only occur during spans of silence, and then when an active speaker is again identified the presentation may pause, the lighting may increase to normal levels, and/or the volume of the presentation may decrease accordingly automatically.

Figure 51A:
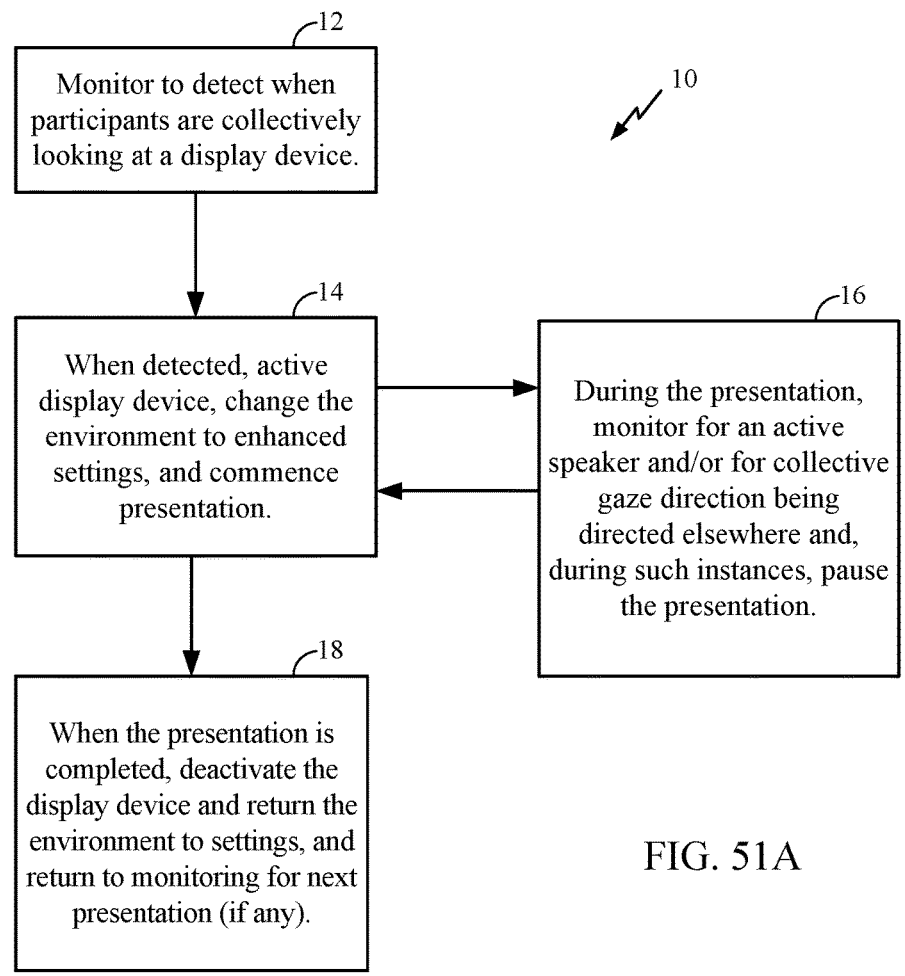
FIG. 51A is an operational flow of an exemplary method for enhancing the visual display of a projection device.
Figure 51B:
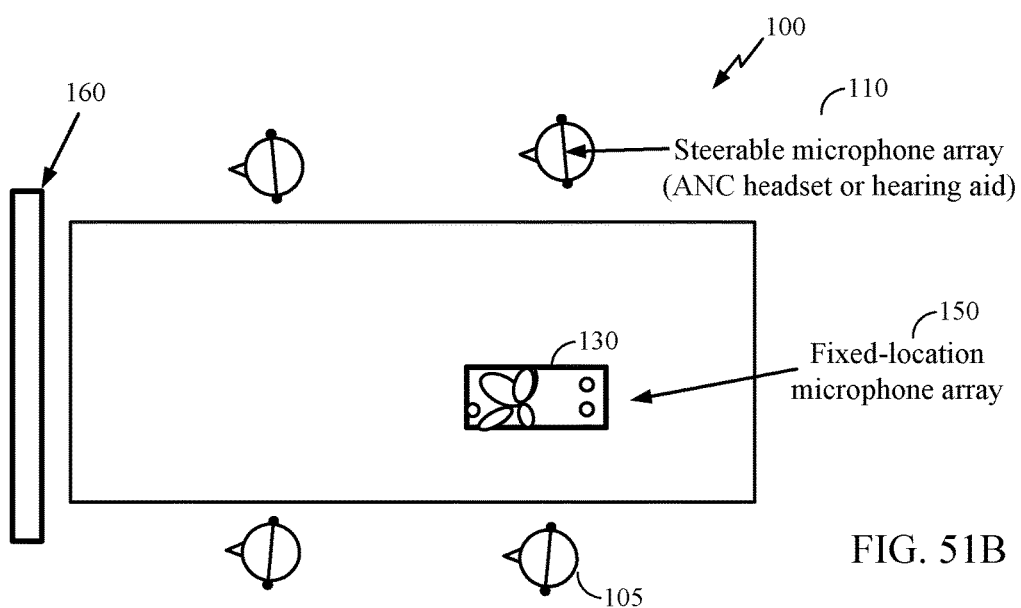
FIG. 51B is the diagram 100 of FIG. 50 showing the users viewing the room's display device (in contrast to FIG. 50 wherein the users are not looking at the room's display device)

FIG. 51A is an operational flow of an exemplary method 10 for enhancing the visual display of a projection device. FIG. 51B is the diagram 100 of FIG. 50 showing the users 105 viewing the room's display device 160 (in contrast to FIG. 50 wherein the users 105 are not looking at the room's display device 160). Referring to FIG. 51A, at step 12 the system monitors to detect when the participants are collectively gazing at a group display device such as a projection screen. For presentation slides, this detection may be weighted based in part on the gaze direction of the active speaker, for example, whereas for combined audio/video presentations the detection may be triggered for both gaze direction and no active speakers. At step 14, and upon detecting that the users 105 are in fact gazing at the display device 160 (as illustrated in FIG. 51B), the display device is activated to begin an audio visual presentation, the lighting in the room is dimmed to enhance viewing of the presentation (not shown), and/or the volume of the presentation is increased to a target maximum level (also not shown), among other things (collectively the "enhanced settings"). At step 16, the system monitors the room to detect an active speaker or a change in collective gaze direction during the presentation and, when detected (i.e., when the room returns to the state of FIG. 50 where the users 105 are no longer collectively gazing at the projection screen 160), the system then pauses the presentation and perhaps bring up the lights a bit or decrease any presentation sounds (collectively the "pause settings"). The system then returns to 14 to resume the presentation and the enhanced settings when the users again return their collective gaze to the display device. The system may recursively operate between 14 and 16 (corresponding to FIGS. 51B and 21 respectively) until the completion of the presentation. At step 18, when the system detects when the presentation is finished, the system then deactivates the display screen, brings up the lighting in the room, and so forth (collectively, the "original settings"), and then returns to monitoring at step 12 to begin the next presentation if, for example, there is another presentation in the queue.

Likewise, the information pertaining to the gaze direction and audio direction of participants within the environment particular to a specific user/participant may be used to enhance application user interface controls for devices specific to that particular user. For example, the user may possess a personal display device (or any kind of mobile display device) that interfaces with the audio/visual environment through the system and, based on the gaze direction of its user relative to the other users in the room, may automatically perform different functions—for example, display different information in different context, or simply determine whether the display should be on or off—accordingly.

More specifically, certain implementations disclosed herein detect a gaze direction line-of-sight for a user based on at least an audio detection components (i.e., microphone-type or other sound-detection devices) from a fixed array and at one steerable array; determine if a display device is in the line-of-sight of the user; if the display device is in the line-of-sight of the user, then display a first image on the display device; and if the display device is not in the line-of-sight of the user, then display a second image. For various such implementations, "audio detection components" and "audio components" are microphones.

For example, for a mobile device (i.e., a handheld portable device) that is aligned in front of and between the user's gaze and the subject of the user's gaze (for example, another participant), the device may automatically display information regarding the subject of that user's gaze (e.g., identifying information, textual replay of that other participant's last active speaking, etc.). With regard to other applications, such as the aforementioned projection screen, the mobile display—when intersected with the user's gaze and the projection screen—may display supplemental information regarding the contents of the screen preprogrammed into the presentation for just such a purpose. Similarly, the user's repeated gaze at an object, then at the personal device, then at the object, and then at the personal device, for example, my similarly trigger the device to automatically display information regarding the object that is subject to the alternating gazing activity of the user. Lastly, the device may simply save power when not being used (i.e., not within the field of view of the user) and automatically turn on when in use (i.e., within the field of view of the user).

Figure 52A:
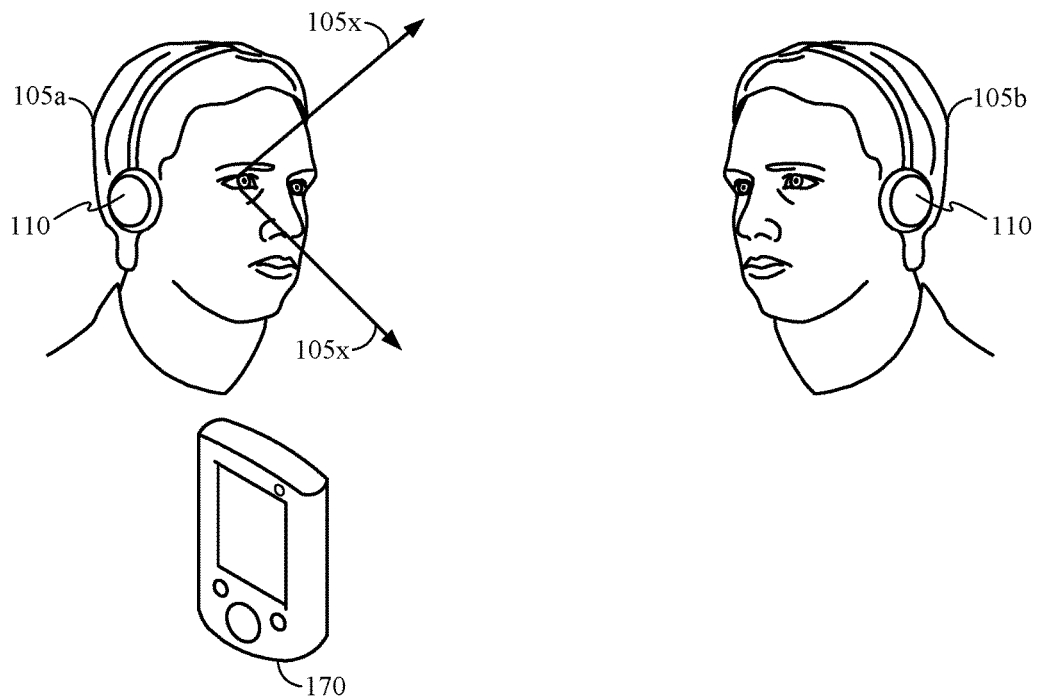
FIGS. 52A and 52B are perspective views of a first user using a portable display device (i.e., a mobile device comprising a display) and looking in the direction of a second user.
Figure 52B:
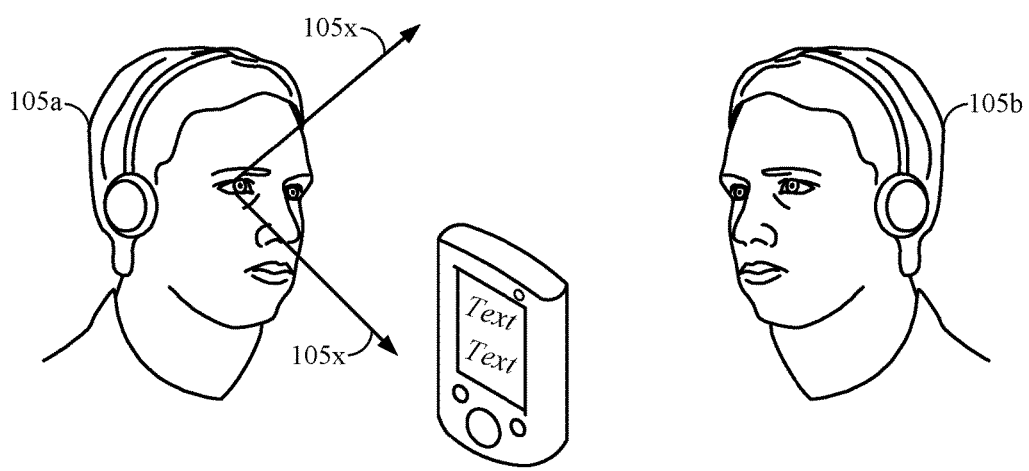

FIGS. 52A and 52B are perspective views of a first user 105a using a portable display device 170 (i.e., a mobile device comprising a display) and looking in the direction of a second user 105b. In FIG. 52A, the device is held low and not near the line-of-sight 105x of the first user 105a, whereas in FIG. 52B the display device 170 is held up near the line-of-sight 105x of the first user 105a viewing the second user 105b. Accordingly, in FIG. 52A the personal display device 170 is in a "screen off" state to save power (represented by the "dark" screen"), for example, whereas in 52B the personal display device 170 is both "on" (represented by the "light" screen) when held up near the line-of-sight 105x but also, having detected the identity of the target of the first user's 105a gaze, may also display information (represented by the text on the screen of the display device 170) pertaining to the second user 105b.

Figure 52C:
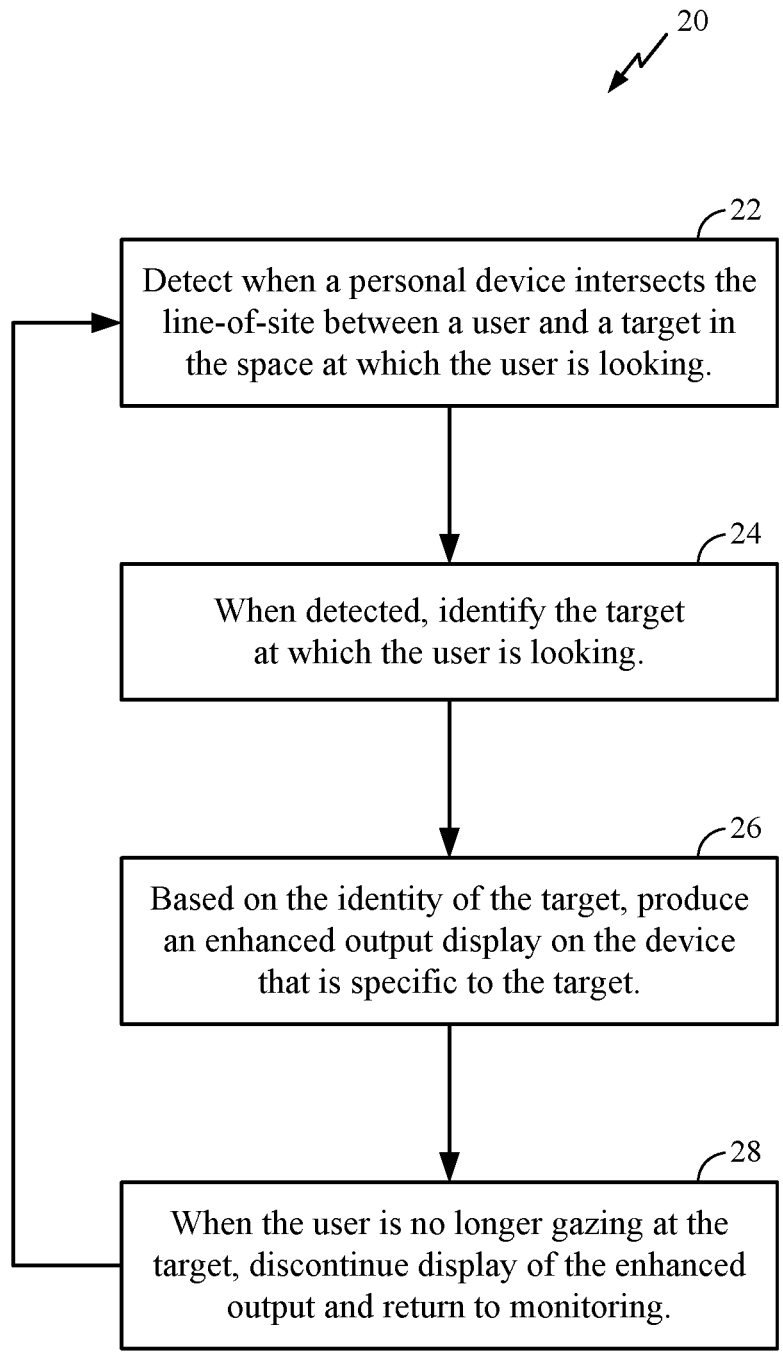
FIG. 52C is an operational flow of a method for a personal display device to enhance a user's experience when near the direct line of sight of the user and a target (another user, a display screen, etc.)

FIG. 52C is an operational flow of a method 20 for a personal display device to enhance a user's experience when near the direct line of sight of the user and a target (another user, a display screen, etc.). At 22, the device recursively detects whether it is in a line-of-sight orientation between its user and a target. Then, at 24, the device then identifies the target and, at 26, selects the enhanced information to display based on the target. At 28, the device checks to see when to stop displaying the information—such as when the device is no longer in the line-of-sight between the user and the target or when the user looks elsewhere—and, when no longer in the line-of-sight, discontinues the display and returns to 22 to continue monitoring for the next target.

Similarly, the information displayed in the context of the gaze direction and audio direction of participants within the environment particular to a specific user/participant may be used to enhance the user's own audio interaction in the environment by interactively providing helpful prompts and cues. For example, for a user that is an active speaker, that user's personal display device—recognizing that the user is the current active speaker—may track the eye contact of the user with the other participants to gauge who is most actively listening, whose attention is drawn to someone or something else in the room, and who is having a side conversation. In turn, the device could then provide cues to direct the speaker to focus on specific other participants to better engage them or otherwise draw them into the discussion.

For other implementations, the information pertaining to gaze direction and audio direction of participants within the environment particular to a specific user/participant may be used to enhance interoperability of multiple devices specific to that user. For example, the user may have a watch-type display device that operates as a watch but also as an interactive display described above when brought between the line of sight of the user and another participant or other source of information (audio or visual) in the environment. For example, when held at low level, the watch display may merely provide typical data such as time, date, etc., but when raised to a level that more directly intercedes between the line of sight of the user and a target (person, projection display, etc.), provides different information specific to the environment and the audio/visual interaction of the participants (and specifically the user and the target participant or object).

For yet other implementation based on several of the foregoing implementations, a personal display device may utilize ultrasound to detect its position relative to its user in order to know how to best automatically interact with the user. The short-range quality of ultrasound enables personal devices to work with individual users without interfering with other users employing similar technology. Similarly, emitters of a different type may be used for other objects such as projection screens and the like to enable them to better detect gaze direction and other inputs that in turn help with the selection of the appropriate output settings. For example, for a watch-type display, if the watch has an ultra-sound emitter, then the steerable array (and its microphones or "mics") worn by a user can detect the "direction of arrival" (DOA) of the device. If there is no occlusion from the user to the device and if DOA is "in a range" (or "within a range")—that is, within a certain angular range (often denoted by the Greek letter theta) such as, for example, +/−30 degrees and/or within a certain proximal distance such as, for example, 2 feet, 10, feet, or 100 feet—the ultrasound emission can be detected and the display can be modified accordingly. Moreover, because of its fast energy loss over distance, the proximity of ultrasound to the detecting device can play an important role in preventing overlap and other conditions.

It should be noted that determining whether a device is "in a range" for certain applications may comprises both a horizontal component (i.e., is it directly in front versus somewhere behind or to the side of the user's gaze direction) and/or a vertical component (i.e., is it at eye-level where it can be seen by the user versus it being at waist-level where it might be stored by the user) corresponding to whether the device is being held up to be viewed. In addition, for determinations based on line-of-sight—such as the display of information corresponding to something a user is gazing at—may similarly require a vertical component and a horizontal component to ascertain what it is the user is gazing at in a three-dimensional space, for example, at a display on top of a table (and not the table itself) or at a specific person (and not another person standing next to but to the side of the intended target). Accordingly, in certain contexts both components (vertical and horizontal) might need to be within a range (and each "true") in order for the overall determination to be true. For example, if a user is gazing at a display from among a group of displays arranged in rows and columns (e.g., a 3×3 grid akin to a tic-tac-toe board, for example), both a vertical component and a horizontal component of the user's gaze direction must be determined to ascertain which display the user is gazing at.

Figure 53:
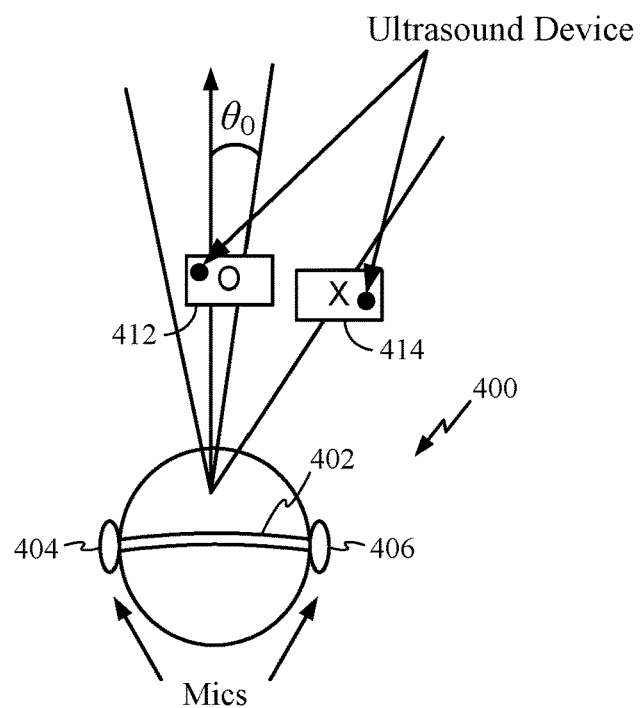
FIG. 53 is an illustration of ultrasound-enabled display devices.

FIG. 53 is an illustration of a user 400 wearing a steerable array 402 comprising two microphones 404 and 406 (or "mics") and holding two ultrasound-enabled display devices 412 and 414 where the first device 412 is within a range (and modifies its display accordingly) while the second device 414 is outside of a range (and does not modify its display or turns off its display to save power, for example).

Figure 54:
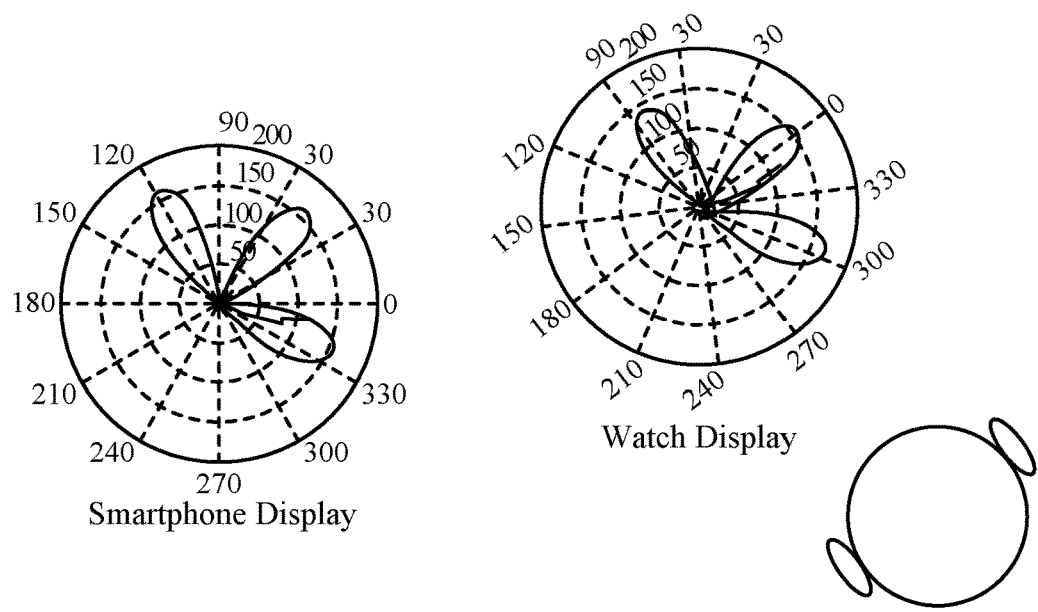
FIG. 54 is an illustration of determining the angle offset from the user utilizing correlation methods.

FIG. 54 illustrates the situation where, if a user's mobile device and watch (both with displays) have microphones, then the devices can be used to determine the angle offset from the user utilizing the correlation methods alluded to earlier herein. Then, when the user looks in a particular direction in line with the user looking at the watch, the visualization can then be reconfigured with the compensation for offset due to the orientation mismatch between the phone and the watch (that is, the displays are perfectly oriented even when the devices are not, as shown). Other devices similar to watch-type devices into which a display may be embedded include bracelet-type devices, necklace-type devices, ring-type devices, eyeglass-type devices, and so on and so forth.

For certain such implementations characterized by FIGS. 53 and 54, it may be advantageous to utilize at least one dedicated ultrasound emitter. However, if a dedicated ultrasound emitter is not available, a noise-emitting speaker (if any) of a watch or other such device might also be used as an ultrasound emitter. In addition, a multidirectional microphone might also be attached to the watch device for certain implementations and operate in conjunction with the steerable array accordingly. On the other hand, for a watch (or other device) that does not have an ultrasound emitter or multidirectional microphone, certain implementations may still synchronize the coordinate of a sound event display even though it would be undeterminable as to whether the corresponding user is looking at the watch or not (and thus could not turn on or off the watch using acoustic information since the watch would not possess the necessary acoustic capabilities).

Section 5: Additional Details and Alternatives

The methods and apparatus disclosed herein may be applied generally in any transceiving and/or audio sensing application, especially mobile or otherwise portable instances of such applications. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

It is expressly contemplated and hereby disclosed that communications devices disclosed herein may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

Examples of codecs that may be used with, or adapted for use with, transmitters and/or receivers of communications devices as described herein include the Enhanced Variable Rate Codec, as described in the Third Generation Partnership Project 2 (3GPP2) document C.S0014-C, v1.0, entitled "Enhanced Variable Rate Codec, Speech Service Options 3, 68, and 70 for Wideband Spread Spectrum Digital Systems," February 2007 (available online at www-dot-3gpp-dot-org); the Selectable Mode Vocoder speech codec, as described in the 3GPP2 document C.S0030-0, v3.0, entitled "Selectable Mode Vocoder (SMV) Service Option for Wideband Spread Spectrum Communication Systems," January 2004 (available online at www-dot-3gpp-dot-org); the Adaptive Multi Rate (AMR) speech codec, as described in the document ETSI TS 126 092 V6.0.0 (European Telecommunications Standards Institute (ETSI), Sophia Antipolis Cedex, FR, December 2004); and the AMR Wideband speech codec, as described in the document ETSI TS 126 192 V6.0.0 (ETSI, December 2004). Such a codec may be used, for example, to recover the reproduced audio signal from a received wireless communications signal.

The presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, 32, 44.1, 48, or 192 kHz).

An apparatus as disclosed herein (e.g., any device configured to perform a technique as described herein) may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein may be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation described herein, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device such as a handset, headset, or portable digital assistant (PDA), and that the various apparatus described herein may be included within such a device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An apparatus comprising:
   a display of a wearable watch-type device configured to display a visual output;
   an interface of the wearable watch-type device configured to receive a first image from a mobile device; and
   a processor of the wearable watch-type device configured to:
      determine whether the wearable watch-type device is in a gaze direction of a user; and
      in response to determining that the wearable watch-type display device is in the gaze direction of the user, initiate presentation of the first image at the display, wherein the first image indicates a social interaction among a plurality of participants.

2. The apparatus of claim 1, wherein the display is further configured to present a second image, wherein the first image is displayed concurrently with the second image, wherein the second image comprises a date and a time, and wherein the gaze direction corresponds to a look direction of the user.

3. The apparatus of claim 1, wherein the social interaction includes looking toward a speaker of the plurality of participants.

4. The apparatus of claim 3, wherein the first image indicates identities of the plurality of participants and indicates an interaction measurement corresponding to, for the social interaction, amounts of interaction between a particular participant and each of the other participants of the plurality of participants.

5. The apparatus of claim 1, wherein the first image indicates multiple interaction measurements associated with each participant of the plurality of participants.

6. The apparatus of claim 1, wherein the first image indicates a plurality of topics corresponding to the social interaction, and wherein the first image indicates a participation amount of a particular participant.

7. The apparatus of claim 1, wherein the social interaction comprises a plurality of meetings.

8. A method comprising:
   receiving, at a wearable watch-type device, a first image from a mobile device;
   determining whether the wearable watch-type device is in a gaze direction of a user; and
   in response to determining that the wearable watch-type device is in the gaze direction of the user, presenting the first image, at a display of the wearable watch-type device, wherein the first image indicates a social interaction among a plurality of participants.

9. The method of claim 8, wherein the social interaction includes looking toward a speaker, and wherein the first image further indicates a percentage of the plurality of participants other than a particular participant of the plurality of participants that are looking at the particular participant during a timeframe associated with the social interaction.

10. The method of claim 8, wherein the first image indicates a plurality of topics discussed during the social interaction.

11. The method of claim 8, wherein the first image indicates a percentage of time that each participant of the plurality of participants expand discussing each topic of a plurality of topics discussed during the social interaction.

12. The method of claim 11, wherein the first image comprises an interaction graph, and wherein the interaction graph includes a plurality of indicators, each indicator identifying information relating to at least one of: a participant of the plurality of participants looking at another participant of the plurality of participants, a participation level of the participant, or a leader of a group of participants of the plurality of participants.

13. The method of claim 8, wherein the first image indicates, for the social interaction, amounts of interaction between a particular participant and each of the other participants of the plurality of participants, and wherein an interaction measurement is selected from a range of interaction values.

14. The method of claim 8, wherein one or more social interactions include looking toward a speaker.

15. The method of claim 8, wherein the first image indicates a social interaction summary accumulated throughout a period of time corresponding to the social interaction for a particular participant of the plurality of participants.

16. The method of claim 15, wherein the social interaction summary includes:
   a participant column listing the plurality of participants other than the particular participant; and
   a specific month column of a plurality of monthly columns, wherein each row of a plurality of rows in the specific month column indicates an interaction value corresponding to the social interaction between the particular participant and each participant listed in the participant column.

17. The method of claim 8, wherein the first image indicates a personal timeline for a first participant of the plurality of participants, and wherein the personal timeline includes social interaction data for each of a plurality of points in time, the social interaction data based on the social interaction.

18. The method of claim 8, further comprising generating a graphical user interface (GUI) at the wearable watch-type device, wherein the GUI includes the first image.

19. The method of claim 18, wherein the GUI includes a second image presented concurrently with the first image, and wherein the second image comprises a date and a time.

20. The method of claim 8, wherein the first image indicates an identifier associated with a particular participant of the plurality of participants and data indicating a look direction of the particular participant.

21. An apparatus comprising:
   means for displaying a visual output at a wearable watch-type device;
   means for receiving a first image at the wearable watch-type device from a mobile device; and
   means for initiating presentation of the first image at the means for displaying the visual output in response to a determination that the wearable watch-type device is in a gaze direction of a user, wherein the first image indicates a social interaction among a plurality of participants.

22. The apparatus of claim 21, wherein the first image indicates a social interaction summary, and wherein the social interaction summary includes a participant column listing the plurality of participants other than a particular participant of the plurality of participants.

23. The apparatus of claim 22, wherein the social interaction summary further includes a specific month column of a plurality of monthly columns, wherein each row of a plurality of rows in the specific month column indicates an interaction value corresponding to the social interaction between the particular participant and each participant listed in the participant column.

24. The apparatus of claim 21, wherein the means for initiating the presentation of the first image is configured to generate a personal timeline for a first participant of the plurality of participants, and wherein the personal timeline includes social interaction data for each of a plurality of points in time, the social interaction data based on the social interaction.

25. The apparatus of claim 21, wherein the social interaction includes a look direction of a non-speaking participant, and wherein the gaze direction is determined based on an audio signal.

26. A computer-readable storage device storing instructions that, when executed, cause a processor to perform operations comprising
   receiving, at a wearable watch-type device, a first image from a mobile device;
   determining whether the wearable watch-type device is in a gaze direction of a user; and
   in response to determining that the wearable watch-type device is in the gaze direction of the user, presenting the first image, at a display of the wearable watch-type device, wherein the first image indicates a social interaction among a plurality of participants.

27. The computer-readable storage device of claim 26, wherein the first image comprises an interaction graph, wherein a strength of an interaction between two participants of the plurality of participants is based on a duration of time that the two participants have interacted, and wherein the interaction graph indicates the strength of the interaction.

28. The computer-readable storage device of claim 27, wherein the interaction graph further includes a plurality of indicators, and wherein each indicator has a particular dimension corresponding to a strength of interaction between two participants of the plurality of participants.

29. The computer-readable storage device of claim 26, wherein the social interaction corresponds to a meeting that includes the plurality of participants.

30. The computer-readable storage device of claim 26, wherein the first image indicates participant interaction statistics during the social interaction.

\* \* \* \* \*